US012063679B2

(12) United States Patent
Gao et al.

(10) Patent No.: US 12,063,679 B2
(45) Date of Patent: Aug. 13, 2024

(54) COMMUNICATION METHOD AND APPARATUS, AND STORAGE MEDIUM

(71) Applicant: HUAWEI TECHNOLOGIES CO., LTD., Guangdong (CN)

(72) Inventors: Fei Gao, Shanghai (CN); Xi Zhang, Chengdu (CN); Yongping Zhang, Beijing (CN); Tie Li, Beijing (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 395 days.

(21) Appl. No.: 17/673,491

(22) Filed: Feb. 16, 2022

(65) Prior Publication Data

US 2022/0174681 A1     Jun. 2, 2022

Related U.S. Application Data

(63) Continuation of application No. PCT/CN2020/096167, filed on Jun. 15, 2020.

(30) Foreign Application Priority Data

Aug. 16, 2019  (CN) .......................... 201910760250.8

(51) Int. Cl.
*H04W 72/06*    (2009.01)
*H04W 72/04*    (2023.01)
(Continued)

(52) U.S. Cl.
CPC ..... *H04W 72/563* (2023.01); *H04W 72/0446* (2013.01)

(58) Field of Classification Search
CPC .................. H04W 72/563; H04W 72/0446
See application file for complete search history.

(56) References Cited

U.S. PATENT DOCUMENTS

2018/0192405 A1    7/2018   Gong et al.
2019/0037577 A1*   1/2019   Sun ....................... H04W 72/56
(Continued)

FOREIGN PATENT DOCUMENTS

CN        108289016 A      7/2018
CN        108696463 A     10/2018
(Continued)

OTHER PUBLICATIONS

3GPP TS 38.213 V15.6.0 (Jun. 2019), "3rd Generation Partnership Project; Technical Specification Group Radio Access Network; NR; Physical layer procedures for control (Release 15)," Jun. 2019, 107 pages.

(Continued)

*Primary Examiner* — Melvin C Marcelo
(74) *Attorney, Agent, or Firm* — Fish & Richardson P.C.

(57) ABSTRACT

The disclosure provides example communication methods and apparatuses. One example method includes determining a highest-priority CORESET, so that a terminal device monitors a PDCCH on the highest-priority CORESET. A highest-priority CORESET is determined in M CORESETs belonging to T CORESETs based on one or more of cell identifiers, quasi co-location properties, search space set types, and search space set identifiers that are associated with the M CORESETs in a time unit, and a PDCCH is monitored on the highest-priority CORESET.

20 Claims, 12 Drawing Sheets

(51) Int. Cl.
*H04W 72/0446* (2023.01)
*H04W 72/563* (2023.01)

(56) References Cited

U.S. PATENT DOCUMENTS

| | | |
|---|---|---|
| 2019/0223164 A1 | 7/2019 | He et al. |
| 2019/0253308 A1 | 8/2019 | Huang et al. |
| 2019/0254025 A1 | 8/2019 | Lee et al. |

FOREIGN PATENT DOCUMENTS

| | | |
|---|---|---|
| CN | 109314972 A | 2/2019 |
| CN | 109391971 A | 2/2019 |
| CN | 109802758 A | 5/2019 |
| CN | 109819475 A | 5/2019 |
| EP | 3490184 A1 | 5/2019 |
| WO | 2019139300 A1 | 7/2019 |

OTHER PUBLICATIONS

Huawei, HiSilicon, "Considerations on the mapping between PDCCH occasion and beam for OSI," 3GPP TSG RAN WG2 Meeting #AH-1807, R2-1810126, Montreal, Canada, Jul. 2-6, 2018, 2 pages.
Huawei et al., "Correction on PDCCH selection among different QCL-TypeD property," 3GPP TSG RAN WG1 Meeting #96, R1-1903205, Athens, Greece, Feb. 25- Mar. 1, 2019, 3 pages.
InterDigital Inc., "Timing Aspects in MAC," 3GPP TSG-RAN WG2 #99bis, R2-1710655, Revision of R2-1708723, Prague, Czech Republic, Oct. 9-13, 2017, 6 pages.
LG Electronics, "Remaining issues on downlink control channel," 3GPP TSG RAN WG1 Meeting #94, R1-1808490, Gothenburg, Sweden, Aug. 20-24, 2018, 9 pages.
LG Electronics, "Remaining issues on search space," 3GPP TSG RAN WG1 Meeting #93, R1-1806616, Busan, Korea, May 21-25, 2018, 3 pages.
MCC Support, "Draft Report of 3GPP TSG RAN WG1 #96 v0.1.0 (Athens, Greece, Feb. 25-Mar. 1, 2019)," 3GPP TSG RAN WG1 Meeting #96bis, R1-190xxxx, Xi'an, China, Apr. 8-12, 2019, 149 pages.
NTT DOCOMO, Inc., "Summary for PDCCH structure and search space," 3GPP TSG RAN WG1 Meeting #96, R1-193339, Athens, Greece, Feb. 25-Mar. 1, 2019, 18 pages.
Office Action issued in Chinese Application No. 201910760250.8 on Dec. 24, 2021, 12 pages (with English translation).
Office Action issued in Chinese Application No. 201910760250.8 on May 27, 2022, 54 pages.
PCT International Search Report and Written Opinion issued in International Application No. PCT/CN2020/096167 on Sep. 24, 2020, 14 pages (with English translation).
Samsung et al., "Remaining Issues on PDCCH and Search Space Design," 3GPP TSG RAN WG1 Meeting #94bis, R1-1810842, Chengdu, China, Oct. 8-12, 2018, 7 pages.
Extended European Search Report in European Appln No. 20854376.9, dated Sep. 16, 2022, 17 pages.

\* cited by examiner

COMMUNICATION METHOD AND APPARATUS, AND STORAGE MEDIUM

CROSS-REFERENCE TO RELATED APPLICATIONS

This application is a continuation of International Application No. PCT/CN2020/096167, filed on Jun. 15, 2020, which claims priority to Chinese Patent Application No. 201910760250.8, filed on Aug. 16, 2019. The disclosures of the aforementioned applications are hereby incorporated by reference in their entireties.

TECHNICAL FIELD

This application relates to the communication field, and in particular, to a communication method and apparatus, and a storage medium.

BACKGROUND

In a communication system, a network device may send downlink control information (downlink control information, DCI) to a terminal device by using a physical downlink control channel (physical downlink control channel, PDCCH). For example, the network device may configure a search space set (search space set) corresponding to each piece of DCI for the terminal device by using higher layer signaling, but does not notify the terminal device of a specific candidate (candidate) PDCCH that is in the search space set and on which the DCI is to be sent. The terminal device may determine, based on configuration information sent by the network device, DCI that is currently expected to be received. The terminal device may perform, based on the configuration information, channel estimation on a candidate PDCCH in the search space set corresponding to the to-be-received DCI, and monitor (monitor) whether the candidate PDCCH carries the DCI. The terminal device attempts to perform decoding on each candidate PDCCH to determine whether the corresponding DCI is received. This behavior is referred to as blind detection (Blind detection, BD).

A plurality of PDCCH MOs delivered by the network device to the terminal device may have an overlapping second time unit in time domain, and beam directions of PDCCH MOs having the overlapping second time unit in time domain may be the same or different. However, according to a current protocol, for monitoring a PDCCH, monitoring can be performed only in one beam direction at a moment. When the beam directions of the PDCCH MOs having the overlapping second time unit in time domain are different, how to monitor a PDCCH becomes a problem that needs to be urgently resolved.

SUMMARY

Embodiments of this application provide a communication method and apparatus, and a storage medium, to determine a highest-priority CORESET, so that a terminal device monitors a PDCCH on the highest-priority CORESET.

According to a first aspect, an embodiment of this application provides a communication method, including. A terminal device receives configuration information, where the configuration information is used to indicate one or more of cell identifiers, quasi co-location properties, search space set types, and search space set identifiers that are associated with T control-resource sets CORESETs in a first time unit. The terminal device determines, in M CORESETs belonging to the T CORESETs, a highest-priority CORESET based on one or more of cell identifiers, quasi co-location properties, search space set types, and search space set identifiers that are associated with the M CORESETs in a time unit. To-be-monitored physical downlink control channel monitoring occasions PDCCH MOs in the first time unit are associated with the M CORESETs, M is a positive integer, one of the to-be-monitored PDCCH MOs in the first time unit is associated with one of the M CORESETs, and one of the M CORESETs is associated with one or more of the to-be-monitored PDCCH MOs in the first time unit. The terminal device monitors a PDCCH on the highest-priority CORESET. In this way, when a plurality of PDCCH MOs have an overlapping second time unit in time domain, any two of associated CORESETs have different quasi co-location properties, and execution bodies are different, a same CORESET can be selected for monitoring a PDCCH MO.

In a possible implementation of the first aspect, after the terminal device determines the highest-priority CORESET in the M CORESETs, the method further includes: The terminal device discards, from the to-be-monitored PDCCH MOs in the first time unit, a PDCCH MO that has an overlapping second time unit with at least one PDCCH MO associated with the highest-priority CORESET in time domain and that has a different quasi co-location property.

According to a second aspect, an embodiment of this application provides a communication method, including: A network device generates configuration information, and sends the configuration information, where the configuration information is used to indicate one or more of cell identifiers, quasi co-location properties, search space set types, and search space set identifiers that are associated with T control-resource sets CORESETs in a first time unit. The network device determines, in M CORESETs belonging to the T CORESETs, a highest-priority CORESET based on one or more of cell identifiers, quasi co-location properties, search space set types, and search space set identifiers that are associated with the M CORESETs in a time unit. To-be-monitored physical downlink control channel monitoring occasions PDCCH MOs in the first time unit are associated with the M CORESETs, M is a positive integer, one of the to-be-monitored PDCCH MOs in the first time unit is associated with one of the M CORESETs, and one of the M CORESETs is associated with one or more of the to-be-monitored PDCCH MOs in the first time unit. In this way, when a plurality of PDCCH MOs have an overlapping second time unit in time domain, any two of associated CORESETs have different quasi co-location properties, and execution bodies are different, a same CORESET can be selected for monitoring a PDCCH MO.

In a possible implementation of the second aspect, after the network device determines the highest-priority CORESET in the M CORESETs, the method further includes: The network device discards, from the to-be-monitored PDCCH MOs in the first time unit, a PDCCH MO that has an overlapping second time unit with at least one PDCCH MO associated with the highest-priority CORESET in time domain and that has a different quasi co-location property.

In a possible implementation of the first aspect or the second aspect, if only one of the M CORESETs is associated with a common search space set CSS, the highest-priority CORESET is the CORESET associated with the CSS in the M CORESETs.

In a possible implementation of the first aspect or the second aspect, if K CORESETs in the M CORESETs are associated with common search space sets CSSs, K is a positive integer not greater than M, and K cell identifiers associated with the K CORESETs are all the same, the highest-priority CORESET is a CORESET associated with a smallest common search space set identifier in the K CORESETs.

In a possible implementation of the first aspect or the second aspect, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is the CORESET associated with the smallest cell identifier in the K CORESETs.

In a possible implementation of the first aspect or the second aspect, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest common search space set identifier in the CORESETs associated with the smallest cell identifier in the K CORESETs.

In a possible implementation of the first aspect or the second aspect, if none of the M CORESETs is associated with a common search space set CSS, and M cell identifiers associated with the M CORESETs are all the same, the highest-priority CORESET is a CORESET associated with a smallest UE-specific search space set identifier in the M CORESETs.

In a possible implementation of the first aspect or the second aspect, if none of the M CORESETs is associated with a common search space set CSS, cell identifiers associated with at least two of the M CORESETs are different, and a smallest cell identifier in M cell identifiers associated with the M CORESETs is associated with only one of the M CORESETs, the highest-priority CORESET is the CORESET associated with the smallest cell identifier in the M CORESETs.

In a possible implementation of the first aspect or the second aspect, if none of the M CORESETs is associated with a common search space set CSS, cell identifiers associated with at least two of the M CORESETs are different, and a smallest cell identifier in M cell identifiers associated with the M CORESETs is associated with at least two of the M CORESETs, the highest-priority CORESET is a CORESET associated with a smallest UE-specific search space set identifier in the CORESETs associated with the smallest cell identifier in the M CORESETs.

According to a third aspect, an embodiment of this application provides a communication method, including: A terminal device receives configuration information, where the configuration information is used to indicate one or more of cell identifiers, quasi co-location properties, search space set types, and search space set identifiers that are associated with T control-resource sets CORESETs in a first time unit. The terminal device determines, in M CORESETs belonging to the T CORESETs, a highest-priority CORESET based on one or more of cell identifiers, quasi co-location properties, search space set types, and search space set identifiers that are associated with the M CORESETs in a time unit. The M CORESETs are CORESETs associated with PDCCH MOs in a PDCCH MO set, the PDCCH MO set includes L PDCCH MOs, T and M are positive integers, M is less than or equal to T, and L is an integer greater than 1. The terminal device monitors a PDCCH on the highest-priority CORESET. The PDCCH MO set includes a first PDCCH MO and a second PDCCH MO, and the first PDCCH MO and the second PDCCH MO have an overlapping second time unit in time domain; if the PDCCH MO set further includes a third PDCCH MO, and the third PDCCH MO does not have an overlapping second time unit with the first PDCCH MO and the second PDCCH MO in time domain, the PDCCH MO set further includes a fourth PDCCH MO, and the fourth PDCCH MO has an overlapping second time unit with the first PDCCH MO or the second PDCCH MO in time domain; and the third PDCCH MO and the fourth PDCCH MO have an overlapping second time unit in time domain. In this way, when execution bodies are different, a same highest-priority CORESET can be selected for monitoring a PDCCH MO. In addition, in this implementation, a concept of overlapping in a conventional technology may be redefined. Any two of the L PDCCH MOs may have a direct overlapping relationship, or may have an indirect overlapping relationship. For details, refer to the embodiments. In addition, in this implementation, a protocol in the conventional technology is slightly modified.

In a possible implementation of the third aspect, if the M CORESETs all have a same quasi co-location property, the M CORESETs have a same beam direction. In this case, the terminal device may monitor the M CORESETs. In this case, the highest-priority CORESET may be any one of the M CORESETs. Alternatively, solutions for selecting a highest-priority CORESET provided in the embodiments of this application may be used for selection.

In a possible implementation of the third aspect, if at least two of the M CORESETs have different quasi co-location properties, after the highest-priority CORESET is selected, the method further includes: discarding, from the PDCCH MO set, a PDCCH MO associated with a CORESET having a quasi co-location property different from that of the highest-priority CORESET. In this case, the solutions for selecting a highest-priority CORESET provided in the embodiments of this application may be used for selection.

According to a fourth aspect, an embodiment of this application provides a communication method, including: A network device generates configuration information, and sends the configuration information, where the configuration information is used to indicate one or more of cell identifiers, quasi co-location properties, search space set types, and search space set identifiers that are associated with T control-resource sets CORESETs in a first time unit.

The network device determines, in M CORESETs belonging to the T CORESETs, a highest-priority CORESET based on one or more of cell identifiers, quasi co-location properties, search space set types, and search space set identifiers that are associated with the M CORESETs in a time unit. The M CORESETs are CORESETs associated with PDCCH MOs in a PDCCH MO set, the PDCCH MO set includes L PDCCH MOs, T and M are positive integers, M is less than or equal to T, and L is an integer greater than 1.

The PDCCH MO set includes a first PDCCH MO and a second PDCCH MO, and the first PDCCH MO and the second PDCCH MO have an overlapping second time unit in time domain; if the PDCCH MO set further includes a third PDCCH MO, and the third PDCCH MO does not have an overlapping second time unit with the first PDCCH MO and the second PDCCH MO in time domain, the PDCCH MO set further includes a fourth PDCCH MO, and the fourth PDCCH MO has an overlapping second time unit with the first PDCCH MO or the second PDCCH MO in time domain; and the third PDCCH MO and the fourth PDCCH MO have an overlapping second time unit in time domain. In this way, when execution bodies are different, a same highest-priority CORESET can be selected for monitoring a PDCCH MO. In addition, in this implementation, a concept of overlapping in a conventional technology may be redefined. Any two of the L PDCCH MOs may have a direct overlapping relationship, or may have an indirect overlapping relationship. For details, refer to the embodiments. In addition, in this implementation, a protocol in the conventional technology is slightly modified.

In a possible implementation of the fourth aspect, if the M CORESETs all have a same quasi co-location property, the M CORESETs have a same beam direction. In this case, the terminal device may monitor the M CORESETs. In this case, the highest-priority CORESET may be any one of the M CORESETs. Alternatively, solutions for selecting a highest-priority CORESET provided in the embodiments of this application may be used for selection.

In a possible implementation of the fourth aspect, if at least two of the M CORESETs have different quasi co-location properties, after the highest-priority CORESET is selected, the method further includes: discarding, from the PDCCH MO set, a PDCCH MO associated with a CORESET having a quasi co-location property different from that of the highest-priority CORESET. In this case, the solutions for selecting a highest-priority CORESET provided in the embodiments of this application may be used for selection.

In a possible implementation of the third aspect or the fourth aspect, after the highest-priority CORESET is determined, the method further includes: discarding, from the PDCCH MO set, a PDCCH MO associated with a CORESET having a quasi co-location property different from that of the highest-priority CORESET.

In a possible implementation of the third aspect or the fourth aspect, if only one of the M CORESETs is associated with a common search space set CSS, the highest-priority CORESET is the CORESET associated with the CSS in the M CORESETs.

In a possible implementation of the third aspect or the fourth aspect, if K CORESETs in the M CORESETs are associated with common search space sets CSSs, K is a positive integer not greater than M, and K cell identifiers associated with the K CORESETs are all the same, the highest-priority CORESET is a CORESET associated with a smallest common search space set identifier in the K CORESETs.

In a possible implementation of the third aspect or the fourth aspect, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is the CORESET associated with the smallest cell identifier in the K CORESETs.

In a possible implementation of the third aspect or the fourth aspect, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest common search space set identifier in the CORESETs associated with the smallest cell identifier in the K CORESETs.

In a possible implementation of the third aspect or the fourth aspect, if none of the M CORESETs is associated with a common search space set CSS, and M cell identifiers associated with the M CORESETs are all the same, the highest-priority CORESET is a CORESET associated with a smallest UE-specific search space set identifier in the M CORESETs.

In a possible implementation of the third aspect or the fourth aspect, if none of the M CORESETs is associated with a common search space set CSS, cell identifiers associated with at least two of the M CORESETs are different, and a smallest cell identifier in M cell identifiers associated with the M CORESETs is associated with only one of the M CORESETs, the highest-priority CORESET is the CORESET associated with the smallest cell identifier in the M CORESETs.

In a possible implementation of the third aspect or the fourth aspect, if none of the M CORESETs is associated with a common search space set CSS, cell identifiers associated with at least two of the M CORESETs are different, and a smallest cell identifier in M cell identifiers associated with the M CORESETs is associated with at least two of the M CORESETs, the highest-priority CORESET is a CORESET associated with a smallest UE-specific search space set identifier in the CORESETs associated with the smallest cell identifier in the M CORESETs.

According to a fifth aspect, an embodiment of this application provides a communication method, including: A terminal device receives configuration information, where the configuration information is used to indicate one or more of cell identifiers, quasi co-location properties, search space set types, and search space set identifiers that are associated with T control-resource sets CORESETs in a first time unit. The terminal device sorts N physical downlink control channel monitoring occasions PDCCH MOs in the first time unit based on one or more of time domain information of the N PDCCH MOs, search space set types associated with CORESETs associated with the N PDCCH MOs, and search space set identifiers associated with the CORESETs associated with the N PDCCH MOs, where N is an integer greater than 1. The terminal device performs a first preset operation for the sorted N PDCCH MOs; determines a PDCCH MO corresponding to the first time unit after performing the first preset operation; and monitors a PDCCH on a CORESET associated with the PDCCH MO corresponding to the first time unit after performing the first preset operation.

The first preset operation includes; for an $i^{th}$ PDCCH MO and an $(i+k)^{th}$ PDCCH MO in the N PDCCH MOs, where both i and k are positive integers not greater than N, and a value of i+k is a positive integer not greater than N, if the $i^{th}$ PDCCH MO and the $(i+k)^{th}$ PDCCH MO in the N PDCCH MOs have an overlapping second time unit in time domain and associated CORESETs have different quasi co-location properties, selecting a highest-priority CORESET from the CORESET associated with the $i^{th}$ PDCCH MO and the CORESET associated with the $(i+k)^{th}$ PDCCH MO based on one or more of a cell identifier, a search space set type, and a search space set identifier that are associated with the CORESET associated with the $i^{th}$ PDCCH MO and one or more of a cell identifier, a search space set type, and a search space set identifier that are associated with the CORESET associated with the $(i+k)^{th}$ PDCCH MO; and discarding, from the $i^{th}$ PDCCH MO and the $(i+k)^{th}$ PDCCH MO, a PDCCH MO other than a PDCCH MO associated with the highest-priority CORESET. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this implementation, because PDCCH MOs in one first time unit are sorted, monitoring is performed after all the PDCCH MOs are determined, so that efficiency of monitoring the PDCCH MOs can be improved.

According to a sixth aspect, an embodiment of this application provides a communication method, including: A network device generates configuration information, and sends the configuration information, where the configuration information is used to indicate one or more of cell identifiers, quasi co-location properties, search space set types, and search space set identifiers that are associated with T control-resource sets CORESETs in a first time unit. The network device sorts N physical downlink control channel monitoring occasions PDCCH MOs in the first time unit based on one or more of time domain information of the N PDCCH MOs, search space set types associated with CORESETs associated with the N PDCCH MOs, and search space set identifiers associated with the CORESETs associated with the N PDCCH MOs, where N is an integer greater than 1. The network device performs a first preset operation for the sorted N PDCCH MOs; and determines a PDCCH MO corresponding to the first time unit after performing the first preset operation.

The first preset operation includes: For an $i^{th}$ PDCCH MO and an $(i+k)^{th}$ PDCCH MO in the N PDCCH MOs, where both i and k are positive integers not greater than N, and a value of i+k is a positive integer not greater than N, if the $i^{th}$ PDCCH MO and the $(i+k)^{th}$ PDCCH MO in the N PDCCH MOs have an overlapping second time unit in time domain and associated CORESETs have different quasi co-location properties, where both i and k are positive integers not greater than N, the network device selects a highest-priority CORESET from the CORESET associated with the $i^{th}$ PDCCH MO and the CORESET associated with the $(i+k)^{th}$ PDCCH MO based on one or more of a cell identifier, a search space set type, and a search space set identifier that are associated with the CORESET associated with the $i^{th}$ PDCCH MO and one or more of a cell identifier, a search space set type, and a search space set identifier that are associated with the CORESET associated with the $(i+k)^{th}$ PDCCH MO; and discards, from the $i^{th}$ PDCCH MO and the $(i+k)^{th}$ PDCCH MO, a PDCCH MO other than the PDCCH MO associated with the highest-priority CORESET. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this implementation, because PDCCH MOs in one first time unit are sorted, monitoring is performed after all the PDCCH MOs are determined, so that efficiency of monitoring the PDCCH MOs can be improved.

In a possible implementation of the fifth aspect or the sixth aspect, the time domain information of the N PDCCH MOs includes a start symbol and duration of each of the N PDCCH MOs. For two of the N PDCCH MOs, if the start symbols of the two PDCCH MOs are different, a PDCCH MO with an earlier start symbol has a higher priority.

In a possible implementation of the fifth aspect or the sixth aspect, for two of the N PDCCH MOs, if the start symbols of the two PDCCH MOs are the same, a PDCCH MO with longer duration has a higher priority.

In a possible implementation of the fifth aspect or the sixth aspect, for two of the N PDCCH MOs, if the two PDCCH MOs have a same start symbol and same duration, two CORESETs associated with the two PDCCH MOs are both associated with common search space sets CSSs, and two cell identifiers associated with the two CORESETs associated with the two PDCCH MOs are the same, a PDCCH MO associated with a CORESET associated with a smaller CSS identifier has a higher priority.

In a possible implementation of the fifth aspect or the sixth aspect, for two of the N PDCCH MOs, if the two PDCCH MOs have a same start symbol and same duration, two CORESETs associated with the two PDCCH MOs are both associated with common search space sets CSSs, and two cell identifiers associated with the two CORESETs associated with the two PDCCH MOs are different, a PDCCH MO associated with a CORESET associated with a smaller cell identifier has a higher priority.

In a possible implementation of the fifth aspect or the sixth aspect, for two of the N PDCCH MOs, if the two PDCCH MOs have a same start symbol and same duration, and only one of two CORESETs associated with the two PDCCH MOs is associated with a common search space set CSS, a PDCCH MO associated with the CORESET associated with the CSS has a higher priority.

In a possible implementation of the fifth aspect or the sixth aspect, for two of the N PDCCH MOs, if the two PDCCH MOs have a same start symbol and same duration, none of two CORESETs associated with the two PDCCH MOs is associated with a common search space set CSS, and two cell identifiers associated with the two CORESETs associated with the two PDCCH MOs are the same, a PDCCH MO associated with a CORESET associated with a smaller USS identifier has a higher priority.

In a possible implementation of the fifth aspect or the sixth aspect, for two of the N PDCCH MOs, if the two PDCCH MOs have a same start symbol and same duration, none of two CORESETs associated with the two PDCCH MOs is associated with a common search space set CSS, and two cell identifiers associated with the two CORESETs associated with the two PDCCH MOs are different, a PDCCH MO associated with a CORESET associated with a smaller cell identifier has a higher priority.

In a possible implementation of the fifth aspect or the sixth aspect, if only one of the CORESET associated with the $i^{th}$ PDCCH MO and the CORESET associated with the $(i+k)^{th}$ PDCCH MO is associated with a CSS, the highest-priority CORESET is the CORESET associated with the CSS.

In a possible implementation of the fifth aspect or the sixth aspect, if both the CORESET associated with the $i^{th}$ PDCCH MO and the CORESET associated with the $(i+k)^{th}$ PDCCH MO are associated with CSSs, and a cell identifier associated with the CORESET associated with the $i^{th}$ PDCCH MO is the same as that of the CORESET associated with the $(i+k)^{th}$ PDCCH MO, the highest-priority CORESET is a CORESET associated with a smaller common search space set identifier.

In a possible implementation of the fifth aspect or the sixth aspect, if both the CORESET associated with the $i^{th}$ PDCCH MO and the CORESET associated with the $(i+k)^{th}$ PDCCH MO are associated with CSSs, and a cell identifier associated with the CORESET associated with the $i^{th}$ PDCCH MO is different from that of the CORESET associated with the $(i+k)^{th}$ PDCCH MO, the highest-priority CORESET is a CORESET associated with a smaller cell identifier.

In a possible implementation of the fifth aspect or the sixth aspect, if none of the CORESET associated with the $i^{th}$ PDCCH MO and the CORESET associated with the $(i+k)^{th}$ PDCCH MO is associated with a CSS, and a cell identifier associated with the CORESET associated with the $i^{th}$ PDCCH MO is the same as that of the CORESET associated with the $(i+k)^{th}$ PDCCH MO, the highest-priority CORESET is a CORESET associated with a smaller UE-specific search space set identifier.

In a possible implementation of the fifth aspect or the sixth aspect, if none of the CORESET associated with the $i^{th}$ PDCCH MO and the CORESET associated with the $(i+k)^{th}$ PDCCH MO is associated with a CSS, and a cell identifier associated with the CORESET associated with the $i^{th}$ PDCCH MO is different from that of the CORESET associated with the $(i+k)^{th}$ PDCCH MO, the highest-priority CORESET is a CORESET associated with a smaller cell identifier.

According to a seventh aspect, an embodiment of this application provides a communication method, including: A terminal device receives configuration information, where the configuration information is used to indicate one or more of cell identifiers, quasi co-location properties, search space set types, and search space set identifiers that are associated with T control-resource sets CORESETs in a first time unit. The terminal device performs a second preset operation for a PDCCH MO corresponding to each time-domain symbol in the first time unit; determines a PDCCH MO corresponding to the first time unit after performing the second preset operation; and monitors a PDCCH on a CORESET associated with the PDCCH MO corresponding to the first time unit after performing the second preset operation.

The second preset operation includes: if the time-domain symbol is corresponding to a plurality of PDCCH MOs, the plurality of PDCCH MOs have an overlapping second time unit in time domain, and CORESETs associated with any two of the plurality of PDCCH MOs have different quasi co-location properties, determining, based on one or more of cell identifiers, search space set types, and search space set identifiers that are associated with M control-resource sets CORESETs corresponding to the time-domain symbol, a highest-priority CORESET corresponding to the time-domain symbol in the M CORESETs; and discarding, from the PDCCH MOs corresponding to the time-domain symbol, a PDCCH MO that has an overlapping second time unit with at least one PDCCH MO associated with the highest-priority CORESET corresponding to the time-domain symbol in time domain and whose associated CORESET has a different quasi co-location property. The time-domain symbol is corresponding to the plurality of physical downlink control channel monitoring occasions PDCCH MOs, the plurality of PDCCH MOs are associated with the M CORESETs, M is a positive integer, one of the plurality of PDCCH MOs is associated with one of the M CORESETs, and one of the M CORESETs is associated with one or more of the plurality of PDCCH MOs. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this implementation, monitoring is performed after all PDCCH MOs of each time-domain symbol are determined, so that efficiency of monitoring the PDCCH MOs can be improved.

According to an eighth aspect, an embodiment of this application provides a communication method, including: A network device generates configuration information, and sends the configuration information, where the configuration information is used to indicate one or more of cell identifiers, quasi co-location properties, search space set types, and search space set identifiers that are associated with T control-resource sets CORESETs in a first time unit. The network device performs a second preset operation for a PDCCH MO corresponding to each time-domain symbol in the first time unit included in the configuration information; and determines a PDCCH MO corresponding to the first time unit after performing the second preset operation.

The second preset operation includes: if the time-domain symbol is corresponding to a plurality of PDCCH MOs, the plurality of PDCCH MOs have an overlapping second time unit in time domain, and CORESETs associated with any two of the plurality of PDCCH MOs have different quasi co-location properties, determining, based on one or more of cell identifiers, search space set types, and search space set identifiers that are associated with M control-resource sets CORESETs corresponding to the time-domain symbol, a highest-priority CORESET corresponding to the time-domain symbol in the M CORESETs; and discarding, from the PDCCH MOs corresponding to the time-domain symbol, a PDCCH MO that has an overlapping second time unit with a PDCCH MO associated with the highest-priority CORESET corresponding to the time-domain symbol in time domain and whose associated CORESET has a different quasi co-location property. The time-domain symbol is corresponding to the plurality of physical downlink control channel monitoring occasions PDCCH MOs, the plurality of PDCCH MOs are associated with the M CORESETs, M is a positive integer, one of the plurality of PDCCH MOs is associated with one of the M CORESETs, and one of the M CORESETs is associated with one or more of the plurality of PDCCH MOs. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this implementation, monitoring is performed after all PDCCH MOs of each time-domain symbol are determined, so that efficiency of monitoring the PDCCH MOs can be improved.

In a possible implementation of the seventh aspect or the eighth aspect, if only one of the M CORESETs is associated with a common search space set CSS, the highest-priority CORESET is the CORESET associated with the CSS in the M CORESETs.

In a possible implementation of the seventh aspect or the eighth aspect, if K CORESETs in the M CORESETs are associated with common search space sets CSSs, K is a positive integer not greater than M, and K cell identifiers associated with the K CORESETs are all the same, the highest-priority CORESET is a CORESET associated with a smallest common search space set identifier in the K CORESETs.

In a possible implementation of the seventh aspect or the eighth aspect, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is the CORESET associated with the smallest cell identifier in the K CORESETs.

In a possible implementation of the seventh aspect or the eighth aspect, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest common search space set identifier in the CORESETs associated with the smallest cell identifier in the K CORESETs.

In a possible implementation of the seventh aspect or the eighth aspect, if none of the M CORESETs is associated with a common search space set CSS, and M cell identifiers associated with the M CORESETs are all the same, the highest-priority CORESET is a CORESET associated with a smallest UE-specific search space set identifier in the M CORESETs.

In a possible implementation of the seventh aspect or the eighth aspect, if none of the M CORESETs is associated with a common search space set CSS, cell identifiers associated with at least two of the M CORESETs are different, and a smallest cell identifier in M cell identifiers associated with the M CORESETs is associated with only one of the M CORESETs, the highest-priority CORESET is the CORESET associated with the smallest cell identifier in the M CORESETs.

In a possible implementation of the seventh aspect or the eighth aspect, if none of the M CORESETs is associated with a common search space set CSS, cell identifiers associated with at least two of the M CORESETs are different, and a smallest cell identifier in M cell identifiers associated with the M CORESETs is associated with at least two of the M CORESETs, the highest-priority CORESET is a CORESET associated with a smallest UE-specific search space set identifier in the CORESETs associated with the smallest cell identifier in the M CORESETs.

According to a ninth aspect, an embodiment of this application provides a communication method, including: A terminal device receives configuration information delivered by a network device, where a PDCCH MO indicated by the configuration information meets a scenario other than a preset scenario. The terminal device monitors a PDCCH on a CORESET indicated by the configuration information. The preset scenario includes: A first PDCCH MO and a second PDCCH MO have an overlapping second time unit in time domain and associated CORESETs have different quasi co-location properties, the first PDCCH MO and a fifth PDCCH MO have an overlapping second time unit in time domain and associated CORESETs have different quasi co-location properties, and the second PDCCH MO and the fifth PDCCH MO do not have an overlapping second time unit in time domain. The first PDCCH MO, the second PDCCH MO, and the fifth PDCCH MO are any three different PDCCH MOs that are configured for the terminal device and indicated by the configuration information. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

According to a tenth aspect, an embodiment of this application provides a communication method, including: A network device generates, based on a preset scenario, configuration information of a PDCCH MO meeting a scenario other than the preset scenario. The network device sends the configuration information. The preset scenario includes: A first PDCCH MO and a second PDCCH MO have an overlapping second time unit in time domain and associated CORESETs have different quasi co-location properties, the first PDCCH MO and a fifth PDCCH MO have an overlapping second time unit in time domain and associated CORESETs have different quasi co-location properties, and the second PDCCH MO and the fifth PDCCH MO do not have an overlapping second time unit in time domain. The first PDCCH MO, the second PDCCH MO, and the fifth PDCCH MO are any three different PDCCH MOs that are configured for the terminal device and indicated by the configuration information. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

According to an eleventh aspect, an embodiment of this application provides a communication method, including: A terminal device receives configuration information delivered by a network device, where a PDCCH MO indicated by the configuration information meets a first target scenario. The terminal device monitors a PDCCH on a CORESET indicated by the configuration information. The first target scenario includes: A first PDCCH MO and a second PDCCH MO are any two different PDCCH MOs that are configured for the terminal device and indicated by the configuration information, the first PDCCH MO and the second PDCCH MO have an overlapping second time unit in time domain and associated CORESETs have different quasi co-location properties, and the first PDCCH MO and the second PDCCH MO meet any one or more of the following conditions:

the first PDCCH MO and the second PDCCH MO have a same start time-domain symbol;
  the first PDCCH MO and the second PDCCH MO have a same end time-domain symbol;
  the first PDCCH MO and the second PDCCH MO have a same start time-domain symbol, and a CORESET associated with the first PDCCH MO and a CORESET associated with the second PDCCH MO have same duration; or
  the first PDCCH MO and the second PDCCH MO have a same end time-domain symbol, and a CORESET associated with the first PDCCH MO and a CORESET associated with the second PDCCH MO have same duration.

In this solution, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

According to a twelfth aspect, an embodiment of this application provides a communication method, including: A network device generates, based on a first target scenario, configuration information of a PDCCH MO meeting the first target scenario. The network device sends the configuration information. The first target scenario includes: A first PDCCH MO and a second PDCCH MO are any two different PDCCH MOs that are configured for the terminal device and indicated by the configuration information, the first PDCCH MO and the second PDCCH MO have an overlapping second time unit in time domain and associated CORESETs have different quasi co-location properties, and the first PDCCH MO and the second PDCCH MO meet any one or more of the following conditions:

the first PDCCH MO and the second PDCCH MO have a same start time-domain symbol;

the first PDCCH MO and the second PDCCH MO have a same end time-domain symbol;

the first PDCCH MO and the second PDCCH MO have a same start time-domain symbol, and a CORESET associated with the first PDCCH MO and a CORESET associated with the second PDCCH MO have same duration; or the first PDCCH MO and the second PDCCH MO have a same end time-domain symbol, and a CORESET associated with the first PDCCH MO and a CORESET associated with the second PDCCH MO have same duration.

In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

According to a thirteenth aspect, an embodiment of this application provides a communication method, including: A terminal device receives configuration information delivered by a network device, where a PDCCH MO indicated by the configuration information meets a second target scenario. The terminal device monitors a PDCCH on a CORESET indicated by the configuration information. The second target scenario includes: A maximum of two different quasi co-location properties exist in quasi co-location properties of CORESETs associated with PDCCH MOs configured in an active bandwidth part. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

According to a fourteenth aspect, an embodiment of this application provides a communication method, including: A network device generates, based on a second target scenario, configuration information of a PDCCH MO meeting a first target scenario. The network device sends the configuration information. The second target scenario includes: A maximum of two different quasi co-location properties exist in quasi co-location properties of CORESETs associated with PDCCH MOs configured in an active bandwidth part. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

Corresponding to any communication method in the first aspect to the fourteenth aspect, this application further provides a communication apparatus. The communication apparatus may be any transmit end device or receive end device that performs data transmission in a wireless manner, for example, a communication chip, a terminal device, or a network device (for example, a base station). In a communication process, the transmit end device is relative to the receive end device. In some communication processes, the communication apparatus may be used as the foregoing network device or a communication chip that may be used in the network device. In some communication processes, the communication apparatus may be used as the foregoing terminal device or a communication chip that may be used in the terminal device.

According to a fifteenth aspect, a communication apparatus is provided. The communication apparatus includes a transceiver unit and a processing unit, to perform any implementation of any communication method in the first aspect to the fourteenth aspect. The transceiver unit is configured to perform functions related to sending and receiving. Optionally, the transceiver unit includes a receiving unit and a sending unit. In a design, the communication apparatus is a communication chip, and the transceiver unit may be an input/output circuit or a port of the communication chip.

In another design, the transceiver unit may be a transmitter and a receiver, or the transceiver unit may be a transmitter machine and a receiver machine.

Optionally, the communication apparatus further includes modules that may be configured to perform any implementation of any communication method in the first aspect to the fourteenth aspect.

According to a sixteenth aspect, a communication apparatus is provided. The communication apparatus is the foregoing terminal device or network device. The communication apparatus includes a processor and a memory. Optionally, the communication apparatus further includes a transceiver. The memory is configured to store a computer program or instructions. The processor is configured to invoke and run the computer program or the instructions from the memory. When the processor executes the computer program or the instructions in the memory, the communication apparatus is enabled to perform any implementation of any communication method in the first aspect to the fourteenth aspect.

Optionally, there are one or more processors, and there are one or more memories.

Optionally, the memory may be integrated with the processor, or the memory and the processor are disposed separately.

Optionally, the transceiver may include a transmitter machine (transmitter) and a receiver machine (receiver).

According to a seventeenth aspect, a communication apparatus is provided, and includes a processor. The processor is coupled to a memory, and may be configured to perform the method in any one of the first aspect to the fourteenth aspect, and any one of the possible implementations of the first aspect to the fourteenth aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface. Optionally, the transceiver may be a transceiver circuit. Optionally, the input/output interface may be an input/output circuit.

In another implementation, the communication apparatus is a network device. When the communication apparatus is the network device, the communication interface may be a transceiver or an input/output interface. Optionally, the transceiver may be a transceiver circuit. Optionally, the input/output interface may be an input/output circuit.

In still another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to an eighteenth aspect, a system is provided. The system includes the foregoing terminal device and network device.

According to a nineteenth aspect, a computer program product is provided. The computer program product includes a computer program (which may also be referred to as code or an instruction). When the computer program is run, a computer is enabled to perform the method in any possible implementation of the first aspect, or the computer is enabled to perform the method in any one of the implementations of the first aspect to the fourteenth aspect.

According to a twentieth aspect, a computer-readable storage medium is provided. The computer-readable medium stores a computer program (which may also be referred to as code or an instruction). When the computer program is run on a computer, the computer is enabled to perform the method in any possible implementation of the first aspect, or the computer is enabled to perform the method in any one of the implementations of the first aspect to the fourteenth aspect.

According to a twenty-first aspect, a processing apparatus is provided, and includes an input circuit, an output circuit, and a processing circuit. The processing circuit is configured to receive a signal by using the input circuit, and transmit a signal by using the output circuit, so that the method in any one of the first aspect to the fourteenth aspect and any one of the possible implementations of the first aspect to the fourteenth aspect is implemented.

In a specific implementation process, the processing apparatus may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in the embodiments of this application.

DESCRIPTION OF EMBODIMENTS

Figure 1:
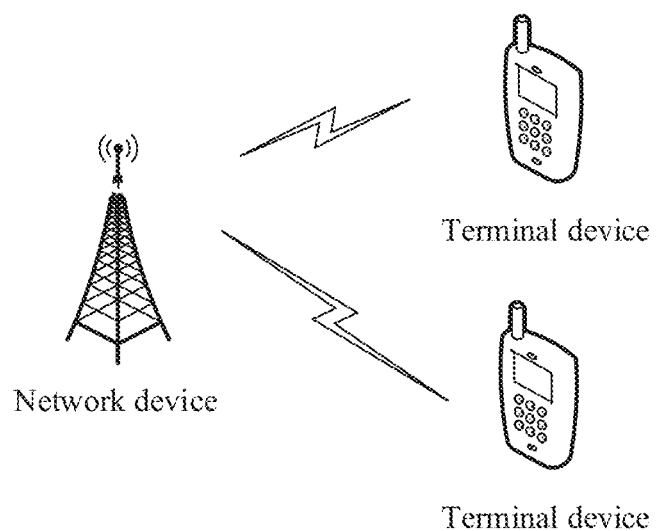
FIG. 1 is a schematic diagram of a possible system architecture to which an embodiment of this application is applicable.

FIG. 1 is a schematic diagram of a possible system architecture to which an embodiment of this application is applicable. The system architecture shown in FIG. 1 includes a network device and a terminal device. It should be understood that, a quantity of network devices and a quantity of terminal devices in the system architecture are not limited in embodiments of this application. Moreover, in addition to the network device and the terminal device, the system architecture to which the embodiments of this application are applicable may further include other devices such as a core network device, a wireless relay device, and a wireless backhaul device. This is not limited in the embodiments of this application either. In addition, the network device in the embodiments of this application may integrate all functions into one independent physical device, or may distribute the functions on a plurality of independent physical devices. This is not limited in the embodiments of this application either. In addition, the terminal device in the embodiments of this application may be connected to the network device in a wireless manner.

Technical solutions of the embodiments of this application may be applied to various communication systems, for example, a global system for mobile communications (Global System of Mobile Communication, GSM for short) system, a code division multiple access (Code Division Multiple Access, CDMA for short) system, a wideband code division multiple access (Wideband Code Division Multiple Access, WCDMA for short) system, a general packet radio service (General Packet Radio Service, GPRS for short) system, a long term evolution (Long Term Evolution, LTE for short) system, an LTE frequency division duplex (Frequency Division Duplex, FDD for short) system, an LTE time division duplex (Time Division Duplex, TDD for short), a universal mobile telecommunications system (Universal Mobile Telecommunication System, UMTS for short), a worldwide interoperability for microwave access (Worldwide Interoperability for Microwave Access, or WiMAX for short) communication system, and a 5G communication system.

The following describes terms and related technologies in the embodiments of this application.

The terminal device includes a device that provides a user with voice and/or data connectivity, for example, may include a handheld device having a wireless connection function, or a processing device connected to a wireless modem. The terminal device may communicate with a core network through a radio access network (radio access network, RAN), and exchange voice and/or data with the RAN. The terminal device may include user equipment (user equipment, UE), a wireless terminal device, a mobile terminal device, a device-to-device communication (device-to-device, a D2D) terminal device, a V2X terminal device, a machine-to-machine/machine-type communications (machine-to-machine/machine-type communications, M2M/MTC) terminal device, an internet of things (Internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device is a device such as a personal communications service (personal communication service, PCS) phone, a cordless phone, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with low power consumption, a device with a limited storage capability, or a device with a limited computing capability. For example, the terminal device includes an information sensing device, such as a barcode, radio frequency identification (radio frequency identification, RFID), a sensor, a global positioning system (global positioning system, GPS), or a laser scanner.

The network device includes an access network (access network, AN) device, for example, a base station (for example, an access point), and may be a device that is in an access network and that communicates with a wireless terminal device over an air interface by using one or more cells. The base station may be configured to mutually convert a received over-the-air frame and an internet protocol (LP) packet, and serve as a router between the terminal device and a rest part of the access network, where the rest part of the access network may include an IP network. An RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolutional Node B) in an LTE system or a long term evolution-advanced (long term evolution-advanced, LTE-A) system, may include a next generation NodeB (next generation node B, gNB) in a 5th generation (the $5^{th}$ generation, 5G) mobile communication technology or new radio (new radio, NR) system, or may include a centralized unit (centralized unit, CU) and a distributed unit (distributed unit, DU) in a cloud access network (cloud radio access network, Cloud RAN) system. This is not limited in the embodiments of this application.

A downlink control channel is, for example, a PDCCH, an enhanced physical downlink control channel (enhanced physical downlink control channel, ePDCCH), or another downlink control channel, and is not specifically limited. In the embodiments of this application, an example in which the downlink control channel is a PDCCH is mainly used for description.

A symbol, which may also be referred to as a time-domain symbol, includes but is not limited to an orthogonal frequency division multiplexing (orthogonal frequency division multiplexing, OFDM) symbol, a sparse code division multiple access (sparse code multiplexing access, SCMA) symbol, a filtered orthogonal frequency division multiplexing (filtered orthogonal frequency division multiplexing, F-OFDM) symbol, and a non-orthogonal multiple access (non-orthogonal multiple access, NOMA) symbol. This may be specifically determined based on an actual situation, and details are not described herein.

A slot occupies a plurality of consecutive OFDM symbols in time domain. For example, in LTE, one slot occupies six or seven consecutive OFDM symbols in time domain. In NR, one slot occupies 14 consecutive OFDM symbols (normal cyclic prefixes) or 12 consecutive OFDM symbols (extended cyclic prefixes) in time domain.

First time unit: The first time unit described in the embodiments of this application may refer to one or more time-domain symbols. When one first time unit occupies a plurality of time-domain symbols, the plurality of time-domain symbols may be consecutive or inconsecutive in time domain. The plurality of time-domain symbols may be time-domain symbols in one slot, or may be time-domain symbols in a plurality of slots. For ease of understanding, in the embodiments of this application, an example in which one first time unit is a slot occupying 14 OFDM symbols is used for description.

Second time unit: The second time unit described in the embodiments of this application may refer to one or more time-domain symbols. When one second time unit occupies a plurality of time-domain symbols, the plurality of time-domain symbols may be consecutive or inconsecutive in time domain. The plurality of time-domain symbols may be time-domain symbols in one slot, or may be time-domain symbols in a plurality of slots. For ease of understanding, in the embodiments of this application, an example in which one second time unit is an OFDM symbol is used for description.

Configuration information in the embodiments of this application includes related information of a PDCCH MO configured for the terminal device. For example, the configuration information is used to indicate one or more of cell identifiers, quasi co-location properties, search space set types, and search space set identifiers that are associated with T control-resource sets CORESETs in a first time unit. One PDCCH MO includes a start symbol of monitoring and monitoring duration. The start symbol of monitoring (which is also referred to as a start symbol in some embodiments of this application) is configuration information of a search space set, and is jointly determined by using three pieces of higher layer signaling. Higher layer signaling monitoringSymbolsWithinSlot indicates a start symbol location of a search space set associated with 14 OFDM symbols in a slot; a higher layer parameter monitoringSlotPeriodicityAndOffset indicates a slot-level periodicity and offset of the associated search space set; higher layer signaling duration indicates a quantity of consecutive slots in which the associated search space set appears. Therefore, one search space set may appear for a plurality of times in one slot, or may appear once in several slots. The monitoring duration is duration of the CORESETs associated with the search space set.

Control-resource set (control-resource set, CORESET): One CORESET includes a plurality of physical resource blocks (physical resource blocks, PRBs) in frequency domain, and includes one or several consecutive symbols in time domain, where these symbols may be located at any location in a slot. Transmission of a PDCCH is performed in the CORESET.

Search space set (search space set, SS set): In a 5G communication system, to better control complexity of blind detection on a downlink control channel, the network device may configure one or more search space sets for the terminal device.

In the embodiments of this application, there are two types of search space sets: a common search space set (common search space set, CSS) and a UE-specific search space set (UE-specific search space set, USS). In the embodiments of this application, the common search space set is also written as CSS, and UE-specific search space set is written as USS. Cells in the embodiments of this application may include a primary cell and a secondary cell. The primary cell is usually configured with a common search space set, or may be configured with a common search space set and a UE-specific search space set. The secondary cell may be configured with a common search space set, or may be configured with a common search space set and a UE-specific search space set. In some cases, the secondary cell may be configured with only a UE-specific search space set.

When the network device configures a search space set for the terminal device, the network device configures a search space set identifier for each search space set. The search space set identifier may also be referred to as an index number of the search space set. When the search space set is a common search space set, the search space set is a common search space set identifier. When the search space set is a UE-specific search space set, the search space set is a UE-specific search space set identifier.

A cell in the embodiments of this application may be, for example, a cell covered by a base station. The cell is an area that provides a wireless communication service for a user, and is a fundamental unit of a wireless network. For example, in NR, an NR cell resource is added by running MML commands, ADD NRCELL and ADD NRDUCELL. A network side device may configure a plurality of cells for a terminal side device, where there is one cell used to initiate initial access, the cell is referred to as a primary cell, and other cells become secondary cells. All cells are covered by the entire wireless network. It should be noted that, in the embodiments of this application, a search space set identifier configured in each cell is separately labeled. For example, the search space set identifier may be a search space set 1, a search space set 2, or a search space set 3. In this case, the identifiers "search space set 1, search space set 2, and search space set 3" may be configured for three search spaces in a cell 1, or the identifiers "search space set 1, search space set 2, and search space set 3" may be configured for three search spaces in a cell 2. That is, a same search space set identifier may appear in different cells. In other words, different cell identifiers may be associated with a same search space set identifier.

In the embodiments of this application, in a cell, one search space set may be associated with one or more PDCCH MOs, and one PDCCH MO is associated with one search space set. One CORESET may be associated with one or more PDCCH MOs, and one PDCCH MO is associated with one search space set. That is, two PDCCH MOs in one cell may be associated with a same CORESET, and two PDCCH MOs in one cell may be associated with a same search space set.

The search space set includes a candidate PDCCH, and the candidate PDCCH is located in a corresponding CORESET. Therefore, the search space set identifier is the associated with an index number of the CORESET in which the candidate PDCCH included in the search space set is located (where the index number of the CORESET may also be referred to as a CORESET identifier), and the CORESET associated with the search space set determines an index of a control channel element (control-channel element, CCE) in which the candidate PDCCH of the search space set is located in the CORESET.

In time domain, the terminal device monitors a candidate PDCCH in a search space set at a specific time interval. Therefore, some pieces of time domain information, such as a monitoring periodicity (namely, a time interval for monitoring each search space set, and a unit of the time interval is slot), a slot offset (namely, an amount of slot offset between a moment at which the monitoring periodicity starts and a moment at which the search space set is actually detected, and the amount of slot offset is less than a value of the monitoring periodicity), a quantity of slots (namely, a quantity of slots for continuously monitoring the search space set, and the quantity of slots is less than the value of the monitoring periodicity), and a symbol location (namely, a location of a start symbol of a CORESET associated with the search space set in each slot), may be configured for the search space set.

Figure 2:
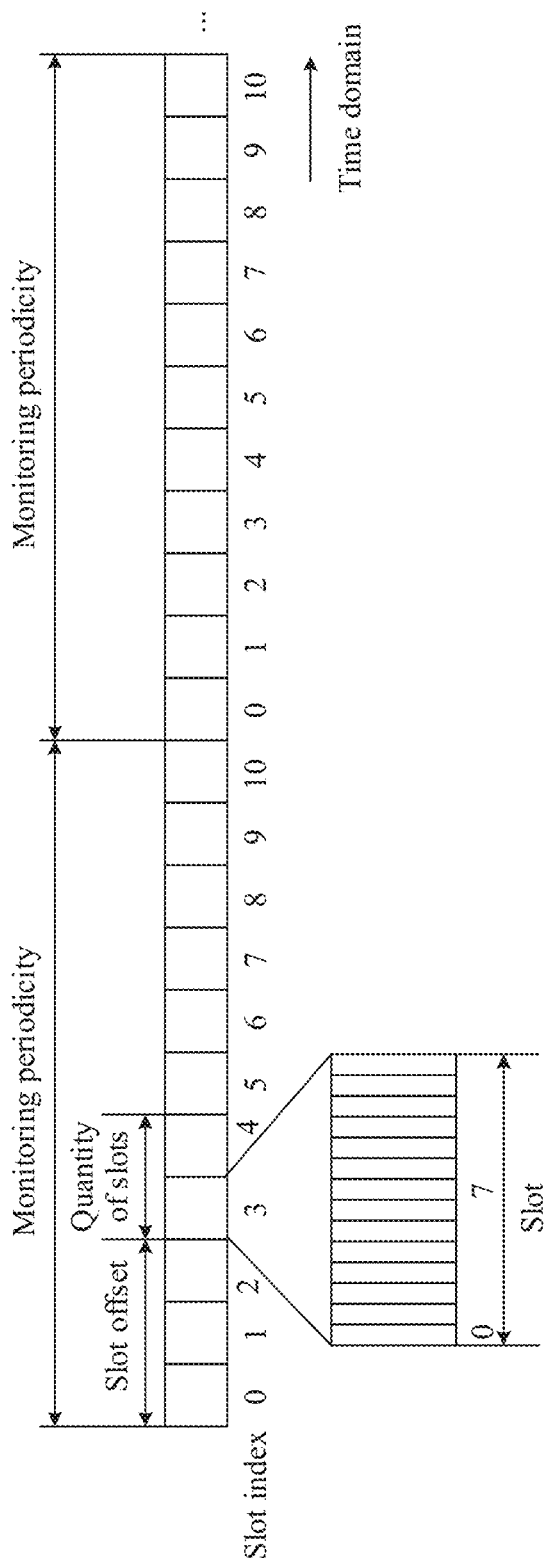
FIG. 2 is a schematic diagram of a CORESET in a time domain direction according to an embodiment of this application.

For ease of understanding, specific examples are used to describe meanings of various parameters. FIG. 2 shows an example of a schematic diagram of a CORESET in a time domain direction. As shown in FIG. 2, a monitoring periodicity includes 10 slots, a slot offset is three slots, a quantity of slots is 2, a CORESET associated with a search space set is a CORESET that occupies two symbols, and symbol locations are symbols 0 and 7 in a slot. In this example, the terminal device monitors a candidate PDCCH of the search space set in the CORESET in symbols 0 and 7 in slots 3 and 4 in each monitoring periodicity of 10 slots, and the CORESET occupies two symbols in time domain.

Figure 3:
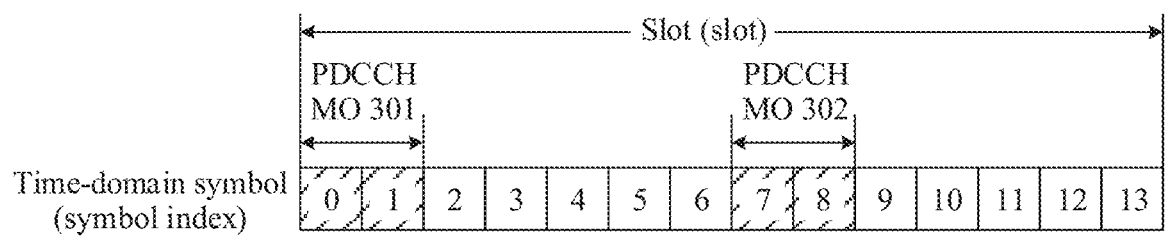
FIG. 3 is a schematic diagram of a monitoring occasion in a slot 3 or a slot 4 in FIG. 2.

A physical downlink control channel monitoring occasion (Physical Downlink Control Channel Monitoring Occasion, PDCCH MO) indicates a start symbol for monitoring a search space set and a duration length. FIG. 3 shows an example of a schematic diagram of a monitoring occasion in a slot 3 or a slot 4 in FIG. 2. As shown in FIG. 3, a physical downlink control channel monitoring occasion (Physical Downlink Control Channel Monitoring Occasion, PDCCH MO) 301 occupies symbols 0 and 1, and a PDCCH MO 302 occupies symbols 7 and 8. The CORESET is a concept that has a frequency domain width (in the unit of RB) and a time domain duration length (in the unit of OFDM symbol). After one SS set is associated with one CORESET, a concept of a PDCCH MO corresponding to the SS set can be determined. FIG. 3 may be described as follows: One search space set has start symbols, a time-domain symbol 0 and a time-domain symbol 7, of two PDCCH MO in one slot. The search space set is associated with one CORESET that lasts for two symbols in time domain, that is, duration of the two PDCCH MOs is two symbols.

That two PDCCH MOs described in the embodiments of this application overlap in time domain specifically means that the two PDCCH MOs have an overlapping second time unit in time domain. When the second time unit is one time-domain symbol, this specifically means that at least one time-domain symbol is occupied by both the two PDCCH MOs in time domain. Similarly, that a plurality of PDCCH MOs described in the embodiments of this application have an overlapping second time unit in time domain specifically means that at least one time-domain symbol is shared by the plurality of PDCCH MOs in time domain.

Quasi co-location (quasi co-located, QCL) attribute: A definition of QCL in an NR protocol is: If a large-scale property of a channel of a symbol transmitted over one antenna port may be derived from a channel of a symbol transmitted over another antenna port, the two antenna ports are quasi co-located. The two antenna ports may be described to have a quasi co-location property, or the two antenna ports may be described to have a quasi co-location relationship.

A QCL relationship is used to indicate that a plurality of resources have one or more same or similar communication features. For a plurality of resources having a QCL relationship, a same or similar communication configuration may be used. For example, two signals are transmitted from two different antenna ports and experience a same large-scale property. In this case, it may be considered that the two antenna ports have a QCL relationship. Therefore, a channel large-scale property/channel estimation result of transmitting one symbol by one port may be derived from a channel large-scale property of transmitting one symbol by another port. This is beneficial for processing by a receiver. The large-scale property includes one or more delay spreads (delay spreads), Doppler spreads (Doppler spreads), Doppler shifts, average gains, average delays (average delays), and spatial reception parameters (spatial Rx parameters). The QCL may include four types (Types): QCL-TypeA, QCL-TypeB, QCL-TypeC, and QCL-TypeD.

Parameters of QCL-TypeA are {Doppler shift, Doppler spread, average delay, delay spread}; parameters of QCL-TypeB are {Doppler shift, Doppler spread}; parameters of QCL-TypeC are {Doppler shift, average delay}; and a parameter of QCL-TypeD is {Spatial Rx parameter}.

A QCL-TypeD relationship may be described as "for the purpose of determining the CORESET, a Synchronization/PBCH block is considered to have different QCL-TypeD properties than a CSI-RS". Correspondingly, this is translated as follows: To determine a CORESET for monitoring a PDCCH, it may be understood that a synchronization/physical broadcast channel block (SS/PBCH) and a channel state information reference signal (Channel State Information Reference Signal, CSI-RS) have different QCL-TypeD properties. It may be understood that one synchronization/physical broadcast channel block is corresponding to one wide beam, and one channel state information reference signal is corresponding to one narrow beam. Although the narrow beam may be obtained from the wide beam through beam refinement (beam refinement), it is still considered that the wide beam and the narrow beam are two different beams. Beam information of the two beams is different, that is, QCL-TypeD properties are different. The QCL-TypeD is used to assist in beamforming, for example, used to form a spatial filter or a beam indication. The QCL-TypeD can be understood from perspectives of a transmit end and a receive end. From the perspective of the transmit end, if two antenna ports are of QCL-TypeD, it means that beam directions corresponding to the two antenna ports are spatially consistent. From the perspective of the receive end, if two antenna ports are of QCL-TypeD, it means that the receive end can receive, in a same beam direction, signals sent from the two antenna ports.

In the embodiments of this application, when a plurality of PDCCH MOs in a cell are associated with a same CORESET, the plurality of PDCCH MOs have a same beam direction. In other words, the plurality of PDCCH MOs have a same quasi co-location property, or CORESETs associated with the plurality of PDCCH MOs have a same quasi co-location property. In the embodiments of this application, when two CORESETs associated with two PDCCH MOs have different quasi co-location properties, some locations in the embodiments of this application may also be described as that the two PDCCH MOs have different quasi co-location properties.

In the embodiments of this application, that a plurality of PDCCH MOs have a same quasi co-location property may be described as that the plurality of PDCCH MOs have a same QCL-TypeD property, described as that the plurality of PDCCH MOs have a same QCL-TypeD relationship, described as that the plurality of PDCCH MOs have a same QCL-TypeD feature, or the like. In this case, it may be understood that beam directions corresponding to the plurality of PDCCH MOs are consistent. When a plurality of PDCCH MOs have an overlapping second time unit in time domain, and beam directions of the two PDCCH MOs are the same, although the plurality of PDCCH MOs have the overlapping second time unit in time domain, the terminal device may still receive the plurality of PDCCH MOs in one beam direction. In the embodiments of this application, a plurality of PDCCH MOs have an overlapping second time unit in time domain. In some cases, this is also described as that the plurality of PDCCH MOs overlap.

In the embodiments of this application, that CORESETs associated with a plurality of PDCCH MOs have different quasi co-location properties may be described as that the plurality of PDCCH MOs have different QCL-TypeD properties, described as that the plurality of PDCCH MOs have different QCL-TypeD relationships, described as that the plurality of PDCCH MOs have different QCL-TypeD features, or the like. In this case, it may be understood that beam directions corresponding to any two of the plurality of PDCCH MOs are inconsistent. When a plurality of PDCCH MOs have an overlapping second time unit in time domain, but associated CORESETs have different quasi co-location properties, the terminal device cannot receive information by using a plurality of different beam directions at a same moment. Therefore, in this case, the terminal device can select only one beam direction to receive information. That is, in this case, the terminal device needs to select one PDCCH MO for monitoring.

An embodiment of this application provides a possible implementation, which is used to determine whether two PDCCH MOs have a quasi co-location property. Based on the foregoing descriptions, one PDCCH MO includes a start location of monitoring and monitoring duration, where the monitoring duration is duration of a CORESET associated with the PDCCH MO. Configuration information of the CORESET includes transmission configuration indication information, namely, quasi co-location property information. Two CORESETs associated with the two PDCCH MOs are first determined, and quasi co-location property information corresponding to the two CORESETs is further determined. Whether quasi co-location properties of the two CORESETs are the same or different, that is, whether the two PDCCH MOs have a same quasi co-location property, is determined according to the following two principles: (1)

One SS/PBCH and one CSI-RS have different QCL-TypeD properties. (2) A first CSI-RS in a first cell is associated with one SS/PBCH, and a second CSI-RS in a second cell is associated with the same SS/PBCH. It is considered that the first CSI-RS and the second CSI-RS have a same QCL-TypeD property. The quasi co-location properties are both of TypeD.

The terms "system" and "network" may be used interchangeably in the embodiments of this application. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof means any combination of these items, including a singular item (piece) or any combination of plural items (pieces). For example, at least one (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, and not used to limit an order, a time sequence, priorities, or importance of the plurality of objects. For example, a first PDCCH MO and a second PDCCH MO are merely used to distinguish different PDCCH MOs, but do not indicate different priorities, importance, or the like of the two PDCCH MOs.

Figure 4:
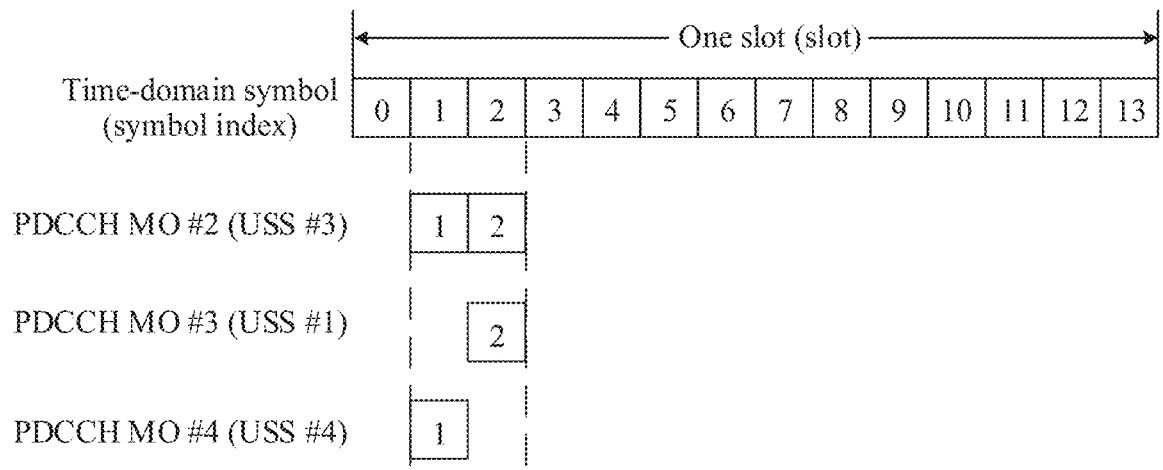
FIG. 4 is a schematic diagram of a monitoring occasion in a time domain direction according to an embodiment of this application.

FIG. 4 shows an example of a schematic diagram of a monitoring occasion in time domain. As shown in FIG. 4, a PDCCH MO #2 occupies a time-domain symbol 1 and a time-domain symbol 2, a PDCCH MO #3 occupies the time-domain symbol 2, and a PDCCH MO #4 occupies the time-domain symbol 1. It can be learned that the PDCCH MO #2 and the PDCCH MO #3 have an overlapping second time unit (where both occupy the time-domain symbol 2) in time domain; the PDCCH MO #2 and the PDCCH MO #4 have an overlapping second time unit (where both occupy the time-domain symbol 1) in time domain; the PDCCH MO #3 and the PDCCH MO #4 do not overlap in time domain. A CORESET corresponding to the PDCCH MO #2 is associated with a USS, and the USS is identified as USS #3. A CORESET corresponding to the PDCCH MO #3 is associated with a USS, and the USS is identified as USS #1. A CORESET corresponding to the PDCCH MO #4 is associated with a USS, and the USS is identified as USS #4. It is assumed that a value relationship among the three USS identifiers in FIG. 4 is that the USS #1 is the smallest, the USS #3 is greater than the USS #1, and the USS #4 is greater than the USS #3. It is assumed that beam directions corresponding to any two of the PDCCH MO #2, the PDCCH MO #3, and the PDCCH MO #4 in FIG. 4 are different, that is, the CORESETs associated with any two of the PDCCH MO #2, the PDCCH MO #3, and the PDCCH MO #4 have different quasi co-location properties.

A solution for selecting a PDCCH MO is provided. It is specified in the solution that if two PDCCH MOs having an overlapping second time unit in time domain have different quasi co-location relationships, a PDCCH MO with a smaller USS identifier is selected from the two PDCCH MOs for monitoring.

In a first case, a specific example of applying the foregoing solution to the example shown in FIG. 4 is as follows:

Through comparison of the PDCCH MO #3 with the PDCCH MO #4, it is found that the PDCCH MO #3 and the PDCCH MO #4 do not overlap in time domain. Then, through comparison of the PDCCH MO #3 with the PDCCH MO #2, it is found that the PDCCH MO #3 and the PDCCH MO #2 have an overlapping second time unit in time domain. The USS identifier associated with the PDCCH MO #3 is the USS #1, and the USS identifier associated with the PDCCH MO #2 is the USS #3. Therefore, the PDCCH MO #3 is selected from the PDCCH MO #3 and the PDCCH MO #2. After comparison, monitoring is finally performed for the PDCCH MO #3 and PDCCH MO #4.

In a second case, a specific example of applying the foregoing solution to the example shown in FIG. 4 is as follows: Through comparison of the PDCCH MO #2 with the PDCCH MO #4, it is found that the PDCCH MO #2 and the PDCCH MO #4 have an overlapping second time unit in time domain. The USS identifier associated with the PDCCH MO #2 is the USS #3, and the USS identifier associated with the PDCCH MO #4 is the USS #4. Therefore, the PDCCH MO #2 is selected from the PDCCH MO #2 and the PDCCH MO #4. Then, through comparison of the PDCCH MO #2 with the PDCCH MO #3, it is found that the PDCCH MO #3 and the PDCCH MO #2 have an overlapping second time unit in time domain. The USS identifier associated with the PDCCH MO #3 is the USS #1, and the USS identifier associated with the PDCCH MO #2 is the USS #3. Therefore, the PDCCH MO #3 is selected from the PDCCH MO #3 and the PDCCH MO #2. After comparison, monitoring is finally performed for the PDCCH MO #3.

It can be learned that when the foregoing solution is applied to the example shown in FIG. 4, different results may appear. For example, monitoring is performed for the PDCCH MO #2 and the PDCCH MO #3 in the first case, and monitoring is performed for the PDCCH MO #2 in the second case. Both the terminal device and the base station select a PDCCH MO from PDCCH MOs that overlap and whose associated CORESETs have different quasi co-location properties. If results of selection by the terminal device and the base station are different, the terminal may fail to receive DCI. This situation needs to be avoided.

Based on the foregoing content, the embodiments of this application provide the following several solutions, which are used to select a highest-priority PDCCH MO for monitoring when beam directions of a plurality of PDCCH MOs having an overlapping second time unit in time domain are different.

Solution 1

Figure 5:
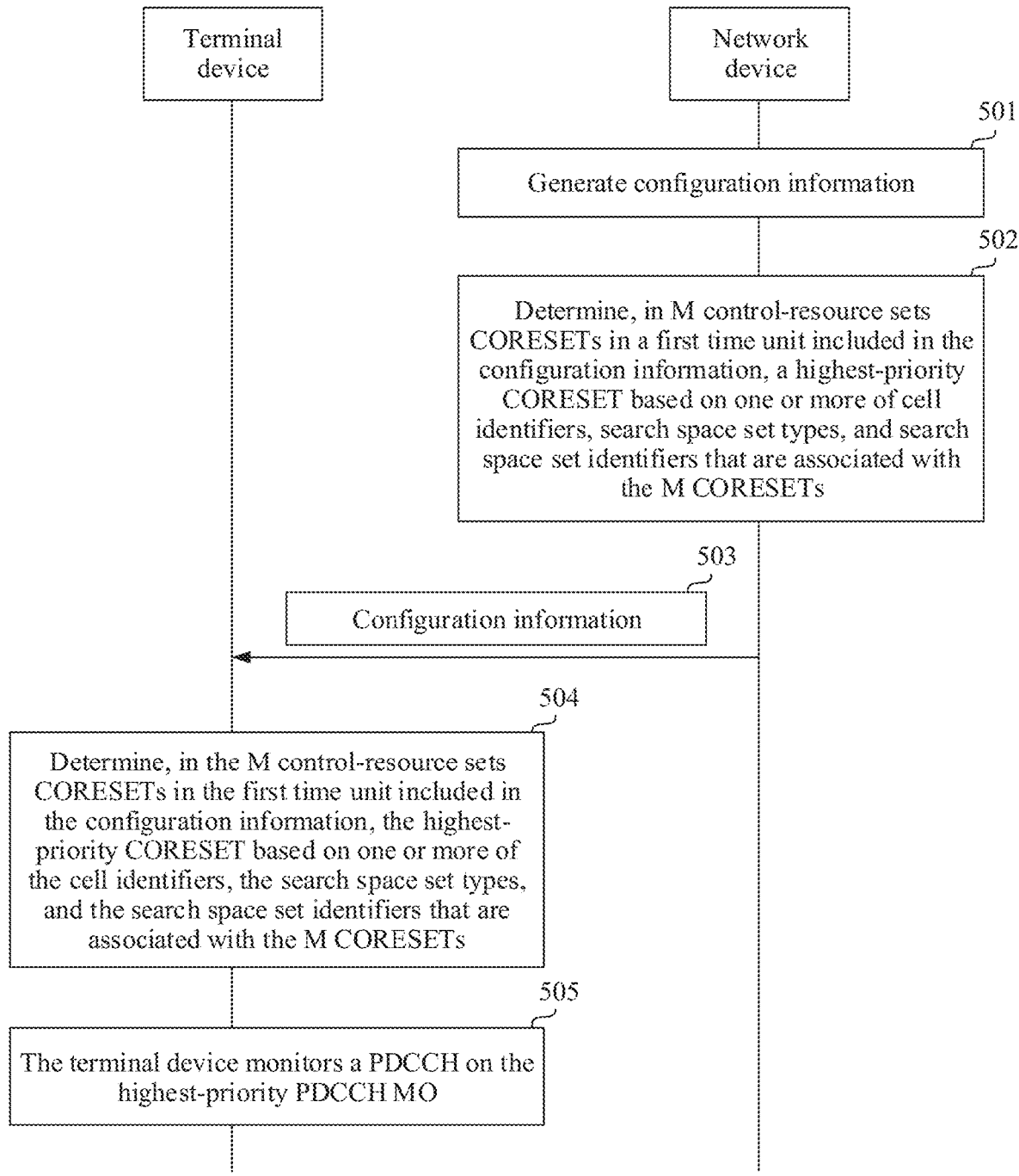
FIG. 5 is a schematic flowchart of a communication method according to an embodiment of this application.

FIG. 5 shows an example of a schematic flowchart of a communication method. As shown in FIG. 5, the method includes the following steps.

Step 501: A network device generates configuration information. The configuration information is used to indicate one or more of cell identifiers, quasi co-location properties, search space set types, and search space set identifiers that are associated with T control-resource sets CORESETs in a first time unit.

Step 502: The network device determines, in M CORESETs belonging to the T CORESETs, a highest-priority CORESET based on one or more of cell identifiers, quasi co-location properties, search space set types, and search space set identifiers that are associated with the M CORESETs in a time unit.

To-be-monitored physical downlink control channel monitoring occasions PDCCH MOs in the first time unit are associated with the M CORESETs, and M is a positive integer. One PDCCH MO in the to-be-monitored PDCCH MOs in the first time unit is associated with one of the M CORESETs, and one of the M CORESETs is associated with one or more PDCCH MOs in the to-be-monitored PDCCH MOs in the first time unit.

Step 503: The network device sends the configuration information to a terminal device.

Step 503 may be performed before step 502, or may be performed after step 502.

Step 504: The terminal device determines, in the M CORESETs belonging to the T CORESETs, the highest-priority CORESET based on one or more of the cell identifiers, the quasi co-location properties, the search space set types, and the search space set identifiers that are associated with the M CORESETs in the time unit.

There is no fixed sequence between step 504 and step 502, and step 504 may be performed before step 502 or after step 502.

Step 505: The terminal device monitors a PDCCH on the highest-priority PDCCH MO.

In the solution 1, the highest-priority CORESET is first selected from the to-be-monitored PDCCH MOs in the first time unit. Therefore, a comparison reference, namely, the highest-priority CORESET, may be first determined. Then, another PDCCH MO may be compared with a PDCCH MO associated with the highest-priority CORESET, so that CORESETs that are determined by the terminal device and the network device and that are used to monitor the PDCCH may be the same. A problem that the terminal device and the network device determine different CORESETs used to monitor the PDCCH is avoided.

Optionally, after step 502, the network device further discards, from the to-be-monitored PDCCH MOs in the first time unit, a PDCCH MO that has an overlapping second time unit with the PDCCH MO associated with the highest-priority CORESET in time domain and whose associated CORESET has a different quasi co-location property.

Optionally, after step 504, the terminal device further discards, from the to-be-monitored PDCCH MOs in the first time unit, a PDCCH MO that has an overlapping second time unit with the PDCCH MO associated with the highest-priority CORESET in time domain and whose associated CORESET has a different quasi co-location property.

In this solution, the configuration information indicates the PDCCH MOs configured for the terminal device, and the terminal device may identify all the PDCCH MOs indicated by the configuration information one by one in this embodiment of this application. A PDCCH MO that has not been identified is referred to as a to-be-monitored PDCCH MO. An identified PDCCH MO may become the PDCCH MO associated with the highest-priority CORESET or may be discarded. The discarded PDCCH MO in this embodiment of this application means that the PDCCH MO is no longer monitored, and the PDCCH MO is also an identified PDCCH MO.

The network device may cyclically perform step 502 for PDCCH MOs included in a first time unit, and the terminal device may cyclically perform step 504 for PDCCH MOs included in a first time unit. The terminal device is used as an example for description. The terminal device performs step 504 for PDCCH MOs included in a first time unit, to determine a highest-priority CORESET, and discards, from the to-be-monitored PDCCH MOs in the first time unit, a PDCCH MO that has an overlapping second time unit with a PDCCH MO associated with the highest-priority CORESET in time domain and whose associated CORESET has a different quasi co-location property. Step 504 is performed again for a PDCCH MO in the to-be-monitored PDCCH MOs corresponding to the first time unit other than the PDCCH MO associated with the highest-priority CORESET and the discarded PDCCH MO. That is, when step 504 is cyclically performed next time for the PDCCH MO in the to-be-monitored PDCCH MOs corresponding to the first time unit other than the PDCCH MO associated with the highest-priority CORESET and the discarded PDCCH MO, the first time unit is corresponding to the new to-be-monitored PDCCH MO. Similarly, the network device also cyclically performs step 502 for the to-be-monitored PDCCH MOs. A process is similar, and details are not described herein again.

In an implementation of determining the highest-priority CORESET, if only one of the M CORESETs is associated with a common search space set CSS, the highest-priority CORESET is the CORESET associated with the CSS in the M CORESETs.

In a second implementation of determining the highest-priority CORESET, if K CORESETs in the M CORESETs are associated with common search space sets CSSs, K is a positive integer not greater than M, and K cell identifiers associated with the K CORESETs are all the same, the highest-priority CORESET is a CORESET associated with a smallest common search space set identifier in the K CORESETs.

In a third implementation of determining the highest-priority CORESET, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is the CORESET associated with the smallest cell identifier in the K CORESETs.

In a fourth implementation of determining the highest-priority CORESET, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest common search space set identifier in the CORESETs associated with the smallest cell identifier in the K CORESETs.

In a fifth implementation of determining the highest-priority CORESET, if none of the M CORESETs is associated with a common search space set CSS, and M cell identifiers associated with the M CORESETs are all the same, the highest-priority CORESET is a CORESET associated with a smallest UE-specific search space set identifier in the M CORESETs.

In a sixth implementation of determining the highest-priority CORESET, if none of the M CORESETs is associated with a common search space set CSS, cell identifiers associated with at least two of the M CORESETs are different, and a smallest cell identifier in M cell identifiers associated with the M CORESETs is associated with only one of the M CORESETs, the highest-priority CORESET is the CORESET associated with the smallest cell identifier in the M CORESETs.

In a seventh implementation of determining the highest-priority CORESET, if none of the M CORESETs is associated with a common search space set CSS, cell identifiers associated with at least two of the M CORESETs are different, and a smallest cell identifier in M cell identifiers associated with the M CORESETs is associated with at least two of the M CORESETs, the highest-priority CORESET is a CORESET associated with a smallest UE-specific search space set identifier in the CORESETs associated with the smallest cell identifier in the M CORESETs.

Figure 6:
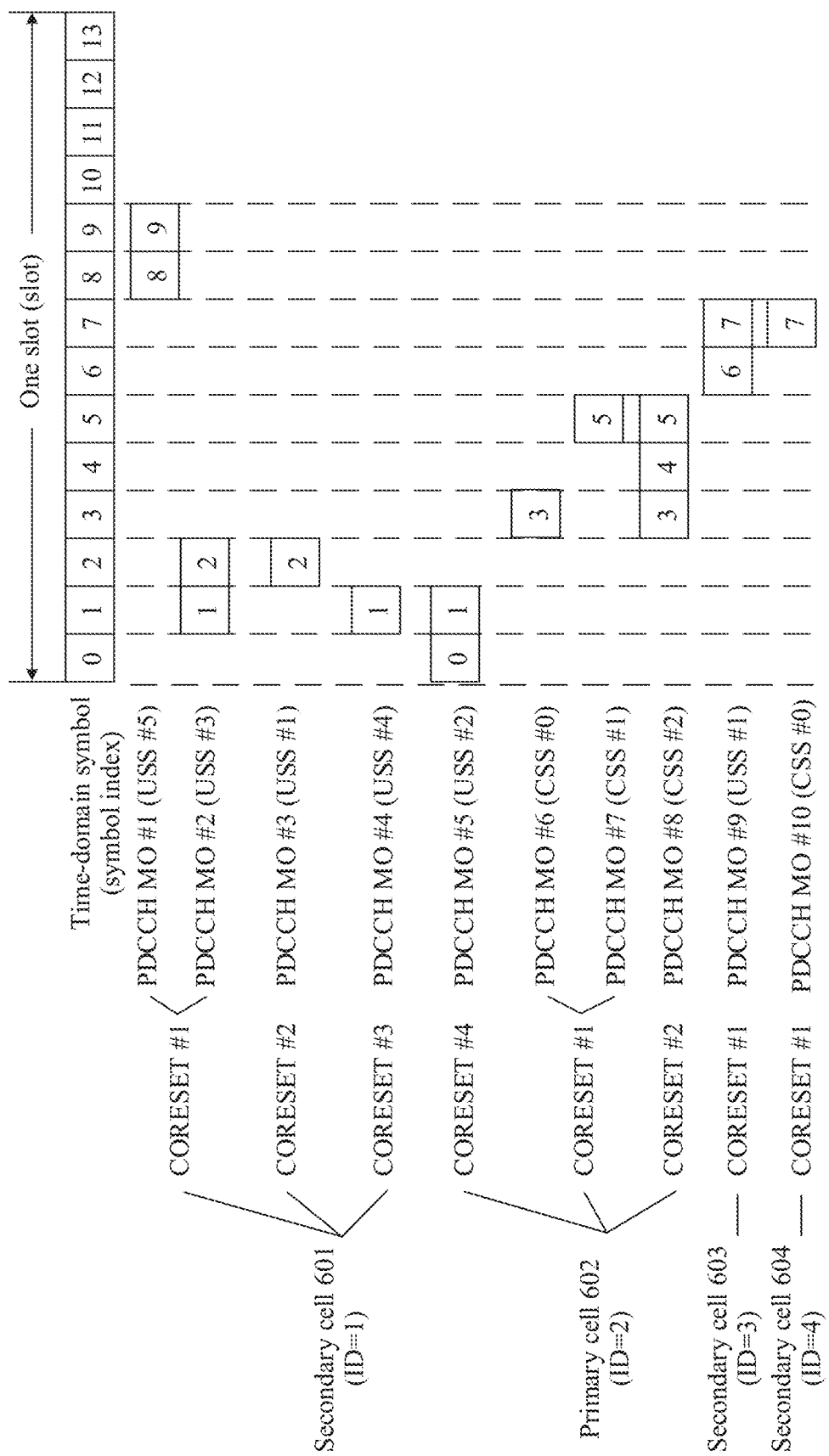
FIG. 6 is a schematic diagram of PDCCH MOs in one first time unit according to an embodiment of this application.

FIG. 6 shows an example of a schematic diagram of PDCCH MOs in a first time unit. With reference to FIG. 6, an example in which one first time unit is a slot is used for description in FIG. 6. In FIG. 6, three cells, namely, a secondary cell 601, a primary cell 602, a secondary cell 603, and a secondary cell 604, are included. A cell identifier of the secondary cell 601 is 1, a cell identifier of the primary cell 602 is 2, a cell identifier of the secondary cell 603 is 3, and a cell identifier of the secondary cell 604 is 4. It is assumed that the cell ID identifiers in ascending order are the cell identifier 1, the cell identifier 2, the cell identifier 3, and the cell identifier 4.

As shown in FIG. 6, the secondary cell 601 is associated with three CORESETs: a CORESET #1, a CORESET #2, and a CORESET #3. The CORESET #1 is associated with two PDCCH MOs: a PDCCH MO #1 and a PDCCH MO #2. The CORESET #2 is associated with a PDCCH MO #3. The CORESET #3 is associated with a PDCCH MO #4. The PDCCH MO #1 is associated with a USS #5, the PDCCH MO #2 is associated with a USS #3, the PDCCH MO #3 is associated with a USS #1, and the PDCCH MO #4 is associated with a USS #4. The PDCCH MO #1 occupies a time-domain symbol 8 and a time-domain symbol 9, the PDCCH MO #2 occupies a time-domain symbol 1 and a time-domain symbol 2, the PDCCH MO #3 occupies the time-domain symbol 2, and the PDCCH MO #4 occupies the time-domain symbol 1. In this example, a cell identifier associated with the CORESET #1 associated with the PDCCH MO #1 is the secondary cell 601, search space set identifiers associated with the CORESET #1 associated with the PDCCH MO #1 are the USS #5 and the USS #3, and a search space set type associated with the CORESET #1 associated with the PDCCH MO #1 is a UE-specific search space set. In this example, a cell identifier associated with the CORESET #1 associated with the PDCCH MO #2 is the secondary cell 601, search space set identifiers associated with the CORESET #1 associated with the PDCCH MO #2 are the USS #5 and the USS #3, and a search space set type associated with the CORESET #1 associated with the PDCCH MO #2 is a UE-specific search space set. In this example, a cell identifier associated with the CORESET #2 associated with the PDCCH MO #3 is the secondary cell 601, a search space set identifier associated with the CORESET #2 associated with the PDCCH MO #3 is the USS #1, and a search space set type associated with the CORESET #2 associated with the PDCCH MO #3 is a UE-specific search space set.

As shown in FIG. 6, it can be learned that, if a CSS #1 associated with a PDCCH MO #7 associated with a CORESET #1 in the primary cell 602 is replaced with the USS #1, the CORESET #1 in the primary cell 602 is associated with a DPCCH MO #6 and the PDCCH MO #7, the DPCCH MO #6 is associated with a CSS #0, and the PDCCH MO #7 is associated with the USS #1. The assumption may be described as follows: A search space type associated with the CORESET associated with the PDCCH MO #6 includes a CSS and a USS, an identifier of the CSS associated with the CORESET associated with the PDCCH MO #6 is the CSS #0, and an identifier of the USS associated with the CORESET associated with the PDCCH MO #6 is the USS #1. The assumption may alternatively be described as follows: A search space type associated with the CORESET associated with the PDCCH MO #7 includes a CSS and a USS, an identifier of the CSS associated with the CORESET associated with the PDCCH MO #7 is the CSS #0, and an identifier of the USS associated with the CORESET associated with the PDCCH MO #7 is the USS #1. That is, a search space identifier and a search space type that are associated with a CORESET associated with PDCCH MOs are search space identifiers and search space types corresponding to all the PDCCH MOs bound to the CORESET. The search space identifier and the search space type do not mean only the search space identifier and the search space type that are associated with the PDCCH MOs. In this embodiment of this application, even if the PDCCH MO #7 is discarded in a step, the search space type associated with the CORESET associated with the PDCCH MO #6 still includes the CSS and the USS. The identifier of the CSS associated with the CORESET associated with the PDCCH MO #6 is the CSS #0, and the identifier of the associated USS is the USS #1. In other words, discarding of a PDCCH MO does not affect the search space identifier and the search space type that are associated with the CORESET associated with the PDCCH MOs. The content is applicable to all solutions in the embodiments of this application, and details are not described again.

Cell identifiers, search space set types, and search space set identifiers that are associated with a CORESET associated with other PDCCH MOs are similar to those in the two examples, and details are not described again.

As shown in FIG. 6, the primary cell 602 is associated with three CORESETs: a CORESET #4, a CORESET #1, and a CORESET #2. The CORESET #4 is associated with a PDCCH MO #5. The CORESET #1 is associated with two PDCCH MOs, a PDCCH MO #6 and a PDCCH MO #7. The CORESET #2 is associated with a PDCCH MO #8. The PDCCH MO #5 is associated with a USS #2, the PDCCH MO #6 is associated with a CSS #0, the PDCCH MO #7 is associated with a CSS #1, and the PDCCH MO #8 is associated with a CSS #2. The PDCCH MO #5 occupies the time-domain symbol 0 and the time-domain symbol 1, the PDCCH MO #6 occupies a time-domain symbol 3, the PDCCH MO #7 occupies a time-domain symbol 5, and the PDCCH MO #8 occupies the time-domain symbol 3, a time-domain symbol 4, and the time-domain symbol 5.

As shown in FIG. 6, the secondary cell 603 is associated with a CORESET #1. The CORESET #1 is associated with a PDCCH MO #9. The PDCCH MO #9 is associated with the USS #1. The PDCCH MO #9 occupies a time-domain symbol 6 and a time-domain symbol 7.

As shown in FIG. 6, the secondary cell 604 is associated with a CORESET #1. The CORESET #1 is associated with a PDCCH MO #10. The PDCCH MO #10 is associated with the CSS #0. The PDCCH MO #10 occupies the time-domain symbol 7.

In FIG. 6, it is assumed that the CSS identifiers in ascending order are the CSS #0, the CSS #1, and the CSS #2. In FIG. 6, it is assumed that the USS identifiers in ascending order are the USS #1, the USS #2, the USS #3, the USS #4, and the USS #5.

It is assumed that beam directions corresponding to any two of the PDCCH MO #1, the PDCCH MO #2, the PDCCH MO #3, the PDCCH MO #4, the PDCCH MO #5, the PDCCH MO #6, the PDCCH MO #7, the PDCCH MO #8, the PDCCH MO #9, and the PDCCH MO #10 in FIG. 6 are different, that is, the CORESETs associated with the two PDCCH MOs have different quasi co-location properties. A person skilled in the art may know that the assumption herein is merely for ease of use of this application.

The solution 1 is applied to the example shown in FIG. 6. As shown in FIG. 6, the first time unit being a slot and a terminal device side are used as an example for description. When step 504 is performed for the first time, the to-be-monitored PDCCH MOs are: the PDCCH MO #1, the PDCCH MO #2, the PDCCH MO #3, the PDCCH MO #4, the PDCCH MO #5, the PDCCH MO #6, the PDCCH MO #7, the PDCCH MO #8, the PDCCH MO #9, and the PDCCH MO #10. The corresponding M CORESETs are the CORESET #1, the CORESET #2, and the CORESET #3 in the secondary cell 601, the CORESET #4, the CORESET #1, and the CORESET #2 in the primary cell 602, the CORESET #1 associated with the secondary cell 603, and the CORESET #1 associated with the secondary cell 604. The CORESET #1 and the CORESET #2 in the primary cell 602 and the CORESET #1 in the secondary cell 604 are associated with the CSSs. In this case, K is 3. The three CORESETs are associated with two cells, and the cell identifier of the primary cell 602 is the smallest (where the cell identifier of the primary cell 602 is 2, and the cell identifier of the secondary cell 604 is 4). Further, because the smallest cell identifier (which is the primary cell 602 in this case) is associated with two CORESETs, and the CSS #0 associated with the CORESET #1 in the two CORESETs is a smallest common search space set identifier in the CSSs associated with the two CORESETs, the CORESET #1 in the primary cell 602 is determined as the highest-priority CORESET. The PDCCH is monitored on the CORESET #1 in the primary cell 602. This may also be described as that the PDCCH MO #6 and the PDCCH MO #7 associated with the CORESET #1 in the primary cell 602 are monitored. Further, a PDCCH MO that has an overlapping second time unit with at least one PDCCH MO associated with the CORESET #1 in the primary cell 602 in time domain and whose associated CORESET has a different quasi co-location property is discarded. As shown in FIG. 6, because the PDCCH MO #8 and the PDCCH MO #6 have an overlapping second time unit in time domain and the associated CORESETs have different quasi co-location properties, the PDCCH MO #8 is currently discarded (where discarding may also be understood as no longer monitoring. The following content is similar and is not described again).

To-be-monitored PDCCH MOs that are currently remained are the PDCCH MO #1, the PDCCH MO #2, the PDCCH MO #3, the PDCCH MO #4, the PDCCH MO #5, the PDCCH MO #9, and the PDCCH MO #10. Step 504 is performed again for the current to-be-monitored PDCCH MOs. M CORESETs corresponding to the current to-be-monitored PDCCH MOs are the CORESET #1, the CORESET #2, and the CORESET #3 in the secondary cell 601, the CORESET #4 in the primary cell 602, the CORESET #1 associated with the secondary cell 603, and the CORESET #1 associated with the secondary cell 604. The CORESET #1 in the secondary cell 604 is associated with the CSS. Therefore, the CORESET #1 in the secondary cell 604 is determined as the highest-priority CORESET. The PDCCH is monitored on the CORESET #1 in the secondary cell 604. This may also be described as that the PDCCH MO #10 associated with the CORESET #1 in the secondary cell 604 is monitored. Further, a PDCCH MO that has an overlapping second time unit with at least one PDCCH MO associated with the CORESET #1 in the secondary cell 604 in time domain and whose associated CORESET has a different quasi co-location property is discarded. As shown in FIG. 6, because the PDCCH MO #9 and the PDCCH MO #10 have an overlapping second time unit in time domain and the associated CORESETs have different quasi co-location properties, the PDCCH MO #9 is currently discarded.

To-be-monitored PDCCH MOs that are currently remained are the PDCCH MO #1, the PDCCH MO #2, the PDCCH MO #3, the PDCCH MO #4, and the PDCCH MO #5. Step 504 is performed again for the current to-be-monitored PDCCH MOs. M CORESETs corresponding to the current to-be-monitored PDCCH MOs are the CORESET #1, the CORESET #2, and the CORESET #3 in the secondary cell 601, and the CORESET #4 in the primary cell 602. As shown in FIG. 6, all the current to-be-monitored PDCCH MOs are associated with the USSs. The cell identifier of the secondary cell 601 is the smallest. Further, because the USS associated with the CORESET #2 in the secondary cell 601 is the USS #1, the CORESET #2 is a CORESET associated with the smallest USS identifier in the secondary cell 601. Therefore, the CORESET #2 in the secondary cell 601 is determined as the highest-priority CORESET. The PDCCH is monitored on the CORESET #2 in the secondary cell 601. This may also be described as that the PDCCH MO #3 associated with the CORESET #2 in the secondary cell 601 is monitored. Further, a PDCCH MO that has an overlapping second time unit with at least one PDCCH MO associated with the CORESET #2 in the secondary cell 601 in time domain and whose associated CORESET has a different quasi co-location property is discarded. As shown in FIG. 6, because the PDCCH MO #2 and the PDCCH MO #3 have an overlapping second time unit in time domain and the associated CORESETs have different quasi co-location properties, the PDCCH MO #2 is currently discarded.

To-be-monitored PDCCH MOs that are currently remained are the PDCCH MO #1, the PDCCH MO #4, and the PDCCH MO #5. Step 504 is performed again for the current to-be-monitored PDCCH MOs. M CORESETs corresponding to the current to-be-monitored PDCCH MOs are the CORESET #1 and the CORESET #3 in the secondary cell 601, and the CORESET #4 in the primary cell 602. As shown in FIG. 6, all the current to-be-monitored PDCCH MOs are associated with the USSs. The cell identifier of the secondary cell 601 is the smallest. Further, because the USS associated with the CORESET #3 in the secondary cell 601 is the USS #4, the CORESET #3 is a CORESET associated with the current smallest USS identifier in the secondary cell 601. Therefore, the CORESET #3 in the secondary cell 601 is determined as the highest-priority CORESET. The PDCCH is monitored on the CORESET #3 in the secondary cell 601. This may also be described as that the PDCCH MO #4 associated with the CORESET #3 in the secondary cell 601 is monitored. Further, a PDCCH MO that has an overlapping second time unit with at least one PDCCH MO associated with the CORESET #3 in the secondary cell 601 in time domain and whose associated CORESET has a different quasi co-location property is discarded. As shown in FIG. 6, because the PDCCH MO #4 and the PDCCH MO #5 have an overlapping second time unit in time domain and the associated CORESETs have different quasi co-location properties, the PDCCH MO #5 is currently discarded.

A to-be-monitored PDCCH MO that is currently remained is the PDCCH MO #1. The PDCCH is monitored on the CORESET #1 in the secondary cell 601. This may also be described as that the PDCCH MO #1 associated with the CORESET #1 in the secondary cell 601 is monitored.

Solution 2

Figure 7:
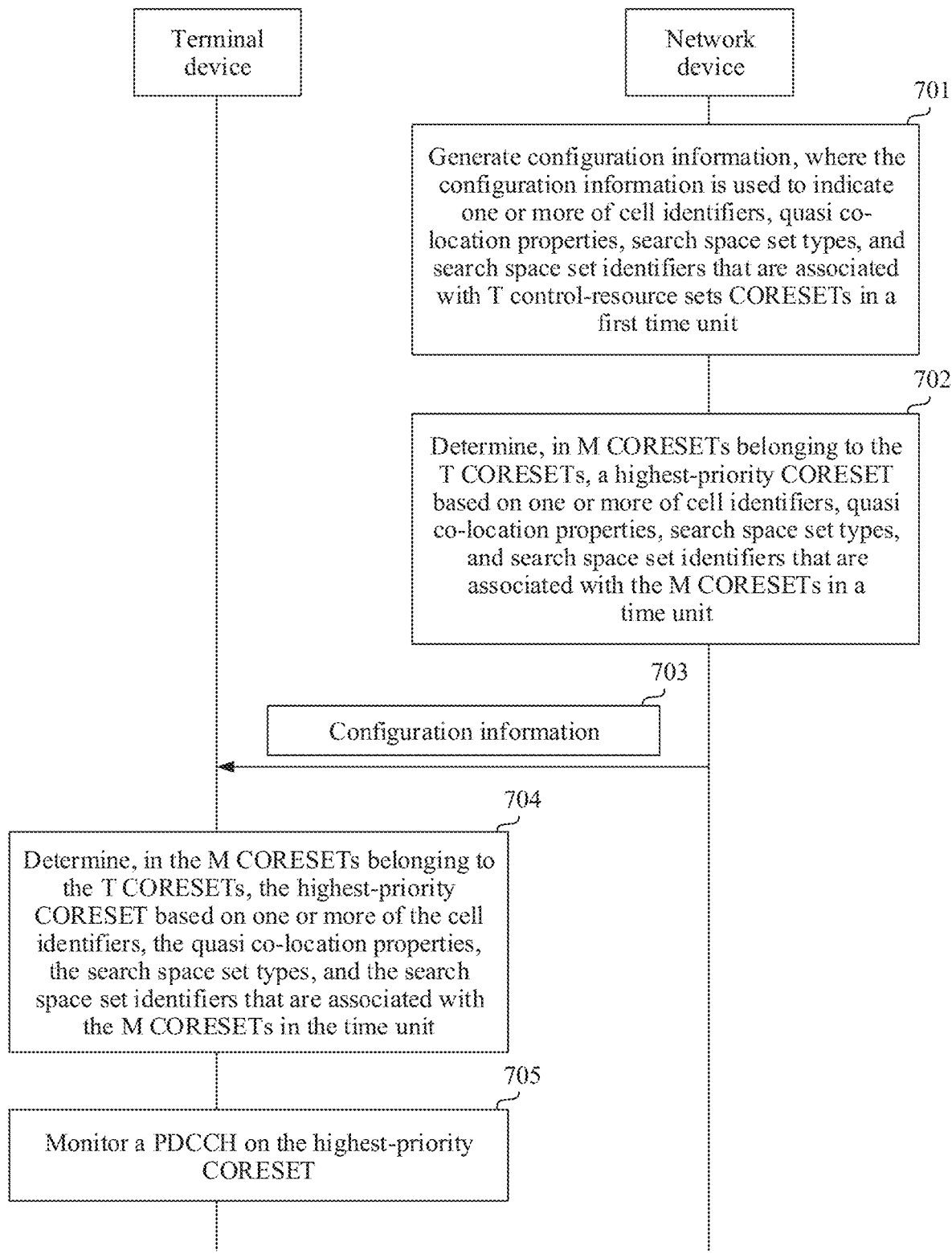
FIG. 7 is a schematic flowchart of another communication method according to an embodiment of this application.

FIG. 7 shows an example of a schematic flowchart of a communication method. As shown in FIG. 7, the method includes the following steps.

Step 701: A network device generates configuration information. The configuration information is used to indicate one or more of cell identifiers, quasi co-location properties, search space set types, and search space set identifiers that are associated with T control-resource sets CORESETs in a first time unit.

Step 702: The network device determines, in M CORESETs belonging to the T CORESETs, a highest-priority CORESET based on one or more of cell identifiers, quasi co-location properties, search space set types, and search space set identifiers that are associated with the M CORESETs in a time unit.

The M CORESETs are CORESETs associated with PDCCH MOs in a PDCCH MO set, the PDCCH MO set includes L PDCCH MOs, T and M are positive integers, M is less than or equal to T, and L is an integer greater than 1.

In this embodiment of this application, a plurality of PDCCH MOs in the L PDCCH MOs may be associated with a same CORESET. In this case, M is less than L. There is a possibility that CORESETs associated with any two of the L PDCCH MOs are different. In this case, M is equal to L.

The PDCCH MO set includes a first PDCCH MO and a second PDCCH MO, and the first PDCCH MO and the second PDCCH MO have an overlapping second time unit in time domain; if the PDCCH MO set further includes a third PDCCH MO, and the third PDCCH MO does not have an overlapping second time unit with the first PDCCH MO and the second PDCCH MO in time domain, the PDCCH MO set further includes a fourth PDCCH MO, and the fourth PDCCH MO has an overlapping second time unit with the first PDCCH MO or the second PDCCH MO in time domain; and the third PDCCH MO and the fourth PDCCH MO have an overlapping second time unit in time domain.

Step 703: The network device sends the configuration information to a terminal device.

Step 703 may be performed before step 702, or may be performed after step 702.

Step 704: The terminal device determines, in the M CORESETs belonging to the T CORESETs, the highest-priority CORESET based on one or more of the cell identifiers, the quasi co-location properties, the search space set types, and the search space set identifiers that are associated with the M CORESETs in the time unit.

There is no fixed sequence between step 704 and step 702, and step 704 may be performed before step 702 or after step 702.

Step 705: Monitor a PDCCH on the highest-priority CORESET.

In a possible implementation, if the M CORESETs all have a same quasi co-location property, the M CORESETs have a same beam direction. In this case, the terminal device may monitor the M CORESETs. In this case, the highest-priority CORESET may be any one of the M CORESETs. Alternatively, solutions for selecting a highest-priority CORESET provided in the embodiments of this application may be used for selection.

In a possible implementation, if at least two of the M CORESETs have different quasi co-location properties, after the highest-priority CORESET is selected, the method further includes: discarding, from the PDCCH MO set, a PDCCH MO associated with a CORESET having a quasi co-location property different from that of the highest-priority CORESET. In this case, the solutions for selecting a highest-priority CORESET provided in the embodiments of this application may be used for selection.

For the PDCCH MO set, in addition to the limitation manner in step 702, another limitation manner for the DPCCH MO set is provided in this embodiment of this application. The first PDCCH MO and the second PDCCH MO are two PDCCH MOs that are in the L PDCCH MOs and that have an overlapping second time unit in time domain. A fifth PDCCH MO is a PDCCH MO in L-2 PDCCH MOs that are obtained through exclusion of the first PDCCH MO and the second PDCCH MO from the L PDCCH MOs. If the first PDCCH MO and the second PDCCH MO are elements in the PDCCH MO set, and the fifth PDCCH MO and at least one PDCCH MO in the PDCCH MO set have an overlapping second time unit in time domain, the fifth PDCCH MO is an element in the PDCCH MO set.

For the PDCCH MO set, this embodiment of this application provides a third limitation manner for the DPCCH MO set. The first PDCCH MO and the second PDCCH MO are two PDCCH MOs that are in the L PDCCH MOs, that have an overlapping second time unit in time domain, and whose associated CORESETs have different quasi co-location properties. A fifth PDCCH MO is a PDCCH MO in L-2 PDCCH MOs that are obtained through exclusion of the first PDCCH MO and the second PDCCH MO from the L PDCCH MOs. If the first PDCCH MO and the second PDCCH MO are elements in the PDCCH MO set, and the fifth PDCCH MO and at least one PDCCH MO in the PDCCH MO set have an overlapping second time unit in time domain and associated CORESETs have different quasi co-location properties, the fifth PDCCH MO is an element in the PDCCH MO set.

In an implementation of determining the highest-priority CORESET, if only one of the M CORESETs is associated with a common search space set CSS, the highest-priority CORESET is the CORESET associated with the CSS in the M CORESETs.

In a second implementation of determining the highest-priority CORESET, if K CORESETs in the M CORESETs are associated with common search space sets CSSs, K is a positive integer not greater than M, and K cell identifiers associated with the K CORESETs are all the same, the highest-priority CORESET is a CORESET associated with a smallest common search space set identifier in the K CORESETs.

In a third implementation of determining the highest-priority CORESET, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is the CORESET associated with the smallest cell identifier in the K CORESETs.

In a fourth implementation of determining the highest-priority CORESET, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest common search space set identifier in the CORESETs associated with the smallest cell identifier in the K CORESETs.

In a fifth implementation of determining the highest-priority CORESET, if none of the M CORESETs is associated with a common search space set CSS, and M cell identifiers associated with the M CORESETs are all the same, the highest-priority CORESET is a CORESET associated with a smallest UE-specific search space set identifier in the M CORESETs.

In a sixth implementation of determining the highest-priority CORESET, if none of the M CORESETs is associated with a common search space set CSS, cell identifiers associated with at least two of the M CORESETs are different, and a smallest cell identifier in M cell identifiers associated with the M CORESETs is associated with only one of the M CORESETs, the highest-priority CORESET is the CORESET associated with the smallest cell identifier in the M CORESETs.

In a seventh implementation of determining the highest-priority CORESET, if none of the M CORESETs is associated with a common search space set CSS, cell identifiers associated with at least two of the M CORESETs are different, and a smallest cell identifier in M cell identifiers associated with the M CORESETs is associated with at least two of the M CORESETs, the highest-priority CORESET is a CORESET associated with a smallest UE-specific search space set identifier in the CORESETs associated with the smallest cell identifier in the M CORESETs.

FIG. 6 is used as an example for description. Assuming that the first PDCCH MO is the PDCCH MO #2 in FIG. 6, and the second PDCCH MO is the PDCCH MO #3 in FIG. 6, it can be learned that the PDCCH MO #2 and the PDCCH MO #3 have an overlapping second time unit in the time domain, and the PDCCH MO #2 and the PDCCH MO #3 form a PDCCH MO set.

Further, as shown in FIG. 6, because the PDCCH MO #4 and the PDCCH MO #2 have an overlapping second time unit in time domain, the PDCCH MO #4 is added to the PDCCH MO set including the PDCCH MO #2 and the PDCCH MO #3, that is, the PDCCH MO #4 is an element in the PDCCH MO set including the PDCCH MO #2 and the PDCCH MO #3.

Further, as shown in FIG. 6, the PDCCH MO #5 and the PDCCH MO #4 have an overlapping second time unit in time domain, and the PDCCH MO #4 is an element in the PDCCH MO set including the PDCCH MO #2 and the PDCCH MO #3. Therefore, the PDCCH MO #5 is added to the PDCCH MO set including the PDCCH MO #2 and the PDCCH MO #3, that is, the PDCCH MO #5 is an element in the PDCCH MO set including the PDCCH MO #2 and the PDCCH MO #3.

It can be learned that the PDCCH MO set including the PDCCH MO #2 and the PDCCH MO #3 includes the PDCCH MO #2, the PDCCH MO #3, the PDCCH MO #4, and the PDCCH MO #5. As shown in FIG. 6, the PDCCH MO #6 does not overlap with each element in the PDCCH MO set including the PDCCH MO #2 and the PDCCH MO #3. Therefore, the PDCCH MO #6 is not an element in the PDCCH MO set including the PDCCH MO #2 and the PDCCH MO #3. Similarly, none of the PDCCH MO #7, the PDCCH MO #8, the PDCCH MO #9, the PDCCH MO #10, and the PDCCH MO #1 is an element in the PDCCH MO set including the PDCCH MO #2 and the PDCCH MO #3.

As shown in FIG. 6, according to the solution 2, the PDCCH MO #6, the PDCCH MO #7, and the PDCCH MO #8 in FIG. 6 may alternatively form a PDCCH MO set. The PDCCH MO #9 and the PDCCH MO #10 in FIG. 6 may alternatively form a PDCCH MO set. The PDCCH MO #1 associated with the CORESET #1 in the secondary cell 601 in FIG. 6 may independently form a PDCCH MO set. In this case, for the PDCCH MO set including the PDCCH MO #1, the terminal device monitors the PDCCH on the CORESET #1 in the secondary cell 601.

According to the solution 2, for the PDCCH MO set including the PDCCH MO #2, the PDCCH MO #3, the PDCCH MO #4, and the PDCCH MO #5 in FIG. 6, the PDCCH MO #2 is associated with the CORESET #1 in the secondary cell 601, the PDCCH MO #3 is associated with the CORESET #2 in the secondary cell 601, the PDCCH MO #4 is associated with the CORESET #3 in the secondary cell 601, and the PDCCH MO #5 is associated with the CORESET #4 in the primary cell 602. In addition, the CORESETs in the PDCCH MO set are all associated with the USSs, the identifier of the secondary cell 601 is the smallest, and the identifier of the USS #1 of the CORESET #2 in the secondary cell 601 is the smallest. Therefore, the CORESET #2 in the secondary cell 601 is selected as the highest-priority CORESET. The terminal device monitors the PDCCH on the CORESET #2 in the secondary cell 601. This may also be described as that the PDCCH MO #3 associated with the CORESET #2 in the secondary cell 601 is monitored. Further, optionally, other elements in the monitoring occasion group are discarded, that is, the PDCCH MO #2, the PDCCH MO #4, and the PDCCH MO #5 are discarded.

According to the solution 2, for the PDCCH MO set including the PDCCH MO #6, the PDCCH MO #7, and the PDCCH MO #8 in FIG. 6, the CORESETs associated with the PDCCH MO #6, the PDCCH MO #7, and the PDCCH MO #8 are all CORESETs in the primary cell 602, and the CORESETs associated with the PDCCH MO #6, the PDCCH MO #7, and the PDCCH MO #8 are all associated with the CSSs. Therefore, the CORESET #1 associated with the CSS #0 in the primary cell 602 is selected as the highest-priority CORESET. The terminal device monitors the PDCCH on the CORESET #1 in the primary cell 602. This may also be described as that the PDCCH MO #6 and the PDCCH MO #7 associated with the CORESET #1 in the primary cell 602 are monitored. Further, optionally, another element in the monitoring occasion group is discarded, that is, the PDCCH MO #8 is discarded.

According to the solution 2, for the PDCCH MO set including the PDCCH MO #9 and the PDCCH MO #10 in FIG. 6, the CORESET #1 associated with the PDCCH MO #10 is associated with the CSS. Therefore, the CORESET #1 in the secondary cell 604 is selected as the highest-priority CORESET corresponding to the PDCCH MO set including the PDCCH MO #9 and the PDCCH MO #10. The terminal device monitors the PDCCH on the CORESET #1 in the secondary cell 604. This may also be described as that the PDCCH MO #10 associated with the CORESET #1 in the secondary cell 604 is monitored. Further, another element in the monitoring occasion group is discarded, that is, the PDCCH MO #9 is discarded.

In this embodiment of this application, a new term "indirect overlapping relationship" may be defined. The "indirect overlapping relationship" means that two elements have no direct overlapping relationship but have a direct overlapping relationship with elements having a direct overlapping relationship with the two elements. The direct overlapping relationship specifically means that two elements occupy at least one second time unit. The first PDCCH MO has the overlapping second time unit with the second PDCCH MO in time domain, the third PDCCH MO does not have an overlapping second time unit with the first PDCCH MO and the second PDCCH MO in time domain, the fourth PDCCH MO has the overlapping second time unit with the first PDCCH MO or the second PDCCH MO in time domain; and the third PDCCH MO has the overlapping second time unit with the fourth PDCCH MO in time domain. Therefore, the first PDCCH MO has a direct overlapping relationship with the second PDCCH MO, the third PDCCH MO has a direct overlapping relationship with the fourth PDCCH MO, but the third PDCCH MO has an indirect overlapping relationship with the second PDCCH MO, and the third PDCCH MO has an indirect overlapping relationship with the first PDCCH MO. As shown in FIG. 6, the PDCCH MO #2 has a direct overlapping relationship with the PDCCH MO #3, but the PDCCH MO #3 has an indirect overlapping relationship with the PDCCH MO #4. This may also be described as that the PDCCH MO #3 having a direct overlapping relationship with the PDCCH MO #2 has an indirect overlapping relationship with the PDCCH MO #4. In this case, the PDCCH MO #3 has an indirect overlapping relationship with the PDCCH MO #4. For another example, the PDCCH MO #5 has an indirect overlapping relationship with the PDCCH MO #3. Further, based on the definition, it may also be described as that any two elements included in a PDCCH MO set including the first PDCCH MO and the second PDCCH MO in this embodiment of this application may have a direct overlapping relationship or an indirect overlapping relationship.

In the solution 2, another solution for determining the PDCCH MO set including the first PDCCH MO and the second PDCCH MO is provided. The solution may be performed by the terminal device, or may be performed by the network device. The terminal device is used as an example for description. An action performed on a network device side is similar to that performed on a terminal device side, and details are not described again. The terminal device sorts N PDCCH MOs in a first time unit. There are a plurality of sorting rules. The following provides a possible sorting priority:

if the two PDCCH MOs have different start symbols, a PDCCH MO with an earlier start symbol has a higher priority;
if the two PDCCH MOs have a same start symbol, a PDCCH MO with longer duration has a higher priority;
if the two PDCCH MOs have a same start symbol and same duration, two CORESETs associated with the two PDCCH MOs are both associated with common search space sets CSSs, and two cell identifiers associated with the two CORESETs associated with the two PDCCH MOs are the same, a PDCCH MO associated with a CORESET associated with a smaller CSS identifier has a higher priority;
if the two PDCCH MOs have a same start symbol and same duration, two CORESETs associated with the two PDCCH MOs are both associated with common search space sets CSSs, and two cell identifiers associated with the two CORESETs associated with the two PDCCH MOs are different, a PDCCH MO associated with a CORESET associated with a smaller cell identifier has a higher priority;
if the two PDCCH MOs have a same start symbol and same duration, and only one of two CORESETs associated with the two PDCCH MOs is associated with a common search space set CSS, a PDCCH MO associated with the CORESET associated with the CSS has a higher priority;
if the two PDCCH MOs have a same start symbol and same duration, none of two CORESETs associated with the two PDCCH MOs is associated with a common search space set CSS, and two cell identifiers associated with the two CORESETs associated with the two PDCCH MOs are the same, a PDCCH MO associated with a CORESET associated with a smaller USS identifier has a higher priority; or
if the two PDCCH MOs have a same start symbol and same duration, none of two CORESETs associated with the two PDCCH MOs is associated with a common search space set CSS, and two cell identifiers associated with the two CORESETs associated with the two PDCCH MOs are different, a PDCCH MO associated with a CORESET associated with a smaller cell identifier has a higher priority.

The PDCCH MO #1, the PDCCH MO #2, the PDCCH MO #3, the PDCCH MO #4, and the PDCCH MO #5 in FIG. 6 are used as an example for description. The PDCCH MO #1, the PDCCH MO #2, the PDCCH MO #3, the PDCCH MO #4, and the PDCCH MO #5 are sorted. Because a start symbol of the PDCCH MO #/5 is the time-domain symbol 0, and the start symbol is the earliest. A start symbol of the PDCCH MO #/3 is the time-domain symbol 2. A start symbol of the PDCCH MO #/1 is the time-domain symbol 8, and the start symbol is the latest. In addition, start symbols of the PDCCH MO #2 and the PDCCH MO #4 are both the time-domain symbol 1, duration of the PDCCH MO #2 is two time-domain symbols, and duration of the PDCCH MO #4 is one time-domain symbol. Therefore, a priority of the PDCCH MO #2 is higher than that of the PDCCH MO #4. Based on this, the PDCCH MO #5, the PDCCH MO #2, the PDCCH MO #4, the PDCCH MO #3, and the PDCCH MO #1 are sorted in sequence.

After the N PDCCH MOs are sorted based on the priorities of the foregoing sorting, the N PDCCH MOs are determined one by one based on the sorting sequence. If an $i^{th}$ PDCCH MO and an $(i+1)^{th}$ PDCCH MO have an overlapping second time unit in time domain, and associated CORESETs have different quasi co-location properties, it is considered that a PDCCH MO that has an overlapping second time unit with the $(i+1)^{th}$ PDCCH MO in time domain and whose associated CORESET has a different quasi co-location property also has an overlapping second time unit with the $i^{th}$ PDCCH MO in time domain and the associated CORESET has a different quasi co-location property. For example, if an $(i+2)^{th}$ PDCCH MO and the $(i+1)^{th}$ PDCCH MO have an overlapping second time unit in time domain, and associated CORESETs have different quasi co-location properties, it is considered that the $(i+2)^{th}$ PDCCH MO and the $i^{th}$ PDCCH MO have an overlapping second time unit in time domain, and the associated CORESETs have different quasi co-location properties. The L PDCCH MOs may also be obtained according to the method. As shown in FIG. 6, according to this solution, it may be considered that any two of the PDCCH MO #5, the PDCCH MO #2, the PDCCH MO #4, and the PDCCH MO #3 have an overlapping second time unit in time domain, and associated CORESETs have different quasi co-location properties.

Solution 3

Figure 8:
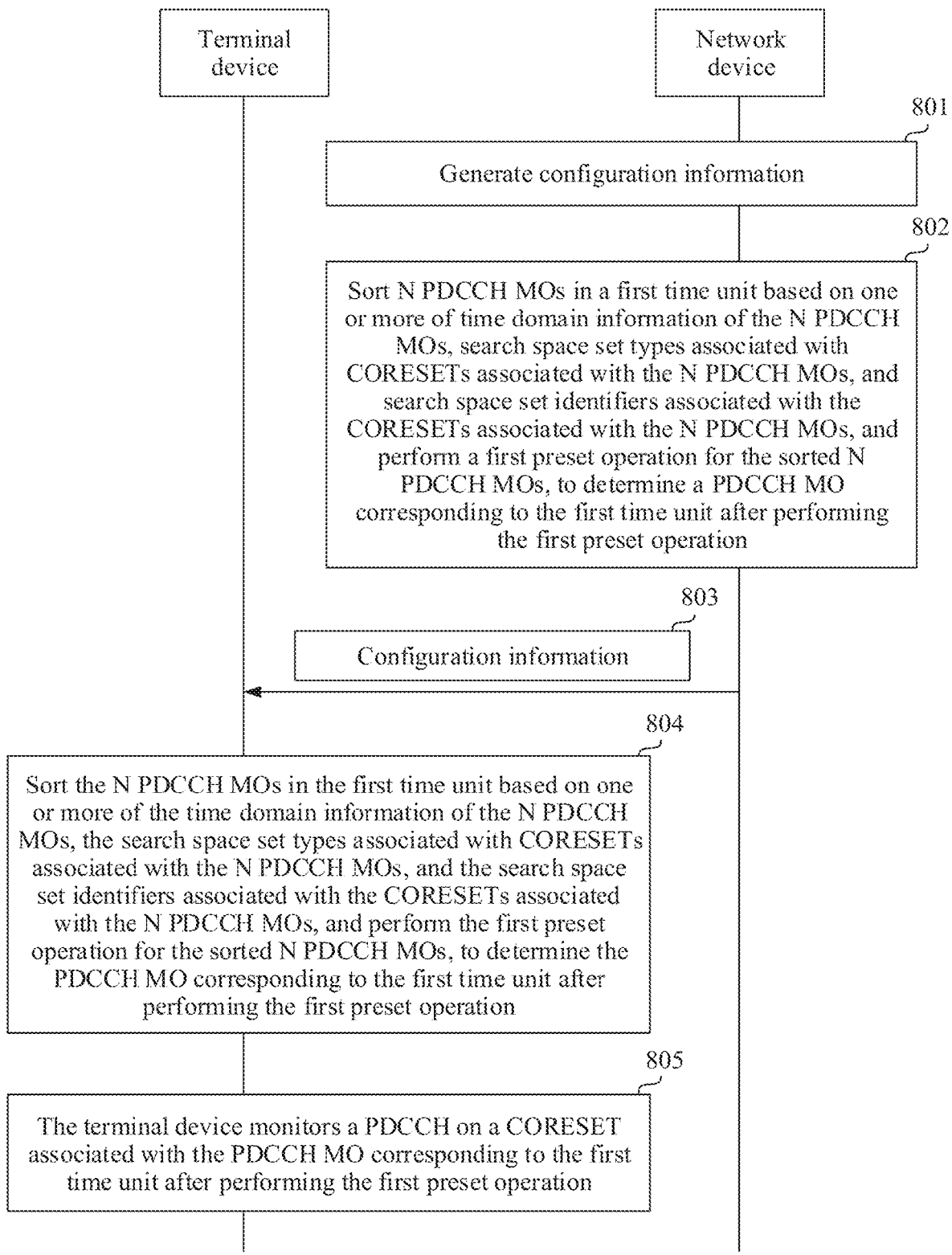
FIG. 8 is a schematic flowchart of another communication method according to an embodiment of this application.

FIG. 8 shows an example of a schematic flowchart of a communication method. As shown in FIG. 8, the method includes the following steps.

Step 801: A network device generates configuration information.

The configuration information is used to indicate one or more of cell identifiers, quasi co-location properties, search space set types, and search space set identifiers that are associated with T control-resource sets CORESETs in a first time unit.

Step 802: The network device sorts N physical downlink control channel monitoring occasions PDCCH MOs in the first time unit based on one or more of time domain information of the N PDCCH MOs, search space set types associated with CORESETs associated with the N PDCCH MOs, and search space set identifiers associated with the CORESETs associated with the N PDCCH MOs. A first preset operation is performed for the sorted N PDCCH MOs, to determine a PDCCH MO corresponding to the first time unit after the first preset operation is performed.

N is an integer greater than 1.

Step 803: The network device sends the configuration information to a terminal device.

Step 803 may be performed before step 802, or may be performed after step 802.

Step 804: The terminal device sorts the N physical downlink control channel monitoring occasions PDCCH MOs in the first time unit based on one or more of the time domain information of the N PDCCH MOs, the search space set types associated with the CORESETs associated with the N PDCCH MOs, and the search space set identifiers associated with the CORESETs associated with the N PDCCH MOs. The first preset operation is performed for the sorted N PDCCH MOs, to determine the PDCCH MO corresponding to the first time unit after the first preset operation is performed.

In step 802 and step 804, for an it PDCCH MO and an $(i+k)^{th}$ PDCCH MO in the N PDCCH MOs, where both i and k are positive integers not greater than N, and a value of i+k is a positive integer not greater than N:

if the $i^{th}$ PDCCH MO and the $(i+k)^{th}$ PDCCH MO in the N PDCCH MOs have an overlapping second time unit in time domain, and associated CORESETs have different quasi co-location properties, selecting a highest-priority CORESET from a CORESET associated with the $i^{th}$ PDCCH MO and a CORESET associated with the $(i+k)^{th}$ PDCCH MO based on one or more of a cell identifier, a search space set type, and a search space set identifier that are associated with the CORESET associated with the $i^{th}$ PDCCH MO and one or more of a cell identifier, a search space set type, and a search space set identifier that are associated with the CORESET associated with the $(i+k)^{th}$ PDCCH MO; and discarding, from the $i^{th}$ PDCCH MO and the $(i+k)^{th}$ PDCCH MO, a PDCCH MO other than a PDCCH MO associated with the highest-priority CORESET.

There is no fixed sequence between step 804 and step 802, and step 804 may be performed before step 802 or after step 802.

Step 805: The terminal device monitors a PDCCH on a CORESET associated with the PDCCH MO corresponding to the first time unit after performing the first preset operation.

In step 802 and step 804, the time domain information of the N PDCCH MOs includes a start symbol and duration of each of the N PDCCH MOs. For two of the N PDCCH MOs, the following optional implementations of sorting are provided.

In an optional implementation of sorting, if the two PDCCH MOs have different start symbols, a PDCCH MO with an earlier start symbol has a higher priority. Optionally, if the two PDCCH MOs have different start symbols, a PDCCH MO with an earlier start symbol has a lower priority. In this embodiment of this application, only an optional sorting manner is provided, and a specific sorting manner may be flexibly adjusted.

In an optional implementation of sorting, if the two PDCCH MOs have a same start symbol, a PDCCH MO with longer duration has a higher priority. Optionally, if the two PDCCH MOs have a same start symbol, a PDCCH MO with longer duration has a lower priority.

In an optional implementation of sorting, if the two PDCCH MOs have a same start symbol and same duration, two CORESETs associated with the two PDCCH MOs are both associated with common search space sets CSSs, and two cell identifiers associated with the two CORESETs associated with the two PDCCH MOs are the same, a PDCCH MO associated with a CORESET associated with a smaller CSS identifier has a higher priority. Optionally, if the two PDCCH MOs have a same start symbol and same duration, two CORESETs associated with the two PDCCH MOs are both associated with common search space sets CSSs, and two cell identifiers associated with the two CORESETs associated with the two PDCCH MOs are the same, a PDCCH MO associated with a CORESET associated with a smaller CSS identifier has a lower priority.

In an optional implementation of sorting, if the two PDCCH MOs have a same start symbol and same duration, two CORESETs associated with the two PDCCH MOs are both associated with common search space sets CSSs, and two cell identifiers associated with the two CORESETs associated with the two PDCCH MOs are different, a PDCCH MO associated with a CORESET associated with a smaller cell identifier has a higher priority. Optionally, if the two PDCCH MOs have a same start symbol and same duration, two CORESETs associated with the two PDCCH MOs are both associated with common search space sets CSSs, and two cell identifiers associated with the two CORESETs associated with the two PDCCH MOs are different, a PDCCH MO associated with a CORESET associated with a smaller cell identifier has a lower priority.

In an optional implementation of sorting, if the two PDCCH MOs have a same start symbol and same duration, and only one of two CORESETs associated with the two PDCCH MOs is associated with a common search space set CSS, a PDCCH MO associated with the CORESET associated with the CSS has a higher priority. Optionally, if the two PDCCH MOs have a same start symbol and same duration, and only one of two CORESETs associated with the two PDCCH MOs is associated with a common search space set CSS, a PDCCH MO associated with the CORESET associated with the CSS has a lower priority.

In an optional implementation of sorting, if the two PDCCH MOs have a same start symbol and same duration, none of two CORESETs associated with the two PDCCH MOs is associated with a common search space set CSS, and two cell identifiers associated with the two CORESETs associated with the two PDCCH MOs are the same, a PDCCH MO associated with a CORESET associated with a smaller USS identifier has a higher priority. Optionally, if the two PDCCH MOs have a same start symbol and same duration, none of two CORESETs associated with the two PDCCH MOs is associated with a common search space set CSS, and two cell identifiers associated with the two CORESETs associated with the two PDCCH MOs are the same, a PDCCH MO associated with a CORESET associated with a smaller USS identifier has a lower priority.

In an optional implementation of sorting, if the two PDCCH MOs have a same start symbol and same duration, none of two CORESETs associated with the two PDCCH MOs is associated with a common search space set CSS, and two cell identifiers associated with the two CORESETs associated with the two PDCCH MOs are different, a PDCCH MO associated with a CORESET associated with a smaller cell identifier has a higher priority. Optionally, if the two PDCCH MOs have a same start symbol and same duration, none of two CORESETs associated with the two PDCCH MOs is associated with a common search space set CSS, and two cell identifiers associated with the two CORESETs associated with the two PDCCH MOs are different, a PDCCH MO associated with a CORESET associated with a smaller cell identifier has a lower priority.

The foregoing content provides only one optional implementation of sorting. During specific implementation, there may be a plurality of sorting manners.

In an implementation of determining the highest-priority CORESET, if only one of the CORESET associated with the $i^{th}$ PDCCH MO and the CORESET associated with the $(i+k)^{th}$ PDCCH MO is associated with a CSS, the highest-priority CORESET is the CORESET associated with the CSS.

In a second implementation of determining the highest-priority CORESET, if both the CORESET associated with the $i^{th}$ PDCCH MO and the CORESET associated with the $(i+k)^{th}$ PDCCH MO are associated with a CSS, and a cell identifier associated with the CORESET associated with the $i^{th}$ PDCCH MO is the same as that of the CORESET associated with the $(i+k)^{th}$ PDCCH MO, the highest-priority CORESET is a CORESET associated with a smaller common search space set identifier.

In a third implementation of determining the highest-priority CORESET, if both the CORESET associated with the $i^{th}$ PDCCH MO and the CORESET associated with the $(i+k)^{th}$ PDCCH MO are associated with CSSs, and a cell identifier associated with the CORESET associated with the $i^{th}$ PDCCH MO is different from that of the CORESET associated with the $(i+k)^{th}$ PDCCH MO, the highest-priority CORESET is a CORESET associated with a smaller cell identifier.

In a fourth implementation of determining the highest-priority CORESET, if none of the CORESET associated with the $i^{th}$ PDCCH MO and the CORESET associated with the $(i+k)^{th}$ PDCCH MO is associated with a CSS, and a cell identifier associated with the CORESET associated with the $i^{th}$ PDCCH MO is the same as that of the CORESET associated with the $(i+k)^{th}$ PDCCH MO, the highest-priority CORESET is a CORESET associated with a smaller UE-specific search space set identifier.

In a fifth implementation of determining the highest-priority CORESET, if none of the CORESET associated with the $i^{th}$ PDCCH MO and the CORESET associated with the $(i+k)^{th}$ PDCCH MO is associated with a CSS, and a cell identifier associated with the CORESET associated with the $i^{th}$ PDCCH MO is different from that of the CORESET associated with the $(i+k)^{th}$ PDCCH MO, the highest-priority CORESET is a CORESET associated with a smaller cell identifier.

The solution 3 is applied to FIG. 6. The PDCCH MO #2, the PDCCH MO #3, the PDCCH MO #4, and the PDCCH MO #5 in FIG. 6 are used as an example for description. The PDCCH MO #2, the PDCCH MO #3, the PDCCH MO #4, and the PDCCH MO #5 are sorted. Because a start symbol of the PDCCH MO #/5 is the time-domain symbol 0, and the start symbol is the earliest. A start symbol of the PDCCH MO #/3 is the time-domain symbol 2. In addition, start symbols of the PDCCH MO #2 and the PDCCH MO #4 are both the time-domain symbol 1, duration of the PDCCH MO #2 is two time-domain symbols, and duration of the PDCCH MO #4 is one time-domain symbol. Therefore, a priority of the PDCCH MO #2 is higher than that of the PDCCH MO #4. Based on this, the PDCCH MO #5, the PDCCH MO #2, the PDCCH MO #4, and the PDCCH MO #3 are sorted in sequence.

Similarly, as shown in FIG. 6, all the PDCCH MOs in FIG. 6 are sorted based on to the foregoing sorting rule provided in the solution 3. The sorted PDCCH MOs are the PDCCH MO #5, the PDCCH MO #2, the PDCCH MO #4, the PDCCH MO #3, the PDCCH MO #8, the PDCCH MO #6, the PDCCH MO #7, the PDCCH MO #9, the PDCCH MO #10, and the PDCCH MO #1 in sequence.

After the N PDCCH MOs are sorted based on the priorities of the foregoing sorting, the N PDCCH MOs are determined one by one based on the sorting sequence. If an $i^{th}$ PDCCH MO and an $(i+1)^{th}$ PDCCH MO have an overlapping second time unit in time domain, and associated CORESETs have different quasi co-location properties, it is considered that a PDCCH MO that has an overlapping second time unit with the $(i+1)^{th}$ PDCCH MO in time domain and whose associated CORESET has a different quasi co-location property also has an overlapping second time unit with the $i^{th}$ PDCCH MO in time domain and the associated CORESET has a different quasi co-location property. For example, if an $(i+2)^{th}$ PDCCH MO and the $(i+1)^{th}$ PDCCH MO have an overlapping second time unit in time domain, and associated CORESETs have different quasi co-location properties, it is considered that the $(i+2)^{th}$ PDCCH MO and the $i^{th}$ PDCCH MO have an overlapping second time unit in time domain, and the associated CORESETs have different quasi co-location properties. The L PDCCH MOs may also be obtained according to the method. As shown in FIG. 6, according to this solution, it may be considered that any two of the PDCCH MO #5, the PDCCH MO #2, the PDCCH MO #4, and the PDCCH MO #3 have an overlapping second time unit in time domain, and associated CORESETs have different quasi co-location properties.

The first preset operation in this embodiment of this application specifically means that the N PDCCH MOs are identified one by one according to a sequence of the N PDCCH MOs. If two adjacent PDCCH MOs overlap and associated CORESETs have different quasi co-location properties, one PDCCH MO is discarded or one PDCCH MO is selected. The discarded PDCCH MO is not used when determining is performed again. Descriptions are provided below by using FIG. 6 as an example.

The solution 3 is applied to FIG. 6. The sorted PDCCH MOs are determined in sequence. The PDCCH MO #5 and the PDCCH MO #2 are first identified. The PDCCH MO #5 and the PDCCH MO #2 have an overlapping second time unit in time domain, the associated CORESETs have different quasi co-location properties, the associated CORESETs are both associated with the USSs, and the cell identifier associated with the CORESET associated with the PDCCH MO #2 is the cell identifier of the secondary cell 601, which is a smaller cell identifier. Therefore, the CORESET associated with the PDCCH MO #2 is selected as the highest-priority CORESET this time. This may also be described as that the PDCCH MO #5 is discarded from the $1^{st}$ PDCCH MO (the PDCCH MO #5) and the $2^{nd}$ PDCCH MO (the PDCCH MO #2), and the PDCCH MO #2 is remained. In this case, the sequence is updated as: the PDCCH MO #2, the PDCCH MO #4, the PDCCH MO #3, the PDCCH MO #8, the PDCCH MO #6, the PDCCH MO #7, the PDCCH MO #9, the PDCCH MO #10, and the PDCCH MO #1.

The solution 3 is applied to the updated sequence. The PDCCH MO #2 and the PDCCH MO #4 are identified. The PDCCH MO #4 and the PDCCH MO #2 have an overlapping second time unit in time domain, the associated CORESETs have different quasi co-location properties, the associated CORESETs are both associated with the USSs, and the USS #3 associated with the CORESET associated with the PDCCH MO #2 is less than the USS #4 associated with the CORESET associated with the PDCCH MO #4. Therefore, the CORESET associated with the PDCCH MO #2 is selected as the highest-priority CORESET this time. This may also be described as that the PDCCH MO #4 is discarded from the $1^{st}$ PDCCH MO (the PDCCH MO #2) and the $3^{rd}$ PDCCH MO (where the PDCCH MO #4 ranks the $3^{rd}$ in the original sorted sequence), and the PDCCH MO #2 is remained. In this case, the sequence is updated as: the PDCCH MO #2, the PDCCH MO #3, the PDCCH MO #8, the PDCCH MO #6, the PDCCH MO #7, the PDCCH MO #9, the PDCCH MO #10, and the PDCCH MO #1.

Similar to the foregoing content, the PDCCH MO #2 and the PDCCH MO #3 are determined. Because the PDCCH MO #2 and the PDCCH MO #3 overlap in time domain, the PDCCH MO #3 is remained, and the PDCCH MO #2 is discarded. Then, the PDCCH MO #3 and the PDCCH MO #8 are determined. Because the PDCCH MO #3 and the PDCCH MO #8 do not overlap in time domain, both the PDCCH MO #3 and the PDCCH MO #8 are remained. Then, the PDCCH MO #8 and the PDCCH MO #6 are determined, the PDCCH MO #8 is discarded, and the PDCCH MO #6 is remained. Then, the PDCCH MO #6 and the PDCCH MO #7 are determined. Because the PDCCH MO #6 and the PDCCH MO #7 do not overlap in time domain, both the PDCCH MO #6 and the PDCCH MO #7 are remained. Then, the PDCCH MO #7 and the PDCCH MO #9 are determined. Because the PDCCH MO #7 and the PDCCH MO #9 do not overlap in time domain, both the PDCCH MO #7 and the PDCCH MO #9 are remained. Then, the PDCCH MO #9 and the PDCCH MO #10 are determined, the PDCCH MO #9 is discarded, and the PDCCH MO #10 is remained. Then, the PDCCH MO #10 and the PDCCH MO #1 are determined. Because the PDCCH MO #10 and the PDCCH MO #1 do not overlap in time domain, both the PDCCH MO #10 and the PDCCH MO #1 are remained. After the first preset operation is performed, the PDCCH MOs corresponding to the first time unit are the PDCCH MO #3, the PDCCH MO #6, the PDCCH MO #7, the PDCCH MO #10, and the PDCCH MO #1. The terminal device monitors the PDCCH on a CORESET associated with the PDCCH MOs corresponding to the first time unit after performing the first preset operation.

Solution 4

Figure 9:
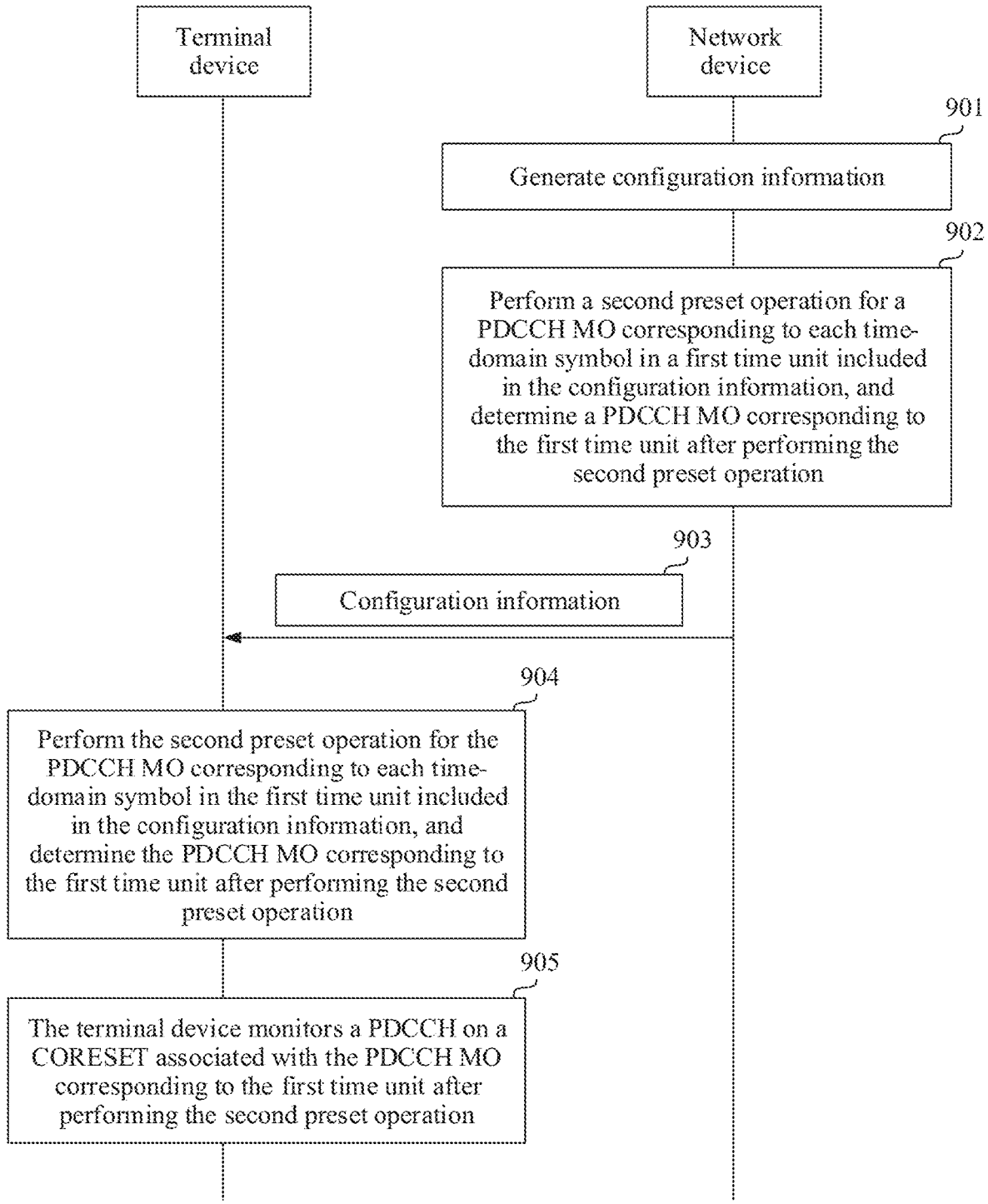
FIG. 9 is a schematic flowchart of another communication method according to an embodiment of this application.

FIG. 9 shows an example of a schematic flowchart of a communication method. As shown in FIG. 9, the method includes the following steps.

Step 901: A network device generates configuration information.

The configuration information is used to indicate one or more of cell identifiers, quasi co-location properties, search space set types, and search space set identifiers that are associated with T control-resource sets CORESETs in a first time unit.

Step 902: The network device performs a second preset operation for a PDCCH MO corresponding to each time-domain symbol in the first time unit included in the configuration information, and determines a PDCCH MO corresponding to the first time unit after performing the second preset operation.

Step 903: The network device sends the configuration information to a terminal device.

Step 903 may be performed before step 902, or may be performed after step 902.

Step 904: The terminal device performs the second preset operation for the PDCCH MO corresponding to each time-domain symbol in the first time unit, and determines the PDCCH MO corresponding to the first time unit after performing the second preset operation.

In step 902 and step 904, the second preset operation includes:

if the time-domain symbol is corresponding to a plurality of PDCCH MOs, the plurality of PDCCH MOs have an overlapping second time unit in time domain, and CORESETs associated with any two of the plurality of PDCCH MOs have different quasi co-location properties, determining a highest-priority CORESET corresponding to the time-domain symbol in M control-resource sets CORESETs corresponding to the time-domain symbol based on one or more of cell identifiers, search space set types, and search space set identifiers that are associated with the M CORESETs; and discarding, from the PDCCH MOs corresponding to the time-domain symbol, a PDCCH MO that has an overlapping second time unit with at least one PDCCH MO associated with the highest-priority CORESET corresponding to the time-domain symbol in time domain and whose associated CORESET has a different quasi co-location property, where the time-domain symbol is corresponding to the plurality of physical downlink control channel monitoring occasions PDCCH MOs, the plurality of PDCCH MOs are associated with the M CORESETs, M is a positive integer, one of the plurality of PDCCH MOs is associated with one of the M CORESETs, and one of the M CORESETs is associated with one or more of the plurality of PDCCH MOs.

In step 902 and step 904, the time-domain symbols are determined one by one starting from a start symbol of the first time unit. Alternatively, the time-domain symbols are determined one by one starting from the earliest time-domain symbol of the PDCCH MOs corresponding to the first time unit.

There is no fixed sequence between step 904 and step 902, and step 904 may be performed before step 902 or after step 902.

Step 905: The terminal device monitors a PDCCH on a CORESET associated with the PDCCH MO corresponding to the first time unit after performing the second preset operation.

In step 902 and step 904, there are a plurality of means for selecting the highest-priority PDCCH MO. Detailed descriptions are provided below.

If only one of the M CORESETs is associated with a common search space set CSS, the highest-priority CORESET is the CORESET associated with the CSS in the M CORESETs.

In a first implementation of determining the highest-priority CORESET, if K CORESETs in the M CORESETs are associated with common search space sets CSSs, K is a positive integer not greater than M, and K cell identifiers associated with the K CORESETs are all the same, the highest-priority CORESET is a CORESET associated with a smallest common search space set identifier in the K CORESETs.

In a second implementation of determining the highest-priority CORESET, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is the CORESET associated with the smallest cell identifier in the K CORESETs.

In a third implementation of determining the highest-priority CORESET, if K CORESETs in the M CORESETs are associated with common search space sets CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest common search space set identifier in the CORESETs associated with the smallest cell identifier in the K CORESETs.

In a fourth implementation of determining the highest-priority CORESET, if none of the M CORESETs is associated with a common search space set CSS, and M cell identifiers associated with the M CORESETs are all the same, the highest-priority CORESET is a CORESET associated with a smallest UE-specific search space set identifier in the M CORESETs.

In a fifth implementation of determining the highest-priority CORESET, if none of the M CORESETs is associated with a common search space set CSS, cell identifiers associated with at least two of the M CORESETs are different, and a smallest cell identifier in M cell identifiers associated with the M CORESETs is associated with only one of the M CORESETs, the highest-priority CORESET is the CORESET associated with the smallest cell identifier in the M CORESETs.

In a sixth implementation of determining the highest-priority CORESET, if none of the M CORESETs is associated with a common search space set CSS, cell identifiers associated with at least two of the M CORESETs are different, and a smallest cell identifier in M cell identifiers associated with the M CORESETs is associated with at least two of the M CORESETs, the highest-priority CORESET is a CORESET associated with a smallest UE-specific search space set identifier in the CORESETs associated with the smallest cell identifier in the M CORESETs.

FIG. 6 is used as an example for description. As shown in FIG. 6, 14 time-domain symbols in one first time unit are determined one by one. The time-domain symbol 0 is first determined. It can be learned that the time-domain symbol 0 is corresponding to only the PDCCH MO #5, and therefore the PDCCH MO #5 is retained this time.

Then, the time-domain symbol 1 is determined. It can be learned that the time-domain symbol 1 is corresponding to the PDCCH MO #2, the PDCCH MO #4, and the PDCCH MO #5. The three PDCCH MOs have an overlapping second time unit in time domain, and any two of the three PDCCH MOs have different quasi co-location relationships. In this case, the highest-priority CORESET is selected from the CORESETs associated with the three PDCCH MOs as the CORESET associated with the PDCCH MO #2. The PDCCH MO #4 and the PDCCH MO #5 are discarded.

Then, the time-domain symbol 2 is determined. Because the PDCCH MO #2 is remained after the time-domain symbols 1 and 0 are determined, the PDCCH MO #2 also needs to be used when time-domain symbols are subsequently determined. However, the PDCCH MO #4 and the PDCCH MO #5 have been discarded, and therefore are not used when time-domain symbols are subsequently determined. Because the time-domain symbol 2 is corresponding to the PDCCH MO #2 and the PDCCH MO #3, the CORESET associated with the PDCCH MO #3 is selected as the highest-priority CORESET, and the PDCCH MO #2 is discarded. In this case, because the PDCCH MO #2 has been discarded, the PDCCH MO #2 is not used when time-domain symbols are subsequently determined.

According to the foregoing method, PDCCH MOs remained in FIG. 6 are the PDCCH MO #3, the PDCCH MO #6, the PDCCH MO #7, the PDCCH MO #10, and the PDCCH MO #1. That is, it is determined that, after the second preset operation is performed, the PDCCH MOs corresponding to the first time unit are the PDCCH MO #3, the PDCCH MO #6, the PDCCH MO #7, the PDCCH MO #10, and the PDCCH MO #1. The PDCCH is monitored on the CORESET associated with the PDCCH MOs corresponding to the first time unit after the second preset operation is performed.

Solution 5

Figure 10:
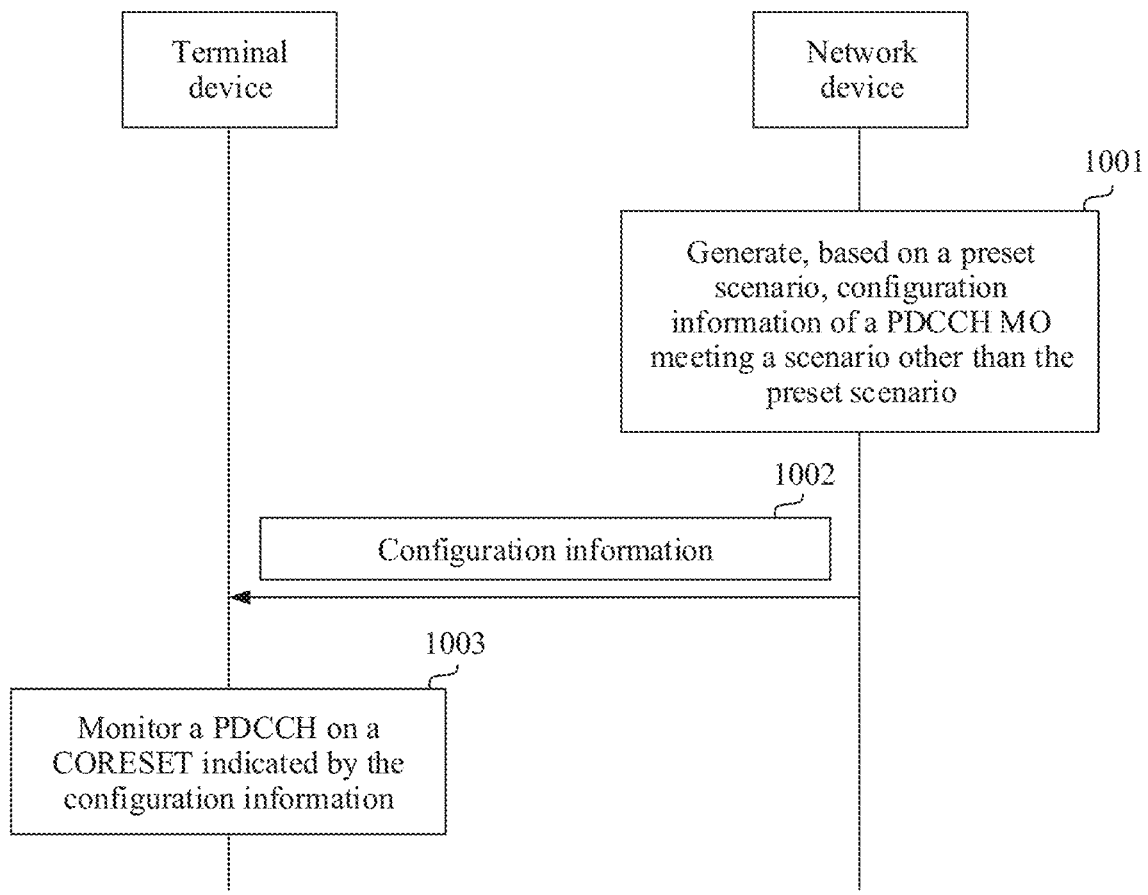
FIG. 10 is a schematic flowchart of another communication method according to an embodiment of this application.

FIG. 10 shows an example of a schematic flowchart of a communication method. As shown in FIG. 10, the method includes the following steps.

Step 1001: A network device generates, based on a preset scenario, configuration information of a PDCCH MO meeting a scenario other than the preset scenario.

Step 1002: The network device sends the configuration information.

Correspondingly, a terminal device receives the configuration information delivered by the network device, where the PDCCH MO indicated by the configuration information meets the scenario other than the preset scenario.

Step 1003: The terminal device monitors a PDCCH on a CORESET indicated by the configuration information.

The preset scenario includes:

a first PDCCH MO and a second PDCCH MO have an overlapping second time unit in time domain and associated CORESETs have different quasi co-location properties, the first PDCCH MO and a fifth PDCCH MO have an overlapping second time unit in time domain and associated CORESETs have different quasi co-location properties, and the second PDCCH MO and the fifth PDCCH MO do not have an overlapping second time unit in time domain; and the first PDCCH MO, the second PDCCH MO, and the fifth PDCCH MO are any three different PDCCH MOs that are configured for the terminal device and indicated by the configuration information.

FIG. 6 is used as example for description. It can be learned from FIG. 6 that the PDCCH MO #2 and the PDCCH MO #3 have an overlapping second time unit in time domain and associated CORESETs have different quasi co-location properties, the PDCCH MO #2 and the PDCCH MO #4 have an overlapping second time unit in time domain and associated CORESETs have different quasi co-location properties, and the PDCCH MO #3 and the PDCCH MO #4 do not overlap in time domain. In this case, the PDCCH MO #2, the PDCCH MO #3, and the PDCCH MO #4 meet the preset scenario. When a base station configures PDCCH MOs for the terminal device, this case should be avoided.

When the network device configures the PDCCH MOs according to the solution shown in FIG. 10, a rule in an existing protocol may be applied to monitor the PDCCH, or any one of the foregoing solutions 1 to 4 may be applied to monitor the PDCCH.

Solution 6

Figure 11:
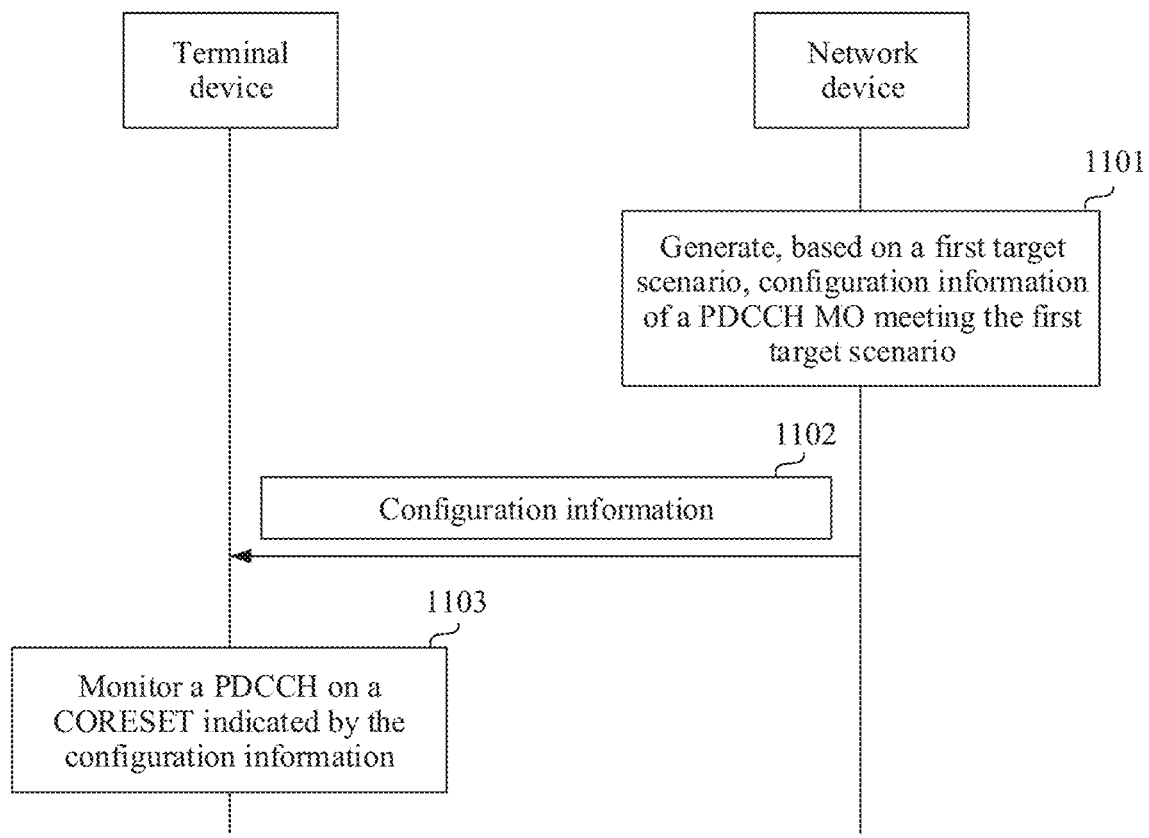
FIG. 11 is a schematic flowchart of another communication method according to an embodiment of this application.

FIG. 11 shows an example of a schematic flowchart of a communication method. As shown in FIG. 11, the method includes the following steps.

Step 1101: A network device generates, based on a first target scenario, configuration information of a PDCCH MO meeting the first target scenario.

Step 1102: The network device sends the configuration information.

Correspondingly, a terminal device receives the configuration information delivered by the network device, where the PDCCH MO indicated by the configuration information meets the first target scenario.

Step 1103: The terminal device monitors a PDCCH on a CORESET indicated by the configuration information.

The first target scenario includes:
a first PDCCH MO and a second PDCCH MO are any two different PDCCH MOs that are configured for the terminal device and indicated by the configuration information, the first PDCCH MO and the second PDCCH MO have an overlapping second time unit in time domain and associated CORESETs have different quasi co-location properties, and the first PDCCH MO and the second PDCCH MO meet any one or more of the following conditions:
the first PDCCH MO and the second PDCCH MO have a same start time-domain symbol;
the first PDCCH MO and the second PDCCH MO have a same end time-domain symbol;
the first PDCCH MO and the second PDCCH MO have a same start time-domain symbol, and a CORESET associated with the first PDCCH MO and a CORESET associated with the second PDCCH MO have same duration; or
the first PDCCH MO and the second PDCCH MO have a same end time-domain symbol, and a CORESET associated with the first PDCCH MO and a CORESET associated with the second PDCCH MO have same duration.

When the network device configures the PDCCH MOs according to the solution shown in FIG. 11, a rule in an existing protocol may be applied to monitor the PDCCH, or any one of the foregoing solutions 1 to 4 may be applied to monitor the PDCCH.

Solution 7

Figure 12:
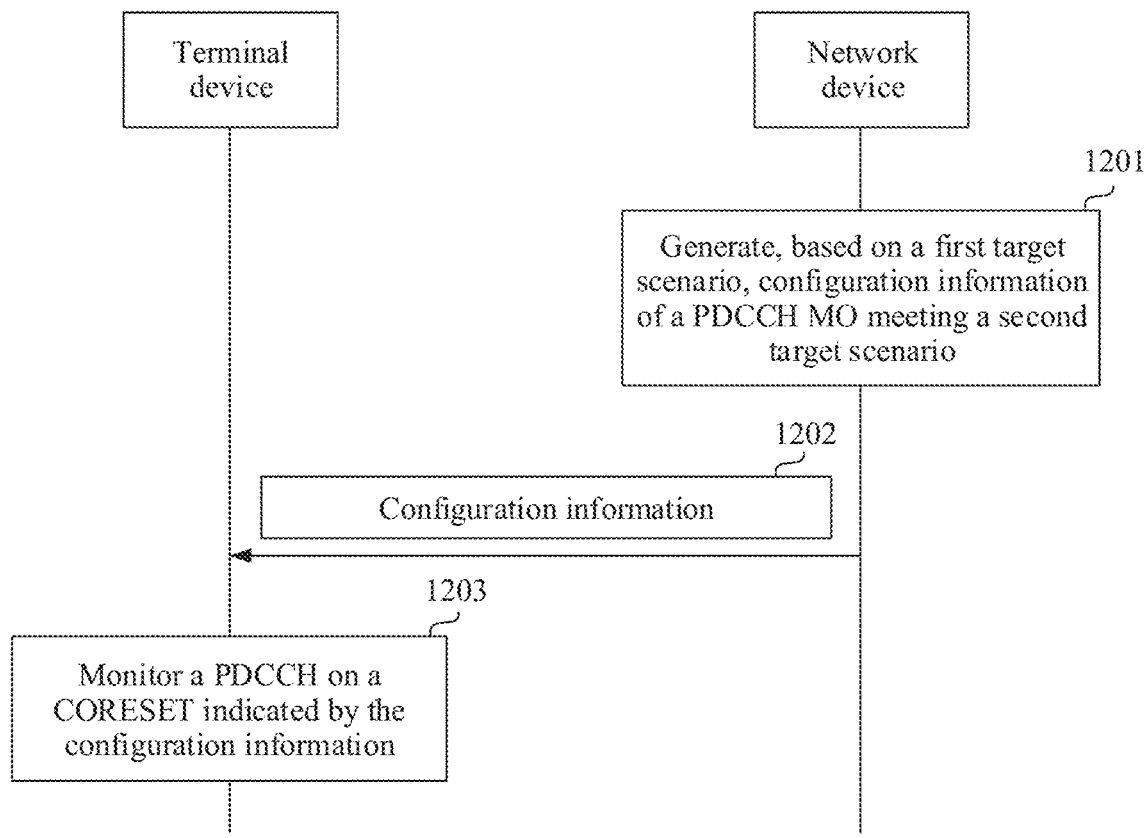
FIG. 12 is a schematic flowchart of another communication method according to an embodiment of this application.

FIG. 12 shows an example of a schematic flowchart of a communication method. As shown in FIG. 12, the method includes the following steps.

Step 1201: A network device generates, based on a second target scenario, configuration information of a PDCCH MO meeting the second target scenario.

Step 1202: The network device sends the configuration information.

Correspondingly, a terminal device receives the configuration information delivered by the network device, where the PDCCH MO indicated by the configuration information meets the second target scenario.

Step 1203: The terminal device monitors a PDCCH on a CORESET indicated by the configuration information.

The second target scenario includes: A maximum of two different quasi co-location properties exist in quasi co-location properties of CORESETs associated with PDCCH MOs configured in an active bandwidth part (active bandwidth part, active BWP).

When the network device configures the PDCCH MOs according to the solution shown in FIG. 12, a rule in an existing protocol may be applied to monitor the PDCCH, or any one of the foregoing solutions 1 to 4 may be applied to monitor the PDCCH.

Figure 13:
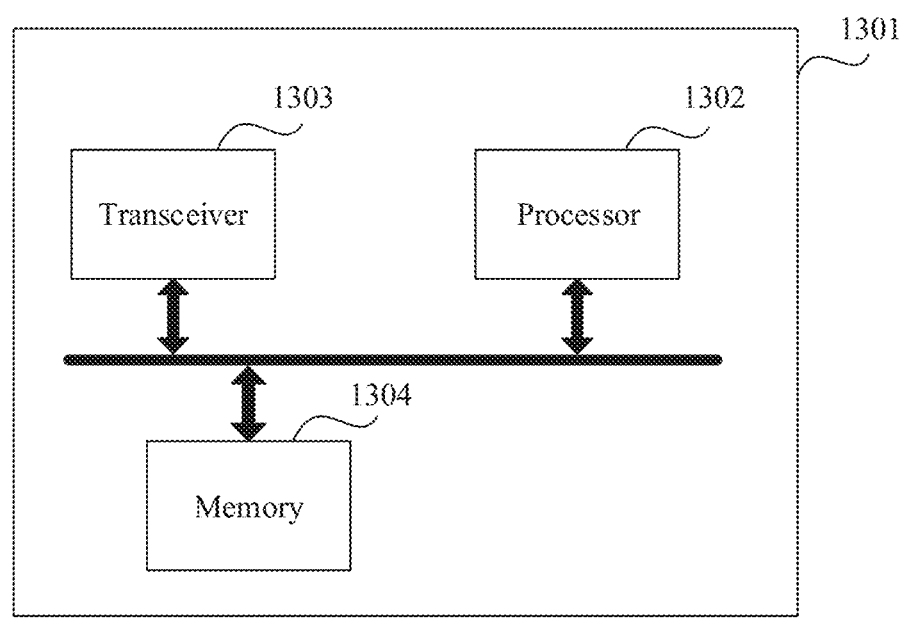
FIG. 13 is a schematic diagram of a structure of a communication apparatus according to an embodiment of this application.

Based on the foregoing methods, FIG. 13 is a schematic diagram of a structure of a communication apparatus according to an embodiment of this application. As shown in FIG. 13, the communication apparatus may be a terminal device or a network device, or may be a chip or a circuit, such as a chip or a circuit that can be disposed in the terminal device, or a chip or a circuit that can be disposed in the network device.

Further, the communication apparatus 1301 may further include a bus system. A processor 1302, a memory 1304, and a transceiver 1303 may be connected by using the bus system.

It should be understood that the processor 1302 may be a chip. For example, the processor 1302 may be a field programmable gate array (field programmable gate array, FPGA), an application-specific integrated chip (application specific integrated circuit, ASIC), a system on a chip (system on chip, SoC), a central processing unit (central processing unit, CPU), a network processor (network processor, NP), a digital signal processor (digital signal processor, DSP), a micro controller unit (micro controller unit, MCU), a programmable controller (programmable logic device, PLD), or another integrated chip.

In an implementation process, steps in the foregoing methods can be implemented by using an integrated logical circuit of hardware in the processor 1302, or by using instructions in a form of software. The steps of the methods disclosed with reference to the embodiments of this application may be directly performed and completed by a hardware processor, or may be performed and completed by using a combination of hardware and software modules in the processor 1302. The software module may be located in a mature storage medium in the art, such as a random access memory, a flash memory, a read-only memory, a programmable read-only memory, an electrically erasable programmable memory, or a register. The storage medium is located in the memory 1304, and the processor 1302 reads information in the memory 1304 and completes the steps of the foregoing method in combination with hardware of the processor 1302.

It should be noted that, the processor 1302 in this embodiment of this application may be an integrated circuit chip, and has a signal processing capability. In an implementation process, steps in the foregoing method embodiments can be implemented by using an integrated logical circuit of hardware in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware assembly. The processor may implement or perform the method, steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

It may be understood that the memory 1304 in this embodiment of this application may be a volatile memory or a non-volatile memory, or may include both the volatile memory and the non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through examples rather than limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and method described in this specification includes but is not limited to these and any memory of another appropriate type.

When the communication apparatus 1301 is corresponding to the terminal device in the foregoing method, the communication apparatus may include the processor 1302, the transceiver 1303, and the memory 1304. The memory 1304 is configured to store instructions. The processor 1302 is configured to execute the instructions stored in the memory 1304, to implement the related solution of the terminal device in one or more of the corresponding methods shown in FIG. 1 to FIG. 12.

When the communication apparatus 1301 is the terminal device, the communication apparatus 1301 may be configured to perform the method performed by the terminal device in any one of the foregoing solutions 1 to 7.

When the communication apparatus 1301 is the terminal device and performs the solution 1, the transceiver 1303 is configured to receive configuration information. The configuration information is used to indicate one or more of cell identifiers, quasi co-location properties, search space set types, and search space set identifiers that are associated with T control-resource sets CORESETs in a first time unit. The processor 1302 is configured to determine, in M CORESETs belonging to the T CORESETs, a highest-priority CORESET based on one or more of cell identifiers, quasi co-location properties, search space set types, and search space set identifiers that are associated with the M CORESETs in a time unit. To-be-monitored physical downlink control channel monitoring occasions PDCCH MOs in the first time unit are associated with the M CORESETs, M is a positive integer, one of the to-be-monitored PDCCH MOs in the first time unit is associated with one of the M CORESETs, and one of the M CORESETs is associated with one or more of the to-be-monitored PDCCH MOs in the first time unit. The transceiver 1303 is further configured to monitor a PDCCH on the highest-priority CORESET.

When the communication apparatus 1301 is the terminal device and performs the solution 1, in a possible implementation, the processor 1302 is configured to discard, from the to-be-monitored PDCCH MOs in the first time unit, a PDCCH MO that has an overlapping second time unit with at least one PDCCH MO associated with the highest-priority CORESET in time domain and that has a different quasi co-location property.

When the communication apparatus 1301 is the terminal device and performs the solution 2, the transceiver 1303 is configured to receive configuration information, where the configuration information is used to indicate one or more of cell identifiers, quasi co-location properties, search space set types, and search space set identifiers that are associated with T control-resource sets CORESETs in a first time unit. The processor 1302 is configured to: determine, in M CORESETs belonging to the T CORESETs, a highest-priority CORESET based on one or more of cell identifiers, quasi co-location properties, search space set types, and search space set identifiers that are associated with the M CORESETs in a time unit, and monitor a PDCCH on the highest-priority CORESET. The M CORESETs are CORESETs associated with PDCCH MOs in a PDCCH MO set, the PDCCH MO set includes L PDCCH MOs, T and M are positive integers, M is less than or equal to T, and L is an integer greater than 1. The transceiver 1303 is further configured to monitor the PDCCH on the highest-priority CORESET. The PDCCH MO set includes a first PDCCH MO and a second PDCCH MO, and the first PDCCH MO and the second PDCCH MO have an overlapping second time unit in time domain, if the PDCCH MO set further includes a third PDCCH MO, and the third PDCCH MO does not have an overlapping second time unit with the first PDCCH MO and the second PDCCH MO in time domain, the PDCCH MO set further includes a fourth PDCCH MO, and the fourth PDCCH MO has an overlapping second time unit with the first PDCCH MO or the second PDCCH MO in time domain; and the third PDCCH MO and the fourth PDCCH MO have an overlapping second time unit in time domain.

When the communication apparatus 1301 is the terminal device and performs the solution 2, in a possible implementation, the processor 1302 is further configured to discard, from the PDCCH MO set, a PDCCH MO whose associated CORESET has a quasi co-location property different from that of the highest-priority CORESET.

When the communication apparatus 1301 is the terminal device and performs the solution 3, the transceiver 1303 is configured to receive configuration information, where the configuration information is used to indicate one or more of cell identifiers, quasi co-location properties, search space set types, and search space set identifiers that are associated with T control-resource sets CORESETs in a first time unit. The processor 1302 is configured to: sort N physical downlink control channel monitoring occasions PDCCH MOs in the first time unit based on one or more of time domain information of the N PDCCH MOs, search space set types associated with CORESETs associated with the N PDCCH MOs, and search space set identifiers associated with the CORESETs associated with the N PDCCH MOs, where N is an integer greater than 1; perform a first preset operation for the sorted N PDCCH MOs; and determine a PDCCH MO corresponding to the first time unit after performing the first preset operation. The transceiver 1303 is further configured to monitor a PDCCH on a CORESET associated with the PDCCH MO corresponding to the first time unit after the first preset operation is performed.

The first preset operation includes: for an $i^{th}$ PDCCH MO and an $(i+k)^{th}$ PDCCH MO in the N PDCCH MOs, where both i and k are positive integers not greater than N, and a value of i+k is a positive integer not greater than N, if the $i^{th}$ PDCCH MO and the $(i+k)^{th}$ PDCCH MO in the N PDCCH MOs have an overlapping second time unit in time domain and associated CORESETs have different quasi co-location properties, selecting a highest-priority CORESET from the CORESET associated with the $i^{th}$ PDCCH MO and the CORESET associated with the $(i+k)^{th}$ PDCCH MO based on one or more of a cell identifier, a search space set type, and a search space set identifier that are associated with the CORESET associated with the $i^{th}$ PDCCH MO and one or more of a cell identifier, a search space set type, and a search space set identifier that are associated with the CORESET associated with the $(i+k)^{th}$ PDCCH MO; and discarding, from the $i^{th}$ PDCCH MO and the $(i+k)^{th}$ PDCCH MO, a PDCCH MO other than a PDCCH MO associated with the highest-priority CORESET. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this implementation, because PDCCH MOs in one first time unit are sorted, monitoring is performed after all the PDCCH MOs are determined, so that efficiency of monitoring the PDCCH MOs can be improved.

When the communication apparatus 1301 is the terminal device and performs the solution 4, the transceiver 1303 is configured to receive configuration information, where the configuration information is used to indicate one or more of cell identifiers, quasi co-location properties, search space set types, and search space set identifiers that are associated with T control-resource sets CORESETs in a first time unit. The processor 1302 is configured to: perform a second preset operation for a PDCCH MO corresponding to each time-domain symbol in the first time unit; and determine a PDCCH MO corresponding to the first time unit after performing the second preset operation. The transceiver 1303 is further configured to monitor a PDCCH on a CORESET associated with the PDCCH MO corresponding to the first time unit after the second preset operation is performed.

The second preset operation includes: if the time-domain symbol is corresponding to a plurality of PDCCH MOs, the plurality of PDCCH MOs have an overlapping second time unit in time domain, and CORESETs associated with any two of the plurality of PDCCH MOs have different quasi co-location properties, determining, based on one or more of cell identifiers, search space set types, and search space set identifiers that are associated with M control-resource sets CORESETs corresponding to the time-domain symbol, a highest-priority CORESET corresponding to the time-domain symbol in the M CORESETs; and discarding, from the PDCCH MOs corresponding to the time-domain symbol, a PDCCH MO that has an overlapping second time unit with at least one PDCCH MO associated with the highest-priority CORESET corresponding to the time-domain symbol in time domain and whose associated CORESET has a different quasi co-location property. The time-domain symbol is corresponding to the plurality of physical downlink control channel monitoring occasions PDCCH MOs, the plurality of PDCCH MOs are associated with the M CORESETs, M is a positive integer, one of the plurality of PDCCH MOs is associated with one of the M CORESETs, and one of the M CORESETs is associated with one or more of the plurality of PDCCH MOs. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this implementation, monitoring is performed after all PDCCH MOs of each time-domain symbol are determined, so that efficiency of monitoring the PDCCH MOs can be improved.

When the communication apparatus 1301 is the terminal device and performs the solution 5, the transceiver 1303 is configured to receive configuration information delivered by a network device, where a PDCCH MO indicated by the configuration information meets a scenario other than a preset scenario. The transceiver 1303 is further configured to monitor a PDCCH on a CORESET indicated by the configuration information. The preset scenario includes: A first PDCCH MO and a second PDCCH MO have an overlapping second time unit in time domain and associated CORESETs have different quasi co-location properties, the first PDCCH MO and a fifth PDCCH MO have an overlapping second time unit in time domain and associated CORESETs have different quasi co-location properties, and the second PDCCH MO and the fifth PDCCH MO do not have an overlapping second time unit in time domain. The first PDCCH MO, the second PDCCH MO, and the fifth PDCCH MO are any three different PDCCH MOs that are configured for the terminal device and indicated by the configuration information. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

When the communication apparatus 1301 is the terminal device and performs the solution 6, the transceiver 1303 is configured to receive configuration information delivered by a network device, where a PDCCH MO indicated by the configuration information meets a first target scenario. The transceiver 1303 is further configured to monitor a PDCCH on a CORESET indicated by the configuration information. The first target scenario includes: A first PDCCH MO and a second PDCCH MO are any two different PDCCH MOs that are configured for the terminal device and indicated by the configuration information, the first PDCCH MO and the second PDCCH MO have an overlapping second time unit in time domain and associated CORESETs have different quasi co-location properties, and the first PDCCH MO and the second PDCCH MO meet any one or more of the following conditions:

the first PDCCH MO and the second PDCCH MO have a same start time-domain symbol;

the first PDCCH MO and the second PDCCH MO have a same end time-domain symbol;

the first PDCCH MO and the second PDCCH MO have a same start time-domain symbol, and a CORESET associated with the first PDCCH MO and a CORESET associated with the second PDCCH MO have same duration; or the first PDCCH MO and the second PDCCH MO have a same end time-domain symbol, and a CORESET associated with the first PDCCH MO and a CORESET associated with the second PDCCH MO have same duration.

In this solution, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

When the communication apparatus 1301 is the terminal device and performs the solution 7, the transceiver 1303 is configured to receive configuration information delivered by a network device, where a PDCCH MO indicated by the configuration information meets a second target scenario. The transceiver 1303 is further configured to monitor a PDCCH on a CORESET indicated by the configuration information. The second target scenario includes: A maximum of two different quasi co-location properties exist in quasi co-location properties of CORESETs associated with PDCCH MOs configured in an active bandwidth part. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

When the communication apparatus 1301 is corresponding to the network device in the foregoing method, the communication apparatus may include the processor 1302, the transceiver 1303, and the memory 1304. The memory 1304 is configured to store instructions. The processor 1302 is configured to execute the instructions stored in the memory 1304, to implement the related solution of the network device in one or more of the corresponding methods shown in FIG. 1 to FIG. 10.

When the communication apparatus 1301 is the network device, the communication apparatus 1301 may be configured to perform the method performed by the network device in any one of the foregoing solutions 1 to 7.

When the communication apparatus 1301 is the network device and performs the solution 1, the processor 1302 is configured to generate configuration information. The transceiver 1303 is configured to send the configuration information, where the configuration information is used to indicate one or more of cell identifiers, quasi co-location properties, search space set types, and search space set identifiers that are associated with T control-resource sets CORESETs in a first time unit. The processor 1302 is further configured to determine, in M CORESETs belonging to the T CORESETs, a highest-priority CORESET based on one or more of cell identifiers, quasi co-location properties, search space set types, and search space set identifiers that are associated with the M CORESETs in a time unit. To-be-monitored physical downlink control channel monitoring occasions PDCCH MOs in the first time unit are associated with the M CORESETs, M is a positive integer, one of the to-be-monitored PDCCH MOs in the first time unit is associated with one of the M CORESETs, and one of the M CORESETs is associated with one or more of the to-be-monitored PDCCH MOs in the first time unit. In this way, when a plurality of PDCCH MOs have an overlapping second time unit in time domain, any two of associated CORESETs have different quasi co-location properties, and execution bodies are different, a same CORESET can be selected for monitoring a PDCCH MO.

When the communication apparatus 1301 is the network device and performs the solution 1, in a possible implementation, after the processor 1302 is configured to determine the highest-priority CORESET in the M CORESETs, the method further includes: discarding, from the to-be-monitored PDCCH MOs in the first time unit, a PDCCH MO that has an overlapping second time unit with at least one PDCCH MO associated with the highest-priority CORESET in time domain and that has a different quasi co-location property.

When the communication apparatus 1301 is the network device and performs the solution 2, the processor 1302 is configured to generate configuration information. The transceiver 1303 is configured to send the configuration information. The configuration information is used to indicate one or more of cell identifiers, quasi co-location properties, search space set types, and search space set identifiers that are associated with T control-resource sets CORESETs in a first time unit. The processor 1302 is further configured to determine, in M CORESETs belonging to the T CORESETs, a highest-priority CORESET based on one or more of cell identifiers, quasi co-location properties, search space set types, and search space set identifiers that are associated with the M CORESETs in a time unit. The M CORESETs are CORESETs associated with PDCCH MOs in a PDCCH MO set, the PDCCH MO set includes L PDCCH MOs, T and M are positive integers, M is less than or equal to T, and L is an integer greater than 1. The PDCCH MO set includes a first PDCCH MO and a second PDCCH MO, and the first PDCCH MO and the second PDCCH MO have an overlapping second time unit in time domain; if the PDCCH MO set further includes a third PDCCH MO, and the third PDCCH MO does not have an overlapping second time unit with the first PDCCH MO and the second PDCCH MO in time domain, the PDCCH MO set further includes a fourth PDCCH MO, and the fourth PDCCH MO has an overlapping second time unit with the first PDCCH MO or the second PDCCH MO in time domain; and the third PDCCH MO and the fourth PDCCH MO have an overlapping second time unit in time domain.

When the communication apparatus 1301 is the network device and performs the solution 2, in a possible implementation, the processor 1302 is further configured to discard, from the PDCCH MO set, a PDCCH MO whose associated CORESET has a quasi co-location property different from that of the highest-priority CORESET.

When the communication apparatus 1301 is the network device and performs the solution 3, the processor 1302 is configured to generate configuration information. The transceiver 1303 is configured to send the configuration information, where the configuration information is used to indicate one or more of cell identifiers, quasi co-location properties, search space set types, and search space set identifiers that are associated with T control-resource sets CORESETs in a first time unit. The processor 1302 is further configured to: sort N physical downlink control channel monitoring occasions PDCCH MOs in the first time unit based on one or more of time domain information of the N PDCCH MOs, search space set types associated with CORESETs associated with the N PDCCH MOs, and search space set identifiers associated with the CORESETs associated with the N PDCCH MOs, where N is an integer greater than 1; perform a first preset operation for the sorted N PDCCH MOs; and determine a PDCCH MO corresponding to the first time unit after performing the first preset operation.

The first preset operation includes: For an $i^{th}$ PDCCH MO and an $(i+k)^{th}$ PDCCH MO in the N PDCCH MOs, where both i and k are positive integers not greater than N, and a value of i+k is a positive integer not greater than N, if the $i^{th}$ PDCCH MO and the $(i+k)^{th}$ PDCCH MO in the N PDCCH MOs have an overlapping second time unit in time domain and associated CORESETs have different quasi co-location properties, where both i and k are positive integers not greater than N, the network device selects a highest-priority CORESET from the CORESET associated with the $i^{th}$ PDCCH MO and the CORESET associated with the $(i+k)^{th}$ PDCCH MO based on one or more of a cell identifier, a search space set type, and a search space set identifier that are associated with the CORESET associated with the $i^{th}$ PDCCH MO and one or more of a cell identifier, a search space set type, and a search space set identifier that are associated with the CORESET associated with the $(i+k)^{th}$ PDCCH MO; and discards, from the $i^{th}$ PDCCH MO and the $(i+k)^{th}$ PDCCH MO, a PDCCH MO other than a PDCCH MO associated with the highest-priority CORESET.

When the communication apparatus 1301 is the network device and performs the solution 4, the processor 1302 is configured to generate configuration information. The transceiver 1303 is configured to send the configuration information, where the configuration information is used to indicate one or more of cell identifiers, quasi co-location properties, search space set types, and search space set identifiers that are associated with T control-resource sets CORESETs in a first time unit. The processor 1302 is further configured to: perform a second preset operation for a PDCCH MO corresponding to each time-domain symbol in the first time unit included in the configuration information; and determine a PDCCH MO corresponding to the first time unit after performing the second preset operation.

The second preset operation includes: if the time-domain symbol is corresponding to a plurality of PDCCH MOs, the plurality of PDCCH MOs have an overlapping second time unit in time domain, and CORESETs associated with any two of the plurality of PDCCH MOs have different quasi co-location properties, determining, based on one or more of cell identifiers, search space set types, and search space set identifiers that are associated with M control-resource sets CORESETs corresponding to the time-domain symbol, a highest-priority CORESET corresponding to the time-domain symbol in the M CORESETs; and discarding, from the PDCCH MOs corresponding to the time-domain symbol, a PDCCH MO that has an overlapping second time unit with a PDCCH MO associated with the highest-priority CORESET corresponding to the time-domain symbol in time domain and whose associated CORESET has a different quasi co-location property. The time-domain symbol is corresponding to the plurality of physical downlink control channel monitoring occasions PDCCH MOs, the plurality of PDCCH MOs are associated with the M CORESETs, M is a positive integer, one of the plurality of PDCCH MOs is associated with one of the M CORESETs, and one of the M CORESETs is associated with one or more of the plurality of PDCCH MOs.

When the communication apparatus 1301 is the network device and performs the solution 5, the processor 1302 is configured to generate, based on a preset scenario, configuration information of a PDCCH MO meeting a scenario other than the preset scenario. The transceiver 1303 is configured to send the configuration information. The preset scenario includes: A first PDCCH MO and a second PDCCH MO have an overlapping second time unit in time domain and associated CORESETs have different quasi co-location properties, the first PDCCH MO and a fifth PDCCH MO have an overlapping second time unit in time domain and associated CORESETs have different quasi co-location properties, and the second PDCCH MO and the fifth PDCCH MO do not have an overlapping second time unit in time domain. The first PDCCH MO, the second PDCCH MO, and the fifth PDCCH MO are any three different PDCCH MOs that are configured for the terminal device and indicated by the configuration information. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

When the communication apparatus 1301 is the network device and performs the solution 6, the processor 1302 is configured to generate, based on a first target scenario, configuration information of a PDCCH MO meeting the first target scenario. The transceiver 1303 is configured to send the configuration information. The first target scenario includes: A first PDCCH MO and a second PDCCH MO are any two different PDCCH MOs that are configured for the terminal device and indicated by the configuration information, the first PDCCH MO and the second PDCCH MO have an overlapping second time unit in time domain and associated CORESETs have different quasi co-location properties, and the first PDCCH MO and the second PDCCH MO meet any one or more of the following conditions:

the first PDCCH MO and the second PDCCH MO have a same start time-domain symbol;

the first PDCCH MO and the second PDCCH MO have a same end time-domain symbol;

the first PDCCH MO and the second PDCCH MO have a same start time-domain symbol, and a CORESET associated with the first PDCCH MO and a CORESET associated with the second PDCCH MO have same duration; or the first PDCCH MO and the second PDCCH MO have a same end time-domain symbol, and a CORESET associated with the first PDCCH MO and a CORESET associated with the second PDCCH MO have same duration.

When the communication apparatus 1301 is the network device and performs the solution 7, the processor 1302 is configured to generate, based on a second target scenario, configuration information of a PDCCH MO meeting a first target scenario. The transceiver 1303 is configured to send the configuration information. The second target scenario includes: A maximum of two different quasi co-location properties exist in quasi co-location properties of CORESETs associated with PDCCH MOs configured in an active bandwidth part. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

For concepts, explanations, and detailed descriptions used by the communication apparatus and related to the technical solution provided in this embodiment of this application, and other steps, refer to the descriptions of the content in the foregoing method or other embodiments, and details are not described herein again.

Figure 14:
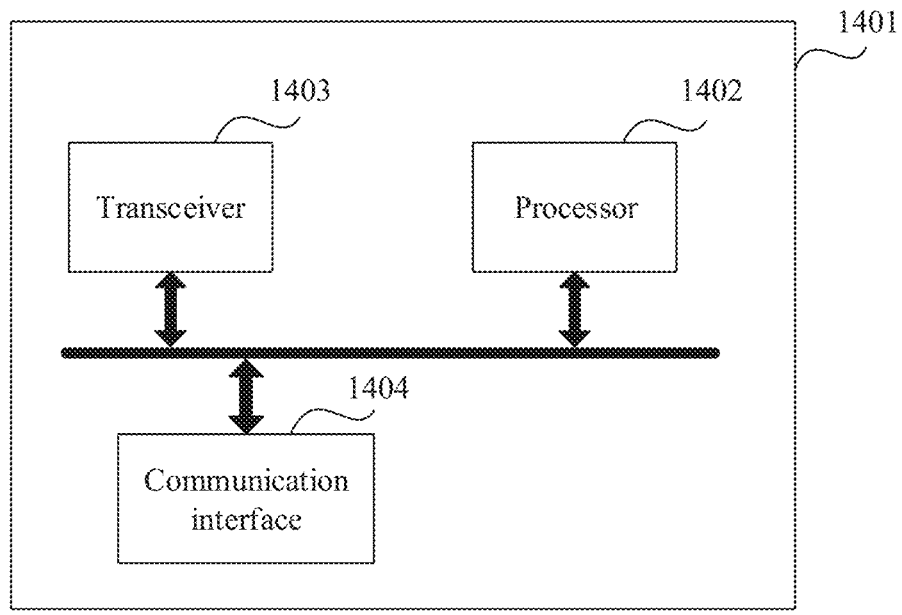
FIG. 14 is a schematic diagram of a structure of another communication apparatus according to an embodiment of this application.

According to the foregoing method, FIG. 14 is a schematic diagram of a structure of a communication apparatus according to an embodiment of this application. As shown in FIG. 14, the communication apparatus 1401 may include a communication interface 1404, a processor 1402, and a transceiver 1403. The communication interface 1404 is configured to input and/or output information. The processor 1402 is configured to execute a computer program or instructions, to enable the communication apparatus 1401 to implement the method on a terminal device side in the related solutions in FIG. 1 to FIG. 12, or enable the communication apparatus 1401 to implement the method on a network device side in the related solutions in FIG. 1 to FIG. 12. In this embodiment of this application, the transceiver 1403 may implement the solution implemented by the transceiver 1303 in FIG. 13, and the processor 1402 may implement the solution implemented by the processor 1302 in FIG. 13. Details are not described herein again.

According to the methods provided in the embodiments of this application, an embodiment of this application further provides a communication system, including the foregoing network device and one or more terminal devices.

Figure 15:
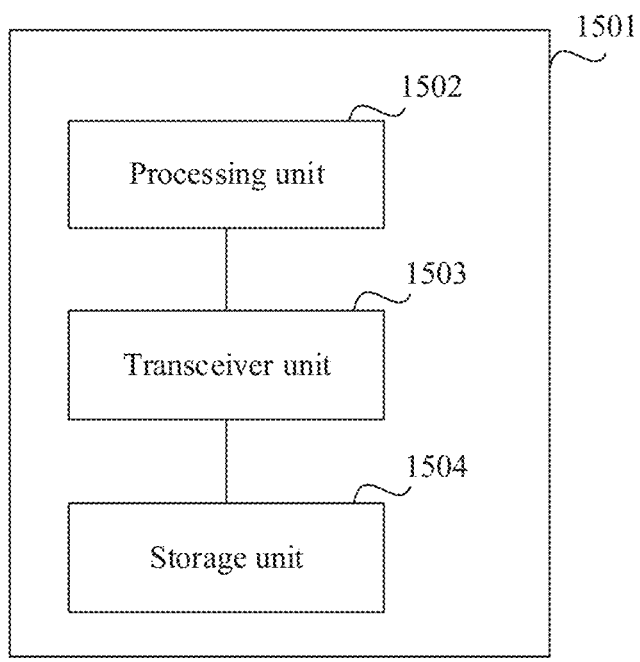
FIG. 15 is a schematic diagram of a structure of another communication apparatus according to an embodiment of this application.

Based on the foregoing embodiments and a same concept, FIG. 15 is a schematic diagram of a communication apparatus according to an embodiment of this application. As shown in FIG. 15, the communication apparatus 1501 may be a terminal device or a network device, or may be a chip or a circuit, such as a chip or a circuit that can be disposed in the terminal device or the network device.

The communication apparatus may be corresponding to the terminal device in the foregoing methods. The communication apparatus may implement steps performed by the terminal device in any one or more of the corresponding methods shown in the FIG. 1 to FIG. 12. The communication apparatus may include a processing unit 1502 and a transceiver unit 1503.

When the communication apparatus 1501 is the terminal device and performs the solution 1, the transceiver unit 1503 is configured to receive configuration information. The configuration information is used to indicate one or more of cell identifiers, quasi co-location properties, search space set types, and search space set identifiers that are associated with T control-resource sets CORESETs in a first time unit. The processing unit 1502 is configured to determine, in M CORESETs belonging to the T CORESETs, a highest-priority CORESET based on one or more of cell identifiers, quasi co-location properties, search space set types, and search space set identifiers that are associated with the M CORESETs in a time unit. To-be-monitored physical downlink control channel monitoring occasions PDCCH MOs in the first time unit are associated with the M CORESETs, M is a positive integer, one of the to-be-monitored PDCCH MOs in the first time unit is associated with one of the M CORESETs, and one of the M CORESETs is associated with one or more of the to-be-monitored PDCCH MOs in the first time unit. The transceiver unit 1503 is further configured to monitor a PDCCH on the highest-priority CORESET. In this way, when a plurality of PDCCH MOs have an overlapping second time unit in time domain, any two of associated CORESETs have different quasi co-location properties, and execution bodies are different, a same CORESET can be selected for monitoring a PDCCH MO.

When the communication apparatus 1501 is the terminal device and performs the solution 1, in a possible implementation, the processing unit 1502 is configured to discard, from the to-be-monitored PDCCH MOs in the first time unit, a PDCCH MO that has an overlapping second time unit with at least one PDCCH MO associated with the highest-priority CORESET in time domain and that has a different quasi co-location property.

When the communication apparatus 1501 is the terminal device and performs the solution 2, the transceiver unit 1503 is configured to receive configuration information, where the configuration information is used to indicate one or more of cell identifiers, quasi co-location properties, search space set types, and search space set identifiers that are associated with T control-resource sets CORESETs in a first time unit. The processing unit 1502 is configured to: determine, in M CORESETs belonging to the T CORESETs, a highest-priority CORESET based on one or more of cell identifiers, quasi co-location properties, search space set types, and search space set identifiers that are associated with the M CORESETs in a time unit, and monitor a PDCCH on the highest-priority CORESET. The M CORESETs are CORESETs associated with PDCCH MOs in a PDCCH MO set, the PDCCH MO set includes L PDCCH MOs, T and M are positive integers, M is less than or equal to T, and L is an integer greater than 1. The transceiver unit 1503 is further configured to monitor the PDCCH on the highest-priority CORESET. The PDCCH MO set includes a first PDCCH MO and a second PDCCH MO, and the first PDCCH MO and the second PDCCH MO have an overlapping second time unit in time domain; if the PDCCH MO set further includes a third PDCCH MO, and the third PDCCH MO does not have an overlapping second time unit with the first PDCCH MO and the second PDCCH MO in time domain, the PDCCH MO set further includes a fourth PDCCH MO, and the fourth PDCCH MO has an overlapping second time unit with the first PDCCH MO or the second PDCCH MO in time domain; and the third PDCCH MO and the fourth PDCCH MO have an overlapping second time unit in time domain.

When the communication apparatus 1501 is the terminal device and performs the solution 2, in a possible implementation, the processing unit 1502 is further configured to discard, from the PDCCH MO set, a PDCCH MO whose associated CORESET has a quasi co-location property different from that of the highest-priority CORESET.

When the communication apparatus 1501 is the terminal device and performs the solution 3, the transceiver unit 1503 is configured to receive configuration information, where the configuration information is used to indicate one or more of cell identifiers, quasi co-location properties, search space set types, and search space set identifiers that are associated with T control-resource sets CORESETs in a first time unit. The processing unit 1502 is configured to: sort N physical downlink control channel monitoring occasions PDCCH MOs in the first time unit based on one or more of time domain information of the N PDCCH MOs, search space set types associated with CORESETs associated with the N PDCCH MOs, and search space set identifiers associated with the CORESETs associated with the N PDCCH MOs, where N is an integer greater than 1; perform a first preset operation for the sorted N PDCCH MOs; and determine a PDCCH MO corresponding to the first time unit after performing the first preset operation. The transceiver unit 1503 is further configured to monitor a PDCCH on a CORESET associated with the PDCCH MO corresponding to the first time unit after the first preset operation is performed.

The first preset operation includes: for an $i^{th}$ PDCCH MO and an $(i+k)^{th}$ PDCCH MO in the N PDCCH MOs, where both i and k are positive integers not greater than N, and a value of i+k is a positive integer not greater than N, if the $i^{th}$ PDCCH MO and the $(i+k)^{th}$ PDCCH MO in the N PDCCH MOs have an overlapping second time unit in time domain and associated CORESETs have different quasi co-location properties, selecting a highest-priority CORESET from the CORESET associated with the $i^{th}$ PDCCH MO and the CORESET associated with the $(i+k)^{th}$ PDCCH MO based on one or more of a cell identifier, a search space set type, and a search space set identifier that are associated with the CORESET associated with the $i^{th}$ PDCCH MO and one or more of a cell identifier, a search space set type, and a search space set identifier that are associated with the CORESET associated with the $(i+k)^{th}$ PDCCH MO; and discarding, from the $i^{th}$ PDCCH MO and the $(i+k)^{th}$ PDCCH MO, a PDCCH MO other than a PDCCH MO associated with the highest-priority CORESET. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this implementation, because PDCCH MOs in one first time unit are sorted, monitoring is performed after all the PDCCH MOs are determined, so that efficiency of monitoring the PDCCH MOs can be improved.

When the communication apparatus 1501 is the terminal device and performs the solution 4, the transceiver unit 1503 is configured to receive configuration information, where the configuration information is used to indicate one or more of cell identifiers, quasi co-location properties, search space set types, and search space set identifiers that are associated with T control-resource sets CORESETs in a first time unit. The processing unit 1502 is configured to: perform a second preset operation for a PDCCH MO corresponding to each time-domain symbol in the first time unit; and determine a PDCCH MO corresponding to the first time unit after performing the second preset operation. The transceiver unit 1503 is further configured to monitor a PDCCH on a CORESET associated with the PDCCH MO corresponding to the first time unit after the second preset operation is performed.

The second preset operation includes: if the time-domain symbol is corresponding to a plurality of PDCCH MOs, the plurality of PDCCH MOs have an overlapping second time unit in time domain, and CORESETs associated with any two of the plurality of PDCCH MOs have different quasi co-location properties, determining, based on one or more of cell identifiers, search space set types, and search space set identifiers that are associated with M control-resource sets CORESETs corresponding to the time-domain symbol, a highest-priority CORESET corresponding to the time-domain symbol in the M CORESETs; and discarding, from the PDCCH MOs corresponding to the time-domain symbol, a PDCCH MO that has an overlapping second time unit with at least one PDCCH MO associated with the highest-priority CORESET corresponding to the time-domain symbol in time domain and whose associated CORESET has a different quasi co-location property. The time-domain symbol is corresponding to the plurality of physical downlink control channel monitoring occasions PDCCH MOs, the plurality of PDCCH MOs are associated with the M CORESETs, M is a positive integer, one of the plurality of PDCCH MOs is associated with one of the M CORESETs, and one of the M CORESETs is associated with one or more of the plurality of PDCCH MOs. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this implementation, monitoring is performed after all PDCCH MOs of each time-domain symbol are determined, so that efficiency of monitoring the PDCCH MOs can be improved.

When the communication apparatus 1501 is the terminal device and performs the solution 5, the transceiver unit 1503 is configured to receive configuration information delivered by a network device, where a PDCCH MO indicated by the configuration information meets a scenario other than a preset scenario. The transceiver unit 1503 is further configured to monitor a PDCCH on a CORESET indicated by the configuration information. The preset scenario includes: A first PDCCH MO and a second PDCCH MO have an overlapping second time unit in time domain and associated CORESETs have different quasi co-location properties, the first PDCCH MO and a fifth PDCCH MO have an overlapping second time unit in time domain and associated CORESETs have different quasi co-location properties, and the second PDCCH MO and the fifth PDCCH MO do not have an overlapping second time unit in time domain. The first PDCCH MO, the second PDCCH MO, and the fifth PDCCH MO are any three different PDCCH MOs that are configured for the terminal device and indicated by the configuration information. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

When the communication apparatus 1501 is the terminal device and performs the solution 6, the transceiver unit 1503 is configured to receive configuration information delivered by a network device, where a PDCCH MO indicated by the configuration information meets a first target scenario. The transceiver unit 1503 is further configured to monitor a PDCCH on a CORESET indicated by the configuration information. The first target scenario includes: A first PDCCH MO and a second PDCCH MO are any two different PDCCH MOs that are configured for the terminal device and indicated by the configuration information, the first PDCCH MO and the second PDCCH MO have an overlapping second time unit in time domain and associated CORESETs have different quasi co-location properties, and the first PDCCH MO and the second PDCCH MO meet any one or more of the following conditions:

the first PDCCH MO and the second PDCCH MO have a same start time-domain symbol;

the first PDCCH MO and the second PDCCH MO have a same end time-domain symbol;

the first PDCCH MO and the second PDCCH MO have a same start time-domain symbol, and a CORESET associated with the first PDCCH MO and a CORESET associated with the second PDCCH MO have same duration; or the first PDCCH MO and the second PDCCH MO have a same end time-domain symbol, and a CORESET associated with the first PDCCH MO and a CORESET associated with the second PDCCH MO have same duration.

In this solution, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

When the communication apparatus 1501 is the terminal device and performs the solution 7, the transceiver unit 1503 is configured to receive configuration information delivered by a network device, where a PDCCH MO indicated by the configuration information meets a second target scenario. The transceiver unit 1503 is further configured to monitor a PDCCH on a CORESET indicated by the configuration information. The second target scenario includes: A maximum of two different quasi co-location properties exist in quasi co-location properties of CORESETs associated with PDCCH MOs configured in an active bandwidth part. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

When the communication apparatus 1501 is corresponding to the network device in the foregoing method, the communication apparatus may include the processing unit 1502, the transceiver unit 1503, and a storage unit 1504. The storage unit 1504 is configured to store instructions. The processing unit 1502 is configured to execute the instructions stored in the storage unit 1504, to implement the related solution of the network device in one or more of the corresponding methods shown in FIG. 1 to FIG. 10.

When the communication apparatus 1501 is the network device, the communication apparatus 1501 may be configured to perform the method performed by the network device in any one of the foregoing solutions 1 to 7.

When the communication apparatus 1501 is the network device and performs the solution 1, the processing unit 1502 is configured to generate configuration information. The transceiver unit 1503 is configured to send the configuration information, where the configuration information is used to indicate one or more of cell identifiers, quasi co-location properties, search space set types, and search space set identifiers that are associated with T control-resource sets CORESETs in a first time unit. The processing unit 1502 is further configured to determine, in M CORESETs belonging to the T CORESETs, a highest-priority CORESET based on one or more of cell identifiers, quasi co-location properties, search space set types, and search space set identifiers that are associated with the M CORESETs in a time unit. To-be-monitored physical downlink control channel monitoring occasions PDCCH MOs in the first time unit are associated with the M CORESETs, M is a positive integer, one of the to-be-monitored PDCCH MOs in the first time unit is associated with one of the M CORESETs, and one of the M CORESETs is associated with one or more of the to-be-monitored PDCCH MOs in the first time unit. In this way, when a plurality of PDCCH MOs have an overlapping second time unit in time domain, any two of associated CORESETs have different quasi co-location properties, and execution bodies are different, a same CORESET can be selected for monitoring a PDCCH MO.

When the communication apparatus 1501 is the network device and performs the solution 1, in a possible implementation, after the processing unit 1502 is configured to determine the highest-priority CORESET in the M CORESETs, the method further includes: discarding, from the to-be-monitored PDCCH MOs in the first time unit, a PDCCH MO that has an overlapping second time unit with at least one PDCCH MO associated with the highest-priority CORESET in time domain and that has a different quasi co-location property.

When the communication apparatus 1501 is the network device and performs the solution 2, the processing unit 1502 is configured to generate configuration information. The transceiver unit 1503 is configured to send the configuration information. The configuration information is used to indicate one or more of cell identifiers, quasi co-location properties, search space set types, and search space set identifiers that are associated with T control-resource sets CORESETs in a first time unit. The processing unit 1502 is further configured to determine, in M CORESETs belonging to the T CORESETs, a highest-priority CORESET based on one or more of cell identifiers, quasi co-location properties, search space set types, and search space set identifiers that are associated with the M CORESETs in a time unit. The M CORESETs are CORESETs associated with PDCCH MOs in a PDCCH MO set, the PDCCH MO set includes L PDCCH MOs, T and M are positive integers, M is less than or equal to T, and L is an integer greater than 1. The PDCCH MO set includes a first PDCCH MO and a second PDCCH MO, and the first PDCCH MO and the second PDCCH MO have an overlapping second time unit in time domain; if the PDCCH MO set further includes a third PDCCH MO, and the third PDCCH MO does not have an overlapping second time unit with the first PDCCH MO and the second PDCCH MO in time domain, the PDCCH MO set further includes a fourth PDCCH MO, and the fourth PDCCH MO has an overlapping second time unit with the first PDCCH MO or the second PDCCH MO in time domain; and the third PDCCH MO and the fourth PDCCH MO have an overlapping second time unit in time domain.

When the communication apparatus 1501 is the network device and performs the solution 2, in a possible implementation, the processing unit 1502 is further configured to discard, from the PDCCH MO set, a PDCCH MO whose associated CORESET has a quasi co-location property different from that of the highest-priority CORESET.

When the communication apparatus 1501 is the network device and performs the solution 3, the processing unit 1502 is configured to generate configuration information. The transceiver unit 1503 is configured to send the configuration information, where the configuration information is used to indicate one or more of cell identifiers, quasi co-location properties, search space set types, and search space set identifiers that are associated with T control-resource sets CORESETs in a first time unit. The processing unit 1502 is further configured to: sort N physical downlink control channel monitoring occasions PDCCH MOs in the first time unit based on one or more of time domain information of the N PDCCH MOs, search space set types associated with CORESETs associated with the N PDCCH MOs, and search space set identifiers associated with the CORESETs associated with the N PDCCH MOs, where N is an integer greater than 1; perform a first preset operation for the sorted N PDCCH MOs; and determine a PDCCH MO corresponding to the first time unit after performing the first preset operation.

The first preset operation includes: For an $i^{th}$ PDCCH MO and an $(i+k)^{th}$ PDCCH MO in the N PDCCH MOs, where both i and k are positive integers not greater than N, and a value of i+k is a positive integer not greater than N, if the $i^{th}$ PDCCH MO and the $(i+k)^{th}$ PDCCH MO in the N PDCCH MOs have an overlapping second time unit in time domain and associated CORESETs have different quasi co-location properties, where both i and k are positive integers not greater than N, the network device selects a highest-priority CORESET from the CORESET associated with the $i^{th}$ PDCCH MO and the CORESET associated with the $(i+k)^{th}$ PDCCH MO based on one or more of a cell identifier, a search space set type, and a search space set identifier that are associated with the CORESET associated with the $i^{th}$ PDCCH MO and one or more of a cell identifier, a search space set type, and a search space set identifier that are associated with the CORESET associated with the $(i+k)^{th}$ PDCCH MO; and discards, from the $i^{th}$ PDCCH MO and the $(i+k)^{th}$ PDCCH MO, a PDCCH MO other than a PDCCH MO associated with the highest-priority CORESET.

When the communication apparatus 1501 is the network device and performs the solution 4, the processing unit 1502 is configured to generate configuration information. The transceiver unit 1503 is configured to send the configuration information, where the configuration information is used to indicate one or more of cell identifiers, quasi co-location properties, search space set types, and search space set identifiers that are associated with T control-resource sets CORESETs in a first time unit. The processing unit 1502 is further configured to: perform a second preset operation for a PDCCH MO corresponding to each time-domain symbol in the first time unit included in the configuration information; and determine a PDCCH MO corresponding to the first time unit after performing the second preset operation.

The second preset operation includes: if the time-domain symbol is corresponding to a plurality of PDCCH MOs, the plurality of PDCCH MOs have an overlapping second time unit in time domain, and CORESETs associated with any two of the plurality of PDCCH MOs have different quasi co-location properties, determining, based on one or more of cell identifiers, search space set types, and search space set identifiers that are associated with M control-resource sets CORESETs corresponding to the time-domain symbol, a highest-priority CORESET corresponding to the time-domain symbol in the M CORESETs; and discarding, from the PDCCH MOs corresponding to the time-domain symbol, a PDCCH MO that has an overlapping second time unit with a PDCCH MO associated with the highest-priority CORESET corresponding to the time-domain symbol in time domain and whose associated CORESET has a different quasi co-location property. The time-domain symbol is corresponding to the plurality of physical downlink control channel monitoring occasions PDCCH MOs, the plurality of PDCCH MOs are associated with the M CORESETs, M is a positive integer, one of the plurality of PDCCH MOs is associated with one of the M CORESETs, and one of the M CORESETs is associated with one or more of the plurality of PDCCH MOs.

When the communication apparatus 1501 is the network device and performs the solution 5, the processing unit 1502 is configured to generate, based on a preset scenario, configuration information of a PDCCH MO meeting a scenario other than the preset scenario. The transceiver unit 1503 is configured to send the configuration information. The preset scenario includes: A first PDCCH MO and a second PDCCH MO have an overlapping second time unit in time domain and associated CORESETs have different quasi co-location properties, the first PDCCH MO and a fifth PDCCH MO have an overlapping second time unit in time domain and associated CORESETs have different quasi co-location properties, and the second PDCCH MO and the fifth PDCCH MO do not have an overlapping second time unit in time domain. The first PDCCH MO, the second PDCCH MO, and the fifth PDCCH MO are any three different PDCCH MOs that are configured for the terminal device and indicated by the configuration information. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

When the communication apparatus 1501 is the network device and performs the solution 6, the processing unit 1502 is configured to generate, based on a first target scenario, configuration information of a PDCCH MO meeting the first target scenario. The transceiver unit 1503 is configured to send the configuration information. The first target scenario includes: A first PDCCH MO and a second PDCCH MO are any two different PDCCH MOs that are configured for the terminal device and indicated by the configuration information, the first PDCCH MO and the second PDCCH MO have an overlapping second time unit in time domain and associated CORESETs have different quasi co-location properties, and the first PDCCH MO and the second PDCCH MO meet any one or more of the following conditions:

the first PDCCH MO and the second PDCCH MO have a same start time-domain symbol;

the first PDCCH MO and the second PDCCH MO have a same end time-domain symbol;

the first PDCCH MO and the second PDCCH MO have a same start time-domain symbol, and a CORESET associated with the first PDCCH MO and a CORESET associated with the second PDCCH MO have same duration; or the first PDCCH MO and the second PDCCH MO have a same end time-domain symbol, and a CORESET associated with the first PDCCH MO and a CORESET associated with the second PDCCH MO have same duration.

When the communication apparatus 1501 is the network device and performs the solution 7, the processing unit 1502 is configured to generate, based on a second target scenario, configuration information of a PDCCH MO meeting a first target scenario. The transceiver unit 1503 is configured to send the configuration information. The second target scenario includes: A maximum of two different quasi co-location properties exist in quasi co-location properties of CORESETs associated with PDCCH MOs configured in an active bandwidth part. In this way, when a plurality of PDCCH MOs have an overlapping second time unit in time domain, any two of associated CORESETs have different quasi co-location properties, and execution bodies are different, a same CORESET can be selected for monitoring a PDCCH MO. In addition, in this solution, selection of a CORESET for monitoring a PDCCH in a conventional technology may be supported.

For concepts, explanations, and detailed descriptions used by the communication apparatus and related to the technical solution provided in this embodiment of this application, and other steps, refer to the descriptions of the content in the foregoing method or other embodiments, and details are not described herein again.

It may be understood that for functions of the units in the communication apparatus 1501, refer to implementation of a corresponding method embodiment. Details are not described herein again.

It should be understood that division into units of the communication apparatus is merely logical function division. During actual implementation, all or some of the units may be integrated into a physical entity, or may be physically separated. In this embodiment of this application, the transceiver unit 1503 may be implemented by the transceiver 1303 in FIG. 13, and the processing unit 1502 may be implemented by the processor 1302 in FIG. 13.

According to the methods provided in the embodiments of this application, this application further provides a computer program product. The computer program product includes computer program code. When the computer program code is run on a computer, the computer is enabled to perform the method in any one of the embodiments shown in FIG. 1 to FIG. 12.

According to the methods provided in the embodiments of this application, this application further provides a computer-readable storage medium. The computer-readable medium stores program code. When the program code is run on a computer, the computer is enabled to perform the method in any one of the embodiments shown in FIG. 1 to FIG. 12.

According to the methods provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

The network device and the terminal device in the foregoing apparatus embodiments are corresponding to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification are used to indicate a computer-related entity, hardware, firmware, a combination of hardware and software, software, or software being executed. For example, the component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed by various computer-readable media that store various data structures. The components may perform communication by using a local and/or remote process and based on, for example, a signal having one or more data packets (for example, data from two components interacting with another component in a local system, a distributed system, and/or across a network such as an internet interacting with another system by using the signal).

A person of ordinary skill in the art may be aware that, various illustrative logical blocks (illustrative logical blocks) and steps (steps) that are described with reference to the embodiments disclosed in this specification may be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving configuration information, wherein the configuration information is used to indicate one or more of cell identifiers, quasi co-location properties, search space set types, and search space set identifiers that are associated with T control-resource sets (CORESETs) in a first time unit;
determining, in M CORESETs belonging to the T CORESETs, a highest-priority CORESET based on one or more of cell identifiers, quasi co-location properties, search space set types, and search space set identifiers that are associated with the M CORESETs in a time unit, wherein the M CORESETs are CORESETs associated with physical downlink control channel Monitoring Occasions (PDCCH MOs) in a PDCCH MO set, wherein the PDCCH MO set comprises L PDCCH MOs, and wherein T and M are positive integers, M is less than or equal to T, and L is an integer greater than 1;
monitoring a PDCCH on the highest-priority CORESET, wherein the PDCCH MO set comprises a first PDCCH MO and a second PDCCH MO, wherein the first PDCCH MO and the second PDCCH MO have an overlapping second time unit in time domain; and
in response to determining that the PDCCH MO set further comprises a third PDCCH MO, and the third PDCCH MO does not have an overlapping second time unit with the first PDCCH MO and the second PDCCH MO in time domain, the PDCCH MO set further comprises a fourth PDCCH MO, wherein the fourth PDCCH MO has an overlapping second time unit with the first PDCCH MO or the second PDCCH MO in time domain, and wherein the third PDCCH MO and the fourth PDCCH MO have an overlapping second time unit in time domain.

2. The method according to claim 1, wherein
in response to determining that only one of the M CORESETs is associated with a common search space set (CSS), the highest-priority CORESET is a CORESET associated with the CSS in the M CORESETs.

3. The method according to claim 1, wherein
in response to determining that K CORESETs in the M CORESETs are associated with common search space sets (CSSs), K is a positive integer not greater than M, and K cell identifiers associated with the K CORESETs are all the same, the highest-priority CORESET is a CORESET associated with a smallest CSS identifier in the K CORESETs.

4. The method according to claim 1, wherein
in response to determining that K CORESETs in the M CORESETs are associated with CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is a CORESET associated with the smallest cell identifier in the K CORESETs.

5. The method according to claim 1, wherein
in response to determining that K CORESETs in the M CORESETs are associated with CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest CSS identifier in the CORESETs associated with the smallest cell identifier in the K CORESETs.

6. The method according to claim 1, wherein
in response to determining that none of the M CORESETs is associated with a CSS, and M cell identifiers associated with the M CORESETs are all the same, the highest-priority CORESET is a CORESET associated with a smallest UE-specific search space set identifier in the M CORESETs.

7. A communication apparatus, comprising at least one processor; and
one or more memories coupled to the at least one processor and storing programming instructions for execution by the at least one processor to perform operations comprising:
receiving configuration information, wherein the configuration information is used to indicate one or more of cell identifiers, quasi co-location properties, search space set types, and search space set identifiers that are associated with T control-resource sets (CORESETs) in a first time unit;
determining, in M CORESETs belonging to the T CORESETs, a highest-priority CORESET based on one or more of cell identifiers, quasi co-location properties, search space set types, and search space set identifiers that are associated with the M CORESETs in a time unit, wherein the M CORESETs are CORESETs associated with physical downlink control channel Monitoring Occasions (PDCCH MOs) in a PDCCH MO set, wherein the PDCCH MO set comprises L PDCCH MOs, and wherein T and M are positive integers, M is less than or equal to T, and L is an integer greater than 1;
monitoring a PDCCH on the highest-priority CORESET, wherein the PDCCH MO set comprises-a first PDCCH MO and a second PDCCH MO, wherein the first PDCCH MO and the second PDCCH MO have an overlapping second time unit in time domain; and
in response to determining that the PDCCH MO set further comprises a third PDCCH MO, and the third PDCCH MO does not have an overlapping second time unit with the first PDCCH MO and the second PDCCH MO in time domain, the PDCCH MO set further comprises a fourth PDCCH MO, wherein the fourth PDCCH MO has an overlapping second time unit with the first PDCCH MO or the second PDCCH MO in time domain, and wherein the third PDCCH MO and the fourth PDCCH MO have an overlapping second time unit in time domain.

8. The communication apparatus according to claim 7, wherein
in response to determining that only one of the M CORESETs is associated with a common search space set (CSS), the highest-priority CORESET is a CORESET associated with the CSS in the M CORESETs.

9. The communication apparatus according to claim 7, wherein
in response to determining that K CORESETs in the M CORESETs are associated with common search space sets (CSSs), K is a positive integer not greater than M, and K cell identifiers associated with the K CORESETs are all the same, the highest-priority CORESET is a CORESET associated with a smallest CSS identifier in the K CORESETs.

10. The communication apparatus according to claim 7, wherein
in response to determining that K CORESETs in the M CORESETs are associated with CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is a CORESET associated with the smallest cell identifier in the K CORESETs.

11. The communication apparatus according to claim 7, wherein
in response to determining that K CORESETs in the M CORESETs are associated with CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest CSS identifier in the CORESETs associated with the smallest cell identifier in the K CORESETs.

12. The communication apparatus according to claim 7, wherein
in response to determining that none of the M CORESETs is associated with a CSS, and M cell identifiers associated with the M CORESETs are all the same, the highest-priority CORESET is a CORESET associated with a smallest UE-specific search space set identifier in the M CORESETs.

13. The communication apparatus according to claim 7, wherein the communication apparatus is a terminal device or a chip.

14. A communication apparatus, comprising at least one processor; and
one or more memories coupled to the at least one processor and storing programming instructions for execution by the at least one processor to perform operations comprising:
generating configuration information, wherein the configuration information is used to indicate one or more of cell identifiers, quasi co-location properties, search space set types, and search space set identifiers that are associated with T control-resource sets (CORESETS) in a first time unit;
sending the configuration information;
determining, in M CORESETs belonging to the T CORESETs, a highest-priority CORESET based on one or more of cell identifiers, quasi co-location properties, search space set types, and search space set identifiers that are associated with the M CORESETs in a time unit, wherein the M CORESETs are CORESETs associated with physical downlink control channel Monitoring Occasions (PDCCH MOs) in a PDCCH MO set, wherein the PDCCH MO set comprises L PDCCH MOs, wherein T and M are positive integers, M is less than or equal to T, and L is an integer greater than 1, and the PDCCH MO set comprises-a first PDCCH MO and a second PDCCH MO, wherein the first PDCCH MO and the second PDCCH MO have an overlapping second time unit in time domain; and
in response to determining that the PDCCH MO set further comprises a third PDCCH MO, and the third PDCCH MO does not have an overlapping second time unit with the first PDCCH MO and the second PDCCH MO in time domain, the PDCCH MO set further comprises a fourth PDCCH MO, wherein the fourth PDCCH MO has an overlapping second time unit with the first PDCCH MO or the second PDCCH MO in time domain, and wherein the third PDCCH MO and the fourth PDCCH MO have an overlapping second time unit in time domain.

15. The communication apparatus according to claim 14, wherein
in response to determining that only one of the M CORESETs is associated with a common search space set (CSS), the highest-priority CORESET is a CORESET associated with the CSS in the M CORESETs.

16. The communication apparatus according to claim 14, wherein
in response to determining that K CORESETs in the M CORESETs are associated with common search space sets (CSSs), K is a positive integer not greater than M, and K cell identifiers associated with the K CORESETs are all the same, the highest-priority CORESET is a CORESET associated with a smallest CSS identifier in the K CORESETs.

17. The communication apparatus according to claim 14, wherein
in response to determining that K CORESETs in the M CORESETs are associated with CSSs, K is a positive integer not greater than M, cell identifiers associated with at least two of the K CORESETs are different, and a smallest cell identifier in K cell identifiers associated with the K CORESETs is associated with only one of the K CORESETs, the highest-priority CORESET is a CORESET associated with the smallest cell identifier in the K CORESETs.

18. The communication apparatus according to claim 14, wherein
in response to determining that K CORESETs in the M CORESETs are associated with CSSs, K is a positive integer not greater than M, cell identifiers associated with at least two of the K CORESETs are different, and a smallest cell identifier in K cell identifiers associated with the K CORESETs is associated with at least two of the K CORESETs, the highest-priority CORESET is a CORESET associated with a smallest CSS identifier in the CORESETs associated with the smallest cell identifier in the K CORESETs.

19. The communication apparatus according to claim 14, wherein
in response to determining that none of the M CORESETs is associated with a CSS, and M cell identifiers associated with the M CORESETs are all the same, the highest-priority CORESET is a CORESET associated with a smallest UE-specific search space set identifier in the M CORESETs.

20. The communication apparatus according to claim 14, wherein the communication apparatus is a network device or a chip.

* * * * *

UNITED STATES PATENT AND TRADEMARK OFFICE
CERTIFICATE OF CORRECTION

PATENT NO. : 12,063,679 B2
APPLICATION NO. : 17/673491
DATED : August 13, 2024
INVENTOR(S) : Fei Gao et al.

Page 1 of 1

It is certified that error appears in the above-identified patent and that said Letters Patent is hereby corrected as shown below:

In the Claims

In Column 66, In Line 41, In Claim 7, delete "comprises-a" and insert -- comprises a --.

In Column 67, In Line 62, In Claim 7, delete "comprises-a" and insert -- comprises a --.

Signed and Sealed this
Nineteenth Day of August, 2025

Coke Morgan Stewart
*Acting Director of the United States Patent and Trademark Office*